(12) United States Patent
Nakagata et al.

(10) Patent No.: US 8,290,308 B2
(45) Date of Patent: Oct. 16, 2012

(54) PROGRAM, APPARATUS AND METHOD FOR DETERMINING INTERPOLATION METHOD

(75) Inventors: Shohei Nakagata, Kawasaki (JP); Kohji Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1273 days.

(21) Appl. No.: 11/964,570

(22) Filed: Dec. 26, 2007

(65) Prior Publication Data

US 2008/0170808 A1    Jul. 17, 2008

(30) Foreign Application Priority Data

Dec. 26, 2006   (JP) ................................. 2006-350705

(51) Int. Cl.
*G06K 9/32* (2006.01)
(52) U.S. Cl. ......... 382/299; 382/200; 348/448; 348/452
(58) Field of Classification Search .......... 382/298–300; 348/448–452
See application file for complete search history.

(56) References Cited

U.S. PATENT DOCUMENTS

| | | | | |
|---|---|---|---|---|
| 5,019,903 | A * | 5/1991 | Dougall et al. ................ | 348/448 |
| 5,703,650 | A * | 12/1997 | Robinson .................... | 348/413.1 |
| 6,421,090 | B1 * | 7/2002 | Jiang et al. .................... | 348/452 |
| 6,924,844 | B2 * | 8/2005 | Kawamura et al. ........... | 348/448 |
| 7,126,643 | B2 * | 10/2006 | Song et al. .................... | 348/448 |
| 7,154,556 | B1 * | 12/2006 | Wang et al. .................... | 348/452 |
| 7,171,059 | B1 * | 1/2007 | Wang et al. .................... | 382/300 |
| 7,567,294 | B2 * | 7/2009 | Lu et al. ........................ | 348/452 |
| 7,907,210 | B2 * | 3/2011 | Lu et al. ........................ | 348/452 |
| 2006/0215058 | A1 * | 9/2006 | Lu et al. ........................ | 348/452 |

FOREIGN PATENT DOCUMENTS

| | | |
|---|---|---|
| JP | 2003-143555 | 5/2003 |
| JP | 2003-230109 | 8/2003 |
| JP | 2005-341337 | 12/2005 |
| WO | 2004/017634 A1 | 2/2004 |

* cited by examiner

*Primary Examiner* — Chan S Park
*Assistant Examiner* — Sean Motsinger
(74) *Attorney, Agent, or Firm* — Staas & Halsey LLP

(57) ABSTRACT

According to a program, a computer determine an interpolation method for interpolating respective pixel values of plural pixels not existing in an input image and positioned on a straight line. Specifically, the computer selects a target pixel from among the plural pixels sequentially; calculates a local correlation value for each correlation calculation direction on the basis of pixel values of first and second pixels respectively existing in the correlation calculation direction and a direction opposite thereto viewed from the target pixel; calculates a cumulative correlation value for each correlation calculation direction on the basis of both the local correlation value and the cumulative correlation value related to a prior pixel selected immediately prior; selects one correlation calculation direction on the basis of the cumulative correlation values; and determines plural pixels for interpolation on the basis of the local and/or the cumulative correlation value (s) corresponding to the selected correlation calculation direction.

20 Claims, 32 Drawing Sheets

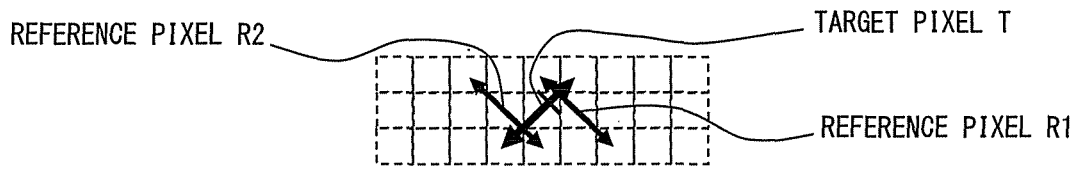

(1) IF A DIRECTION INCONSISTENT WITH A DIRECTION INDICATING STRONG CORRELATION IN THE LEFT OR RIGHT PIXEL IS DETECTED

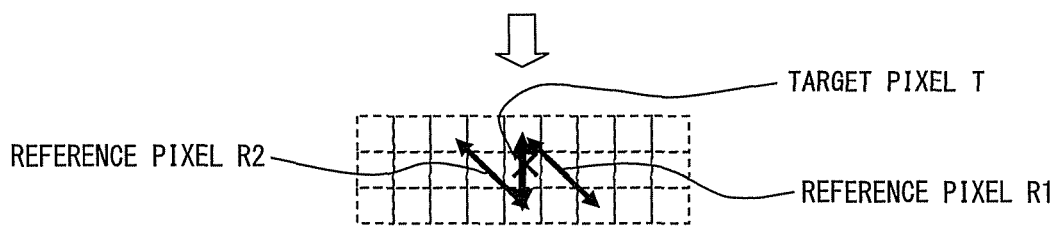

(2) THEN THE INTERPOLATION DIRECTION IS MODIFIED TO THE VERTICAL DIRECTION

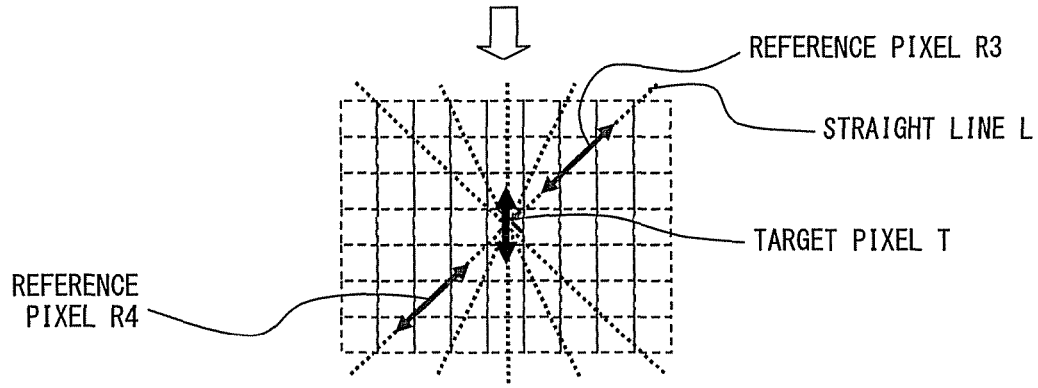

(3) IF THE DIRECTION, WITH A STRONG CORRELATION AT A PIXEL ON A LINE ONE LINE ABOVE OR BELOW THE LINE OF THE TARGET PIXEL T, IS OVERLAPPED ON THE STRAIGHT LINE L GOING THROUGH THE TARGET PIXEL T TO BE INTERPOLATED

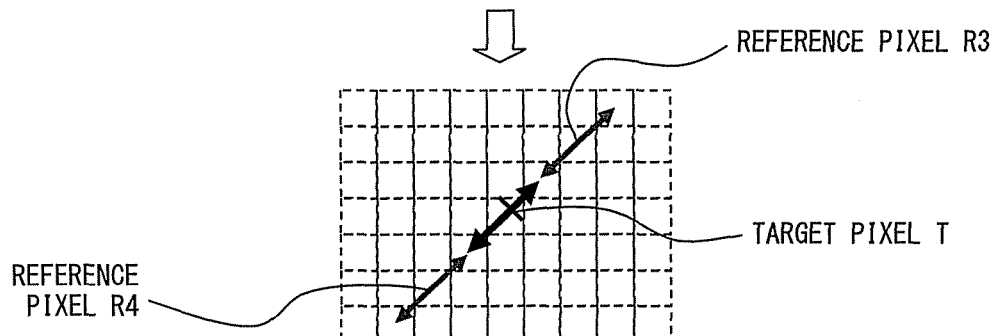

(4) THEN THE INTERPOLATION DIRECTION IS RE-MODIFIED

FIG. 5  PRIOR ART

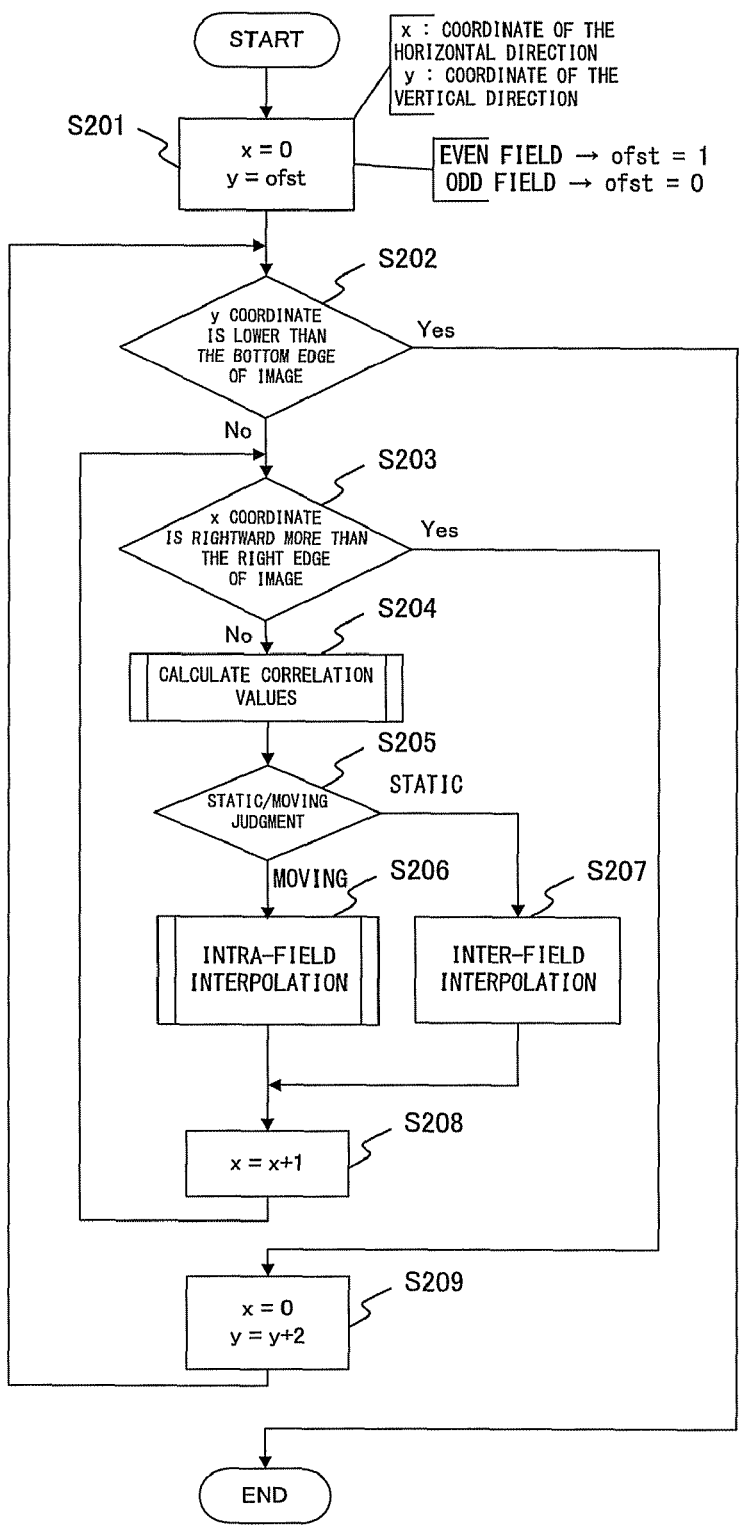
F I G. 1 0

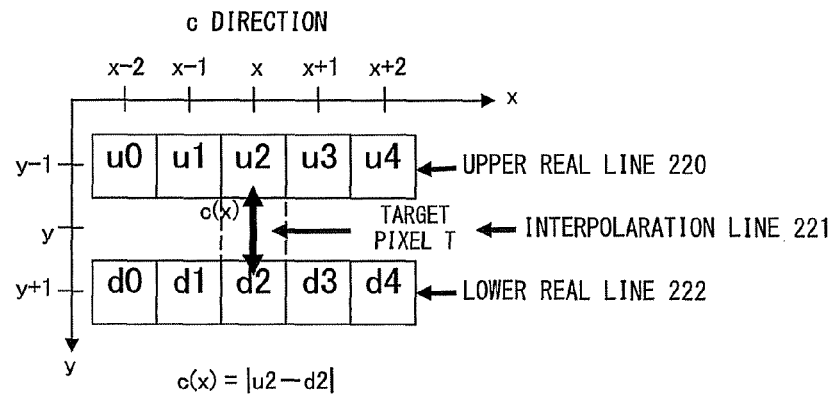
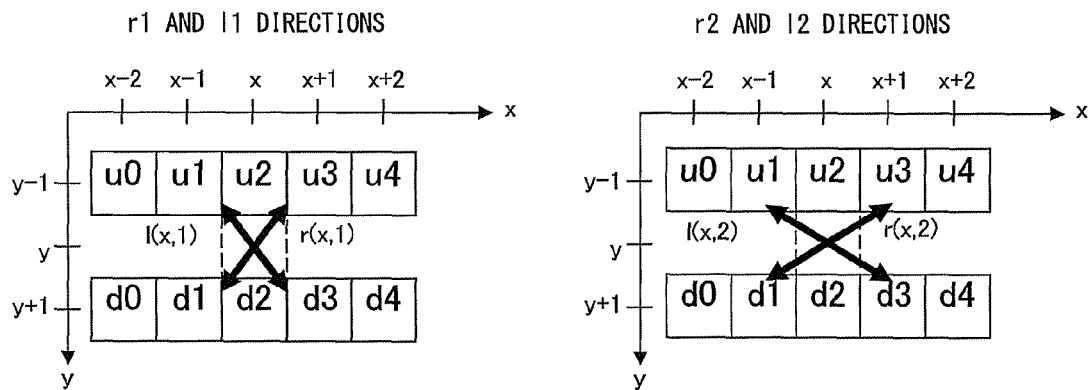
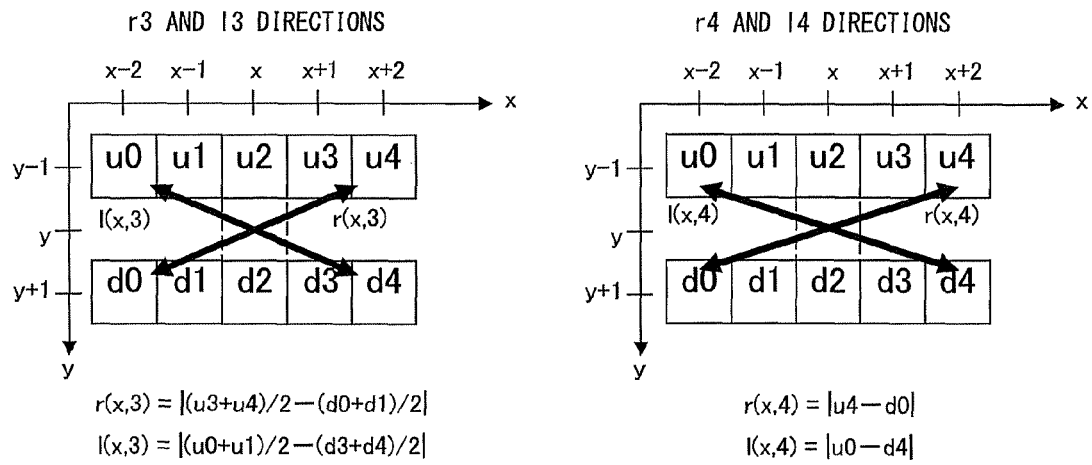
F I G. 1 1

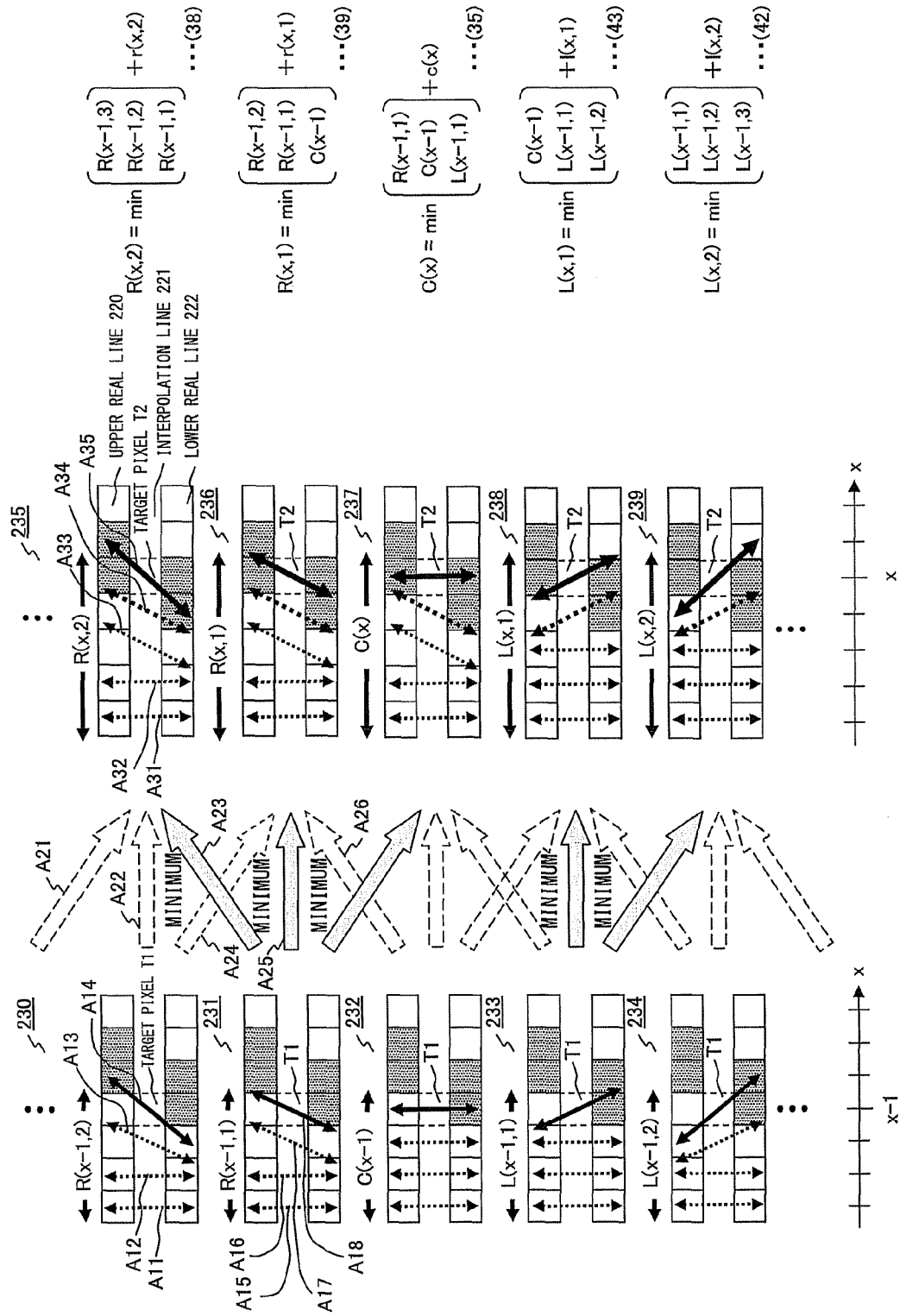
F I G. 12

ORIGINAL IMAGE P
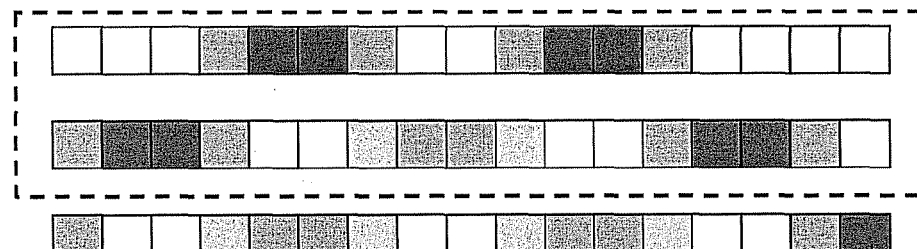
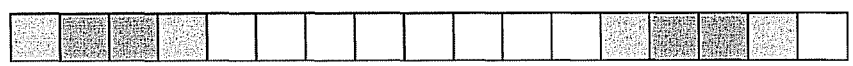
INTERLACE IMAGE I
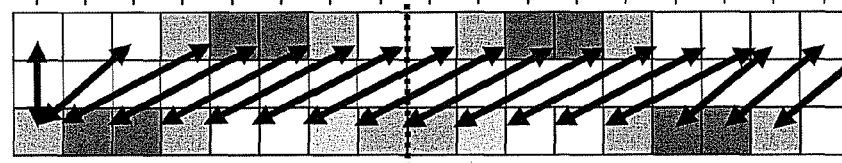
245
CHAIN-REACTING THE ERRONEOUS INTERPOLATION (CONVENTIONAL METHOD)
F I G. 1 9

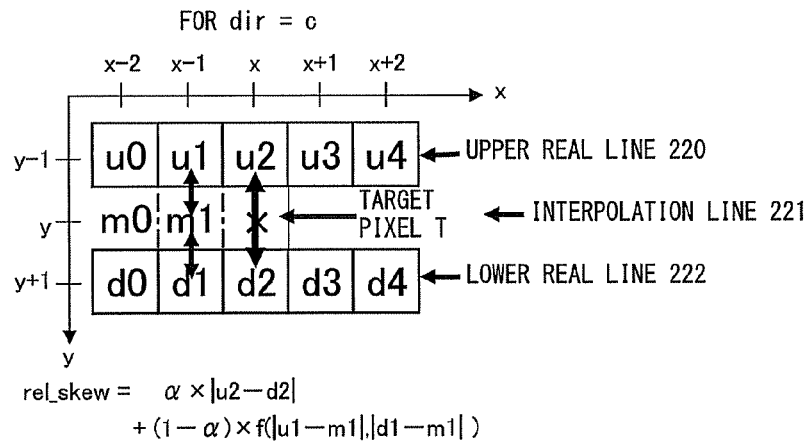
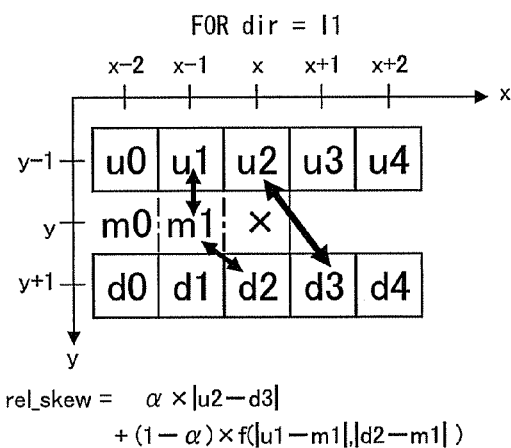
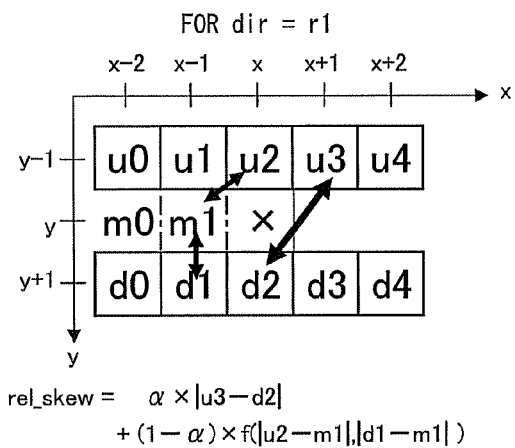
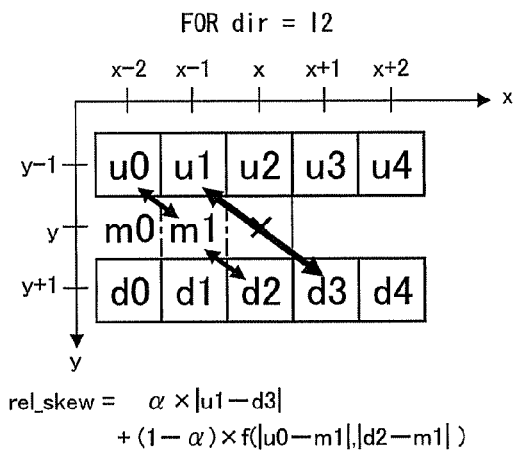
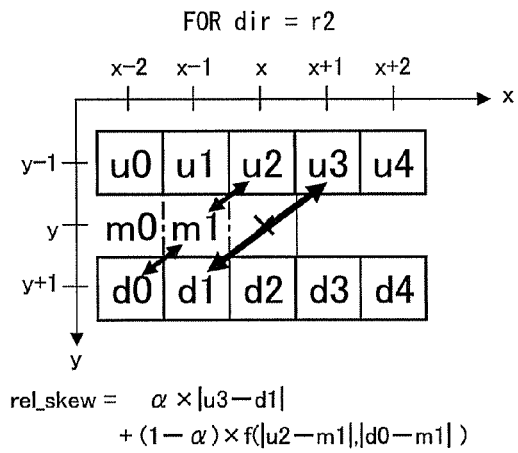
F I G. 23

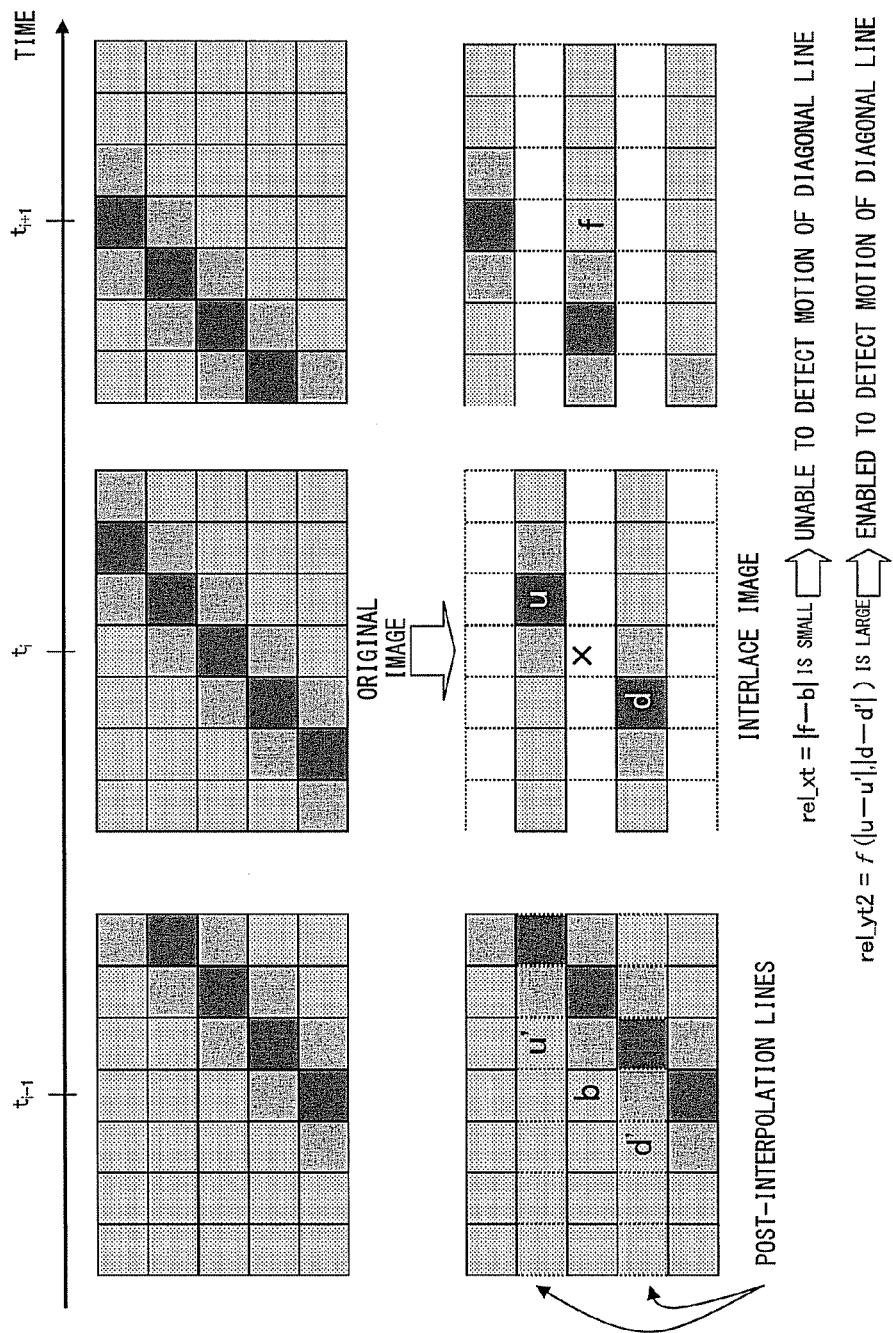
F I G. 28

PROGRAM, APPARATUS AND METHOD FOR DETERMINING INTERPOLATION METHOD

CROSS REFERENCE TO RELATED APPLICATIONS

This application is based on and hereby claims priority to Japanese Application No. 2006-350705 filed on Dec. 26, 2006, the contents of which are hereby incorporated by reference.

BACKGROUND OF THE INVENTION

1. Field of the Invention

The present invention relates to a technique for determining a method for interpolating a pixel.

2. Description of the Related Art

In an interlace/progressive (IP) conversion for converting an image of an interlace format to a progressive format and a process for enlarging a still picture or a moving picture, it is necessary to interpolate a pixel not existing in an input original image. Where a pixel to be interpolated is defined as "target pixel", a selection of a plurality of pixels for one target pixel and a calculation of the pixel value of the target pixel based on the respective pixel values of the plurality of pixels usually interpolate the target pixel.

For interpolating a pixel, there are various methods which can be categorized by a first viewpoint of how to select the plurality of pixels and a second viewpoint of how to calculate the pixel value of the target pixel from the pixel value of the selected plurality of pixels. The following outlines the techniques related to the methods for interpolating a pixel particularly in the IP conversion from the first viewpoint.

Before describing the IP conversion, an interlace method and a progressive method are first described. A scanning methods for displaying a moving picture in a display include an interlace method and a progressive method. The interlace method is a method for repeatedly alternating between a scan of only the odd numbered scan line and that of only the even numbered scan line, and the method is used for an analog input television and such. Meanwhile, the progressive method is a method for scanning all scan lines, and the method is used for a cathode ray tube (CRT) of a personal computer (PC) and the like. Further, the names "interlace" and "progressive" are also used as the names of the formats of the respective images generated so as to be displayed appropriately depending on which of the above described scan method is used.

As an example, in the case of a frame rate being thirty (30) frames per second (fps), that is, the number of frames per second is thirty, a progressive image is a moving picture consisting of thirty frames per second. In contrast, an interlace image is constituted by sixty field images per second in this case because two fields correspond to one frame. One of the two fields corresponding to one frame is called an "odd field", and the other is called an "even field". The field image of the odd field includes only the data of pixels on the odd numbered lines, and that of the even field includes only the data of pixels on the even numbered lines. Note that one scan line in a display corresponds to one line in the image. In the case of the frame rate being 30 fps, the n-th line and (n+1)-th line within one frame image correspond to the same clock time for a progressive image, while there is a shift of 1/60 seconds between the n-th line and (n+1)-th line for an interlace image.

In the following description, a line in which the data of pixels exist is called a "real line" and an empty line in which the data of pixels do not exist is called an "interpolation line". That is, the odd numbered line is a real line and the even numbered line is an interpolation line in the odd field, while they are vice versa in the even field. Also, a pixel on the real line is hereinafter called a "real pixel".

The IP conversion is a process for receiving an interlace image as input, converting it into a progressive image, and outputting the progressive image. Where the frame rate of the input interlace image is f, there are 2f field images per second. The IP conversion is a process for interpolating a pixel on an interpolation line. As a result, an image in which the data of pixels on all the lines are included is obtained for each field image. That is, a progressive image whose frame rate is 2f is obtained.

In order to obtain a progressive image with high image quality by using an IP conversion, it is necessary to detect the motion and the direction of edges in the neighborhood of a target pixel, and to interpolate the target pixel appropriately. One method for achieving such an interpolation is a motion adaptive IP conversion.

The motion adaptive IP conversion carries out an intra-field interpolation for interpolating a target pixel on the basis of the pixel values of pixels on lines existing above and below the target pixel within the same field image if a motion is detected. If a stationary state is detected on the other hand, it carries out an inter-field interpolation for interpolating a target pixel on the basis of the pixel values of pixels existing at the same position as the target pixel in the precedent and subsequent field images of the field containing the target pixel. That is, in the above-mentioned first viewpoint, the characteristic of the motion adaptive IP conversion lies in selecting pixels in the same field if a motion is detected and selecting pixels in the precedent and subsequent fields if a motion is not detected.

The motion adaptive IP conversion has an advantage, that is, a smaller process volume, while it has a disadvantage, that is, inferior accuracy in interpolation to a method, such as a motion compensation IP conversion, for interpolating by calculating a motion vector for each pixel. Due to this reason, various methods of motion adaptive IP conversions have been proposed for the purpose of improving the accuracy.

As an example, the simplest method of a motion adaptive IP conversion is the method shown in FIG. 1. In this method, the pixels positioned right above and right below of the target pixel to be interpolated are used for an intra-field interpolation if a motion is detected. In the following description, the horizontal direction is represented by the x coordinate, the vertical direction is represented by the y coordinate and each pixel is represented by a square. The x coordinate represents its value being "0" at the left edge of an image, with the value increasing as a point moves rightward, and the y coordinate represents its value being "0" at the top edge of the image, with the value increasing as a point moves downward. Referring to FIG. 1, the input interlace image includes only the lines of y=0, 2, 4 and 6, with the respective lines of y=1, 3 and 5 being interpolation lines. Accordingly, if the interlace image includes a diagonal edge as shown on the left side of FIG. 1, a post-interpolation progressive image results in generating a stepwise jagged pattern called a "jaggy" as shown on the right side of FIG. 1.

Where the position of a pixel is expressed by a pair of coordinates (x, y), the pixel at the position expressed by, for example, the coordinates (2, 3) (simply noted as "pixel of (2, 3)" or the like hereinafter) is interpolated on the basis of the white pixel existing at the right upper position (2, 2) and the black pixel existing at the right lower position (2, 4). As an example, the average value of the pixel values of the two pixels is assigned as the pixel value of the target pixel so that it is interpolated as gray. The pixel of (3, 3) is also interpolated as gray in the similar manner. As a result, a jaggy is generated in the progressive image. The other parts of the diagonal edge, that is, the parts (0, 5), (1, 5), (4, 1) and (5, 1) are also similar.

If, however, the respective pixels of the (0, 5), (2, 3) and (4, 1) were interpolated as white and the respective pixels of the (1, 5), (3, 3) and (5, 1) were interpolated as black, a progressive image including a smooth diagonal edge without a jaggy would have been obtained. That is, the method simply using the pixels at the right upper and lower positions as shown in FIG. 1 may not be able to obtain a high image quality as an interpolation result.

Accordingly, the methods noted in reference patent documents 1 through 4 have been proposed. Note that the following description has changed a part of terminologies used in the individual reference documents for an easy understanding by unifying the terminologies.

FIG. 2 is a diagram describing the interpolation method noted in the reference patent document 1. When determining a pixel existing in which direction is to be used for interpolating a target pixel T, this method utilizes also a line other than the two adjacent lines (that is, the upper adjacent line and the lower adjacent line) adjacent to the line on which the target pixel T is positioned.

Referring to FIG. 2, the target pixel T is positioned at (3, 3). With the target pixel T positioned at the center, a correlation between the pixel on the y=2 line and that on the y=4 line is calculated for several directions. For example, the vertical direction corresponds to the set of the white pixel at (3, 2) and black pixel at (3, 4), indicating a weak correlation. In contrast, the direction connecting the back pixel at (5, 2) and that at (1, 4), where the direction is shown as the diagonal line rising from left to right (noted as "uphill gradient" hereinafter) indicated by an arrow, is detected as the strongest correlation. In a similar manner, the correlation in the vertical direction indicated by another arrow is detected as a strong correlation for reference pixel R1 positioned at (3, 1), which is right above the target pixel T by two lines, and the correlation in the diagonal line rising from right to left (noted as "downhill gradient" hereinafter) indicated by another arrow is detected as a strong correlation for reference pixel R2 positioned at (3, 5), which is right below the target pixel T by two lines.

The direction of the downhill gradient detected for the reference pixel R2 is a direction opposite to the direction of the uphill gradient. In the reference patent document 1, if such an opposite direction is detected, the direction of interpolation of the target pixel T is determined to be the vertical direction, in lieu of a diagonal direction, in consideration of the consistency with a direction indicating a strong correlation in the neighborhood of the target pixel T. Note that "the interpolation direction is the vertical direction" means that the target pixel T is interpolated on the basis of pixel values of two pixels existing at (3, 2) and (3, 4) which correspond to each other in the vertical direction. Similarly, if the directions detected respectively for the reference pixel R1 and target pixel T are opposite to each other, the interpolation direction of the target pixel T is determined to be the vertical direction.

FIG. 3 is a diagram describing the interpolation method noted in the reference patent document 2. Also in the method noted therein, the pixel positioned right above the target pixel T by two lines is utilized as reference pixel R. In this method, a correlation in the uphill gradient direction is calculated by adding the correlation value in the uphill gradient direction related to the target pixel T and the correlation value in the uphill gradient direction related to the reference pixel R. This is similar for the downhill gradient direction. If the direction having a stronger correlation in the uphill and downhill gradient directions shows a stronger correlation than a predetermined threshold value, the direction is selected as the interpolation direction.

In the example of FIG. 3, the correlation of the uphill gradient direction is weak for the target pixel T and strong for the reference pixel R. Therefore, the correlation in the uphill gradation direction is judged to be relatively weak as a whole based on the sum of the two correlation values. Meanwhile, the correlation in the downhill gradient direction is strong for the target pixel T and weak for the reference pixel R. Therefore, the correlation in the downhill gradient direction is also judged to be relatively weak as a whole based on the sum of the two correlation values. As a result, the vertical direction, which is the direction indicating the strong correlation for both the target pixel T and reference pixel R, is selected as the interpolation direction for the target pixel T.

FIG. 4 is a diagram describing the interpolation method noted in the reference patent document 3. This method determines an interpolation direction on the basis of the correlation between a pair of regions including plural pixels, instead of the correlation between pixels. As an example, a region constituted by nine pixels (i.e., 3×3=9) is utilized, as shown in FIG. 4.

In the center pixel region A with the target pixel T at the center, three pixels in the top line and three pixels in the bottom line are real pixels. Likewise in the surrounding pixel region B1 existing diagonally (namely, in the downhill gradient direction) above the center pixel region A and in the surrounding pixel region B2 existing diagonally (namely, in the downhill gradient direction) below the center pixel region A, the respective top and bottom lines are real lines and the respective center lines are interpolation lines. FIG. 4 delineates only the two surrounding pixel regions B1 and B2 which are positioned symmetrically with the center pixel region A being at the center; there are actually, for example, ten surrounding pixel regions B1 through B10 in a manner to surround the center pixel region A.

For each region, the weighted sum of the pixel values of the pixels included in the region is calculated. Then, for each j, the correlation between the center pixel region A and the surrounding pixel region Bj (where j=1, 2, 3 and so on) is calculated on the basis of the respective weighed sums. As an example, the correlation in the downhill gradient direction connecting the surrounding pixel regions B1 and B2 is the sum of the correlation value between the center pixel region A and surrounding pixel region B1 and the correlation value between the center pixel region A and surrounding pixel region B2.

As such, the correlation values are calculated for the respective directions and the direction having the strongest correlation is selected as the interpolation direction. FIG. 4 shows the case in which the downhill gradient direction connecting the surrounding pixel regions B1 and B2 is selected as the interpolation direction. Then, two pixels existing in the interpolation direction starting from the target pixel T on the lines above and below the target pixel T are selected so that the target pixel T is interpolated on the basis of the pixel values of these two pixels.

FIG. 5 is a diagram describing the interpolation method noted in the reference patent document 4. The assumption for example is that the correlation between the pixel at the upper right of the target pixel T and the pixel at the lower left thereof is strong and that the direction of the uphill gradient shown in the drawing (1) is detected as the direction having the strongest correlation for the target pixel T. In contrast, for the reference pixels R1 and R2, which are adjacent to the target pixel T on the right and left, the assumption is that the direction of the downhill gradient is detected as the direction having the strongest correlation.

As such, if the direction detected as the direction having the strongest correlation for the target pixel T is reverse, in terms of left and right, to the direction detected for the reference pixel R1 or R2, then it may be an erroneous detection. In such a case, the interpolation direction for the target pixel T is modified to the vertical direction as shown in the drawing (2) for preventing the interpolation in a wrong diagonal direction.

In the case shown in the drawing (3), however, the modification to the vertical direction is inappropriate. Suppose that a straight line L is defined as a line having an uphill gradient direction detected in the drawing (1) for the target pixel T and going through the target pixel T. Also suppose that reference pixels R3 and R4 are defined as respective pixels at intersection points where respective interpolation lines, which are positioned above and below an interpolation line on which the target pixel T is positioned, and the straight line L cross. If the same direction as the inclination of the straight line L is detected as the direction having the strongest correlation for the reference pixels R3 or R4, the interpolation direction for the target pixel T is re-modified to the original uphill gradient direction as shown in the drawing (4).

The methods described above are different in various ways in terms of in which direction starting from the target pixel the pixels are to be selected as an interpolation-use pixel; they are, however, the same in terms of considering the pixels surrounding the target pixel. The problem is that there is a kind of image in which an interpolation direction is apt to be detected wrongly even with such a consideration of the pixels surrounding a target pixel.

FIG. 6 exemplifies such an image in which a narrow diagonal line such as a string exists in a flat background. In FIG. 6, a black narrow line exists in an uphill gradient direction in a white background. As an example, the pixel positioned at the position (3, 3) on the interpolation line is on the black line and therefore it is desired to be interpolated as black.

Where the pixel of (3, 3) is defined as the target pixel, black pixels exist at both (4, 2) and (2, 4) and therefore the correlation is strong in an uphill gradient direction, that is, in the same direction as the black line. Meanwhile, this black line is so fine that the correlation between pixels existing at (2, 2) and (4, 4), both of the pixels belonging to the white background, is also strong. That is, the correlations in both the uphill gradient direction and downhill gradient direction are about the same for the target pixel at (3, 3). This fact is similar for other pixels to be interpolated as black on interpolation lines.

Incidentally, there are many cases where a general image includes some pixels with a little different pixel values while the pixels look like the same color. As a result of being such a slight difference in pixel values, the detection may possibly be such that the correlation is the strongest in the uphill gradient direction at, for example, (3, 3) and that the correlation is the strongest in the downhill gradient direction at (5, 1). This causes the black line to be correctly interpolated at (3, 3), while it is interpolated as the color of background (namely, white) at (5, 1), resulting in the black line being interrupted thereat.

That is, the use, for interpolation, of a pixel existing in a direction having the strongest correlation for a target pixel may result in erring the interpolation direction, thus generating an unclean image containing a broken line as shown in FIG. 6. Further, even with the use of a method, such as the reference patent documents 1 through 4, considering the surrounding pixels, the interpolation direction may be erroneously selected because the direction detected as a direction having the strongest for the target pixel is opposite to the direction detected as a direction having the strongest correlation for the surrounding pixel in an image as shown in FIG. 6.

Patent document 1: Laid-Open Japanese Patent Application Publication No. 2003-230109

Patent document 2: WO 2004/017634

Patent document 3: Laid-Open Japanese Patent Application Publication No. 2005-341337

Patent document 4: Laid-Open Japanese Patent Application Publication No. 2003-143555

As noted above, several methods have been proposed for the motion adaptive IP conversion, there is, however, a room for improvement in the selection of pixels used for interpolation. Further, the determination method for an interpolation method, that is, the determination method for determining how to interpolate a pixel and determining which pixels to be used for interpolation, is applicable to a general interpolation of a pixel in lieu of being limited to the motion adaptive IP conversion.

SUMMARY OF THE INVENTION

The purpose of the present invention is to provide a program, apparatus and method which are for determining an interpolation method for interpolating a pixel not existing in an input image so as to obtain a result of interpolation attaining a high image quality.

An interpolation method determination program provided by one aspect of the present invention is a program for making a computer execute a process for determining an interpolation method for interpolating respective pixel values of plural pixels which do not exist in an input image and which are positioned on a straight line. The interpolation method determination program may be provided by being stored in a computer readable storage medium.

The process comprises: a target pixel selection step for selecting, sequentially in accordance with a designated selection sequence direction, one pixel from among the plural pixels as a target pixel for which the interpolation method needs to be determined; a local correlation value calculation step for calculating a local correlation value for each one of designated plural correlation calculation directions on the basis of both a pixel value of a first pixel existing in the one of the plural correlation calculation directions viewed from the target pixel and a pixel value of a second pixel existing in a direction opposite to the one of the plural correlation calculation directions viewed from the target pixel; an cumulative correlation value calculation step for calculating a cumulative correlation value, the cumulative correlation value being a correlation value to be calculated for each of the plural pixels sequentially one after another in accordance with the selection sequence direction starting from a head pixel based on a value given to the head pixel, the head pixel being a pixel at the head of a sequence in accordance with the selection sequence direction among the plural pixels, and the cumulative correlation value calculation step comprising calculating the cumulative correlation value for each one of the plural correlation calculation directions in relation to the target pixel on the basis of both the local correlation value corresponding to the one of the plural correlation calculation directions and the cumulative correlation value related to a prior pixel selected in the selection step immediately prior to selecting the target pixel; a direction selection step for selecting one of the plural correlation calculation directions on the basis of the cumulative correlation values corresponding to the respective plural correlation calculation directions; and an interpolation-use pixel determination step for determining plural pixels used for interpolating the target pixel on the basis of at least either of the local correlation value and the cumulative correlation value which correspond to the correlation calculation direction selected in the direction selection step.

An interpolation method determination apparatus provided by another aspect of the present invention is an apparatus performing the aforementioned process, and an interpolation method determination method provided by yet another aspect of the present invention is a method executed by the aforementioned computer.

Embodiments of the present invention are configured to determine an interpolation method for a target pixel in consideration of not only a local correlation value but also a cumulative correlation value, thereby enabling an interpolation reflecting a global trend of the correlation in wider range, not just in the neighborhood of the target pixel.

There may be the case of performing an inappropriate interpolation, for a certain kind of image, as a result of determining an interpolation method on the basis of only a local correlation. The determination of an interpolation method for a target pixel according to an embodiment of the present invention, however, enables an interpolation reflecting a global trend of a correlation, thus obtaining a good interpolation result even for such kind of image.

BRIEF DESCRIPTION OF THE DRAWINGS

FIG. 5 is a diagram describing the interpolation method noted in the reference patent document 4;

FIG. 10 is the flow chart of an interpolation process according to the first embodiment;

FIG. 11 is a diagram describing local correlation values according to the first embodiment;

FIG. 12 is a diagram describing a specific example of the calculation of cumulative correlation values according to the first embodiment;

FIG. 19 exemplifies a conventional interpolation chain-reacting erroneous interpolations;

FIG. 23 is a diagram describing how to calculate a spatial correlation value rel_skew considering a post-interpolation pixel according to the second embodiment;

FIG. 28 is a diagram describing the characteristic of the temporal correlation values rel_xt and rel_yt in an image in which a diagonal line moves fast;

DESCRIPTION OF THE EMBODIMENTS

The following is a detailed description of the embodiments of the present invention by referring to the accompanying drawings. The descriptions are provided in order of: the common principle of first and second embodiments, the first embodiment, the second embodiment and a modified embodiment.

Figure 7:
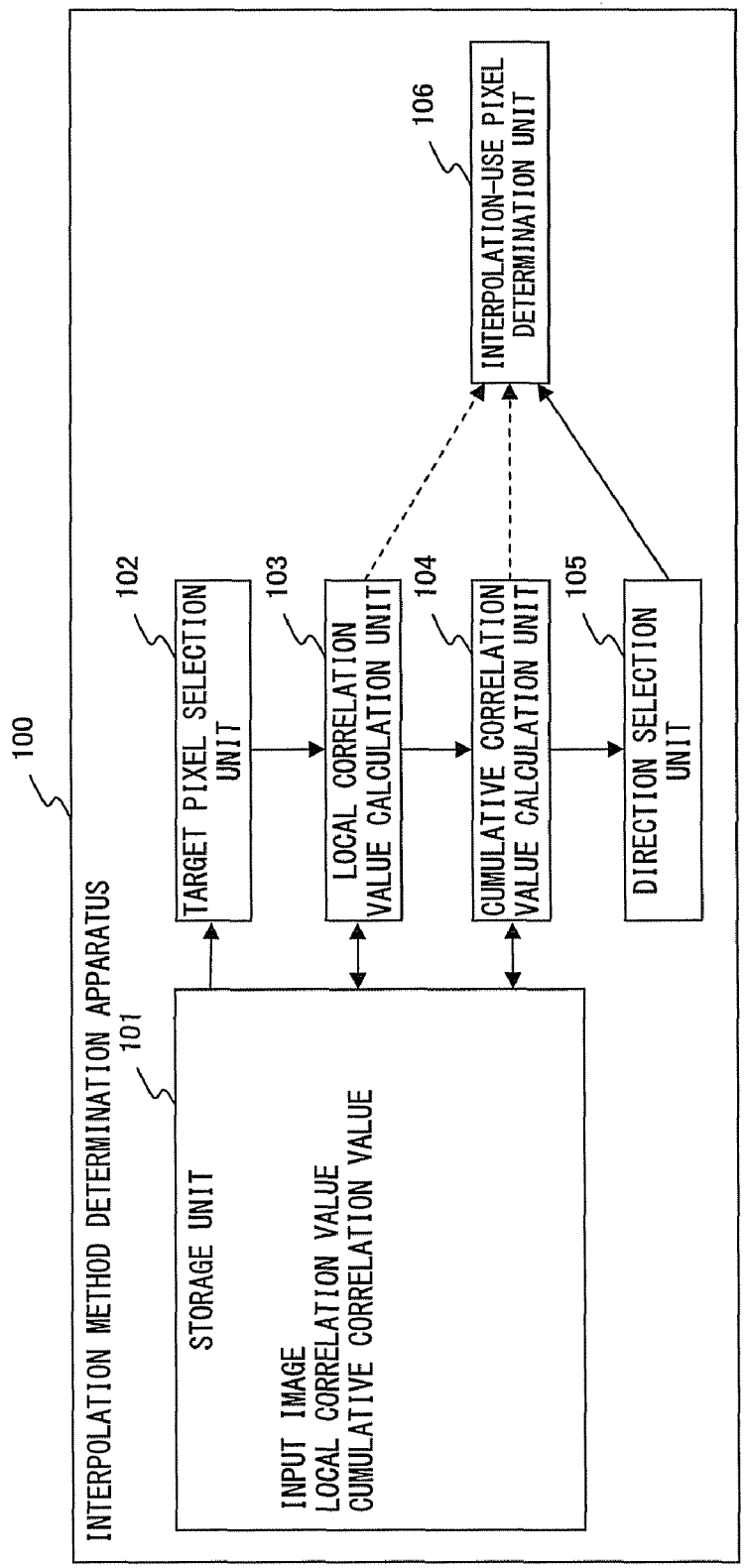
FIG. 7 is a functional block configuration diagram showing the common principle of first and second embodiments.
Figure 8:
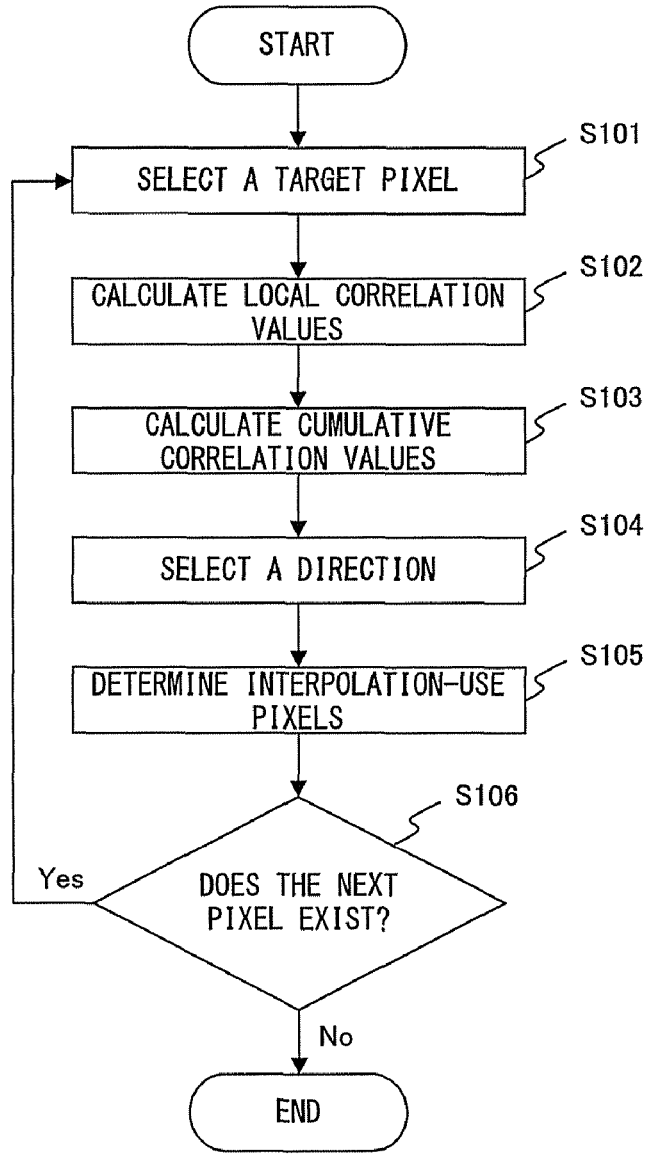
FIG. 8 is the flow chart showing the common principle of first and second embodiments.

To begin with, the common principle of the first and second embodiments is described by referring to FIGS. 7 and 8.

FIG. 7 is a functional block configuration diagram showing the common principle of the first and second embodiments; and FIG. 8 is the flow chart showing the common principle of the first and second embodiments.

An interpolation method determination apparatus 100, being an apparatus determining an interpolation method for interpolating a pixel value, comprises a storage unit 101, a target pixel selection unit 102, a local correlation value calculation unit 103, a cumulative correlation value calculation unit 104, a direction selection unit 105 and an interpolation-use pixel determination unit 106.

An input to the interpolation method determination apparatus 100 is an input image for which pixels are to be interpolated and the input image is stored in the storage unit 101. A desired image is obtained by interpolating each pixel in accordance with an interpolation method determined by the interpolation method determination apparatus 100. As an example, if the input image is an interlace image which is the subject of an IP conversion, a progressive image is obtained by performing an interpolation. Alternatively, if the input image is a still picture or moving picture which is the target of an enlargement process, an enlarged image is obtained by performing an interpolation.

The storage unit 101 stores the input image, and a local correlation value and a cumulative correlation value, both of which are described later. Having received an input image, the interpolation method determination apparatus 100 performs an interpolation method determination process as shown in FIG. 8, that is, repeats the loop of the steps S101 through S106.

In the step S101, the target pixel selection unit 102 selects a target pixel to be interpolated from the input image. By repeating the processes in the loop of the steps S101 through S106, plural pixels are sequentially selected as the target pixel one after another.

Next in the step S102, the local correlation value calculation unit 103 calculates local correlation values for the target pixel selected in the step S101 and stores the local correlation values in the storage unit 101. For one target pixel, plural local correlation values corresponding to the respective plural directions are calculated. Those directions are called "correlation calculation directions" in the following description.

Next in the step S103, the cumulative correlation value calculation unit 104 calculates cumulative correlation values for the target pixel selected in the step S101 and stores the cumulative correlation values in the storage unit 101. Similar to the local correlation value, plural cumulative correlation values corresponding to the respective correlation calculation directions are calculated for one target pixel. The cumulative correlation value is calculated on the basis of both the cumulative correlation values, which have been calculated in the step S103 of the previous loop and stored in the storage unit 101, and the local correlation value which has been calculated in the immediately previous step S102 and stored in the storage unit 101.

Next in the step S104, the direction selection unit 105 selects one of plural correlation calculation directions on the basis of the plural cumulative correlation values calculated in the step S103. As an example, a correlation calculation direction corresponding to a cumulative correlation value indicating the strongest correlation is selected.

Next in the step S105, the interpolation-use pixel determination unit 106 determines plural pixels to be used for interpolating the target pixel. In the following description, the pixels for interpolating a target pixel is called as "interpolation-use pixels". The interpolation-use pixels are determined on the basis of at least either the local correlation value or cumulative correlation value corresponding to the direction selected in the step S104. The determination in the step S105 may utilize only one of the local correlation value and cumulative correlation value or both of them. This is expressed in FIG. 7 by using the two dotted line arrows directed from both the local correlation value calculation unit 103 and cumulative correlation value calculation unit 104 to the interpolation-use pixel determination unit 106.

Next in the step S106, the target pixel selection unit 102 judges whether or not a pixel to be interpolated next still remains. If it remains, the judgment is "yes" and the process returns to the step S101, while if it does not remain, the judgment is "no" and the process ends.

The repetition of the steps S101 through S106 as described above determines the interpolation-use pixels for all the pixels to be interpolated. As an example, if the input image is an interlace image, horizontal real lines and horizontal interpolation lines are lined up alternately in the interlace image. Therefore, a pre-designation of a sequence, for example, "target pixels should be sequentially selected from the left to right in the repetition of the step S101" realizes selecting all pixels on an interpolation line sequentially from the left to right and determining the interpolation-use pixels for each target pixel. The direction such as "from the left to right" for expressing the designated sequence as described above is called as "selection sequence direction" in the following description. Since the steps S101 through S106 are carried out repeatedly in accordance with the selection sequence direction, the cumulative correlation value is also accumulated in accordance with the selection sequence direction.

Incidentally, the method for interpolating a pixel can be categorized by a combination of the first viewpoint, that is, how to select plural interpolation-use pixels for one target pixel and the second viewpoint, that is, how to calculate the pixel value of a target pixel from the pixel values of the selected plural interpolation-use pixels as described above. The operation of the interpolation method determination apparatus 100 described above is related to the first viewpoint. That is, it is possible to select a discretionary method from among plural methods, which are different from the second viewpoint, and to apply it to each embodiment.

As an example, the simplest method in terms of the second viewpoint is a method for assigning the arithmetic mean of the pixel values of the determined plural interpolation-use pixels to a target pixel as its pixel value, that is, setting the pixel value of the target pixel to be the arithmetic mean. Note that the application of the method to the process of FIG. 8 means that "the arithmetic mean of the pixel values of the plural interpolation-use pixels determined in the step S105 is calculated, the calculated value is assigned, as the pixel value, to the target pixel and the target pixel is interpolated".

Incidentally, the storage unit 101 as one of the functional blocks shown in FIG. 7 is implemented by hardware such as volatile memory, rewritable nonvolatile memory and the like, while other functional blocks may be implemented by any of hardware, software, firmware and the combination of these. As an example, the individual functional blocks may be implemented by respectively separate pieces of hardware. Alternatively, plural functional blocks may be implemented by the hardware common to those functional blocks and the software implementing those functions. Of course, the interpolation method determination apparatus 100 may be implemented by a common computer as described later.

Next is a description of the first embodiment of the present invention by referring to FIGS. 9 through 20. The first description is of the assumption for the first embodiment and the definition of terminologies.

(a) The first embodiment is configured to interpolate pixels for an IP conversion.

(b) Field images at the clock time $t=t_1, t_2, t_3$ through $t_i$ and so on are given as input images. As an example, if the frame rate is 30 fps, the time period between the clock time $t_i$ and $t_{i+1}$ is 1/60 seconds. Meanwhile, the field image at the clock time $t_i$ is expressed by the sign $F_i$. In the following description, the field image corresponding to each clock time is sometimes called an "input field image".

(c) The following specification is described by exemplifying the case of interpolating pixels within the field image $F_i$ at the clock time $t=t_i$. Further, the field image $F_i$ is also called a "target field image".

(d) A field image $F_{i-1}$ at the clock time $t=t_{i-1}$, immediately prior to the target field image $F_i$ is called a "precedent field image", and a field image $F_{i+1}$ at the clock time $t=t_{i+1}$ immediately after the target field image $F_i$ is called a "subsequent field image". If the target field image $F_i$ is an even field image, the precedent field image $F_{i-1}$ and subsequent field image $F_{i+1}$ are odd field images. If the target field image $F_i$ is an odd field image, the precedent field image $F_{i-1}$ and subsequent field image $F_{i+1}$ are the even field images.

(e) Each pixel is expressed by one pixel value, with the pixel value being assumed to be an integer in the range of 0 and 100. The assumption is that pixel value 0 represents black, the pixel value 100 represents white and an intermediate pixel value represents gray. The assumption is for an easy comprehension by providing a simple description. Interpolation for a color image is described later as a modified embodiment.

(f) The position of a pixel within an image is expressed by a pair of coordinates (x,y). The x axis is the horizontal axis and the y axis is the vertical axis. On the x axis the value is "0" at the left edge of an image, with the value increasing as position moves rightward, and on the y axis the value is "0" at the top edge, with the value increasing as position moves downward. Further, the coordinate is represented by the number of pixels. Therefore, the respective values of x and y representing the position of each pixel are nonnegative integer.

(g) The pixel value of a real pixel existing at (x,y) within a field image $F_j$ corresponding to the clock time $t_j$ is expressed by p(j,x,y).

(h) A selection sequence direction is the direction of "from left to right" for each one interpolation line.

(i) An interpolation method is determined in sequence of "downward from the top" for all interpolation lines. The sequence of "downward from the top" is unrelated to a selection sequence direction.

(j) The size of an input image, that is, the size of each field image, is assumed to be the size of N (pieces of) pixels in the horizontal direction and of M (pieces of) pixels in the vertical direction. That is, $0 \leq x \leq N-1$ and $0 \leq y \leq M-1$.

Figure 9:
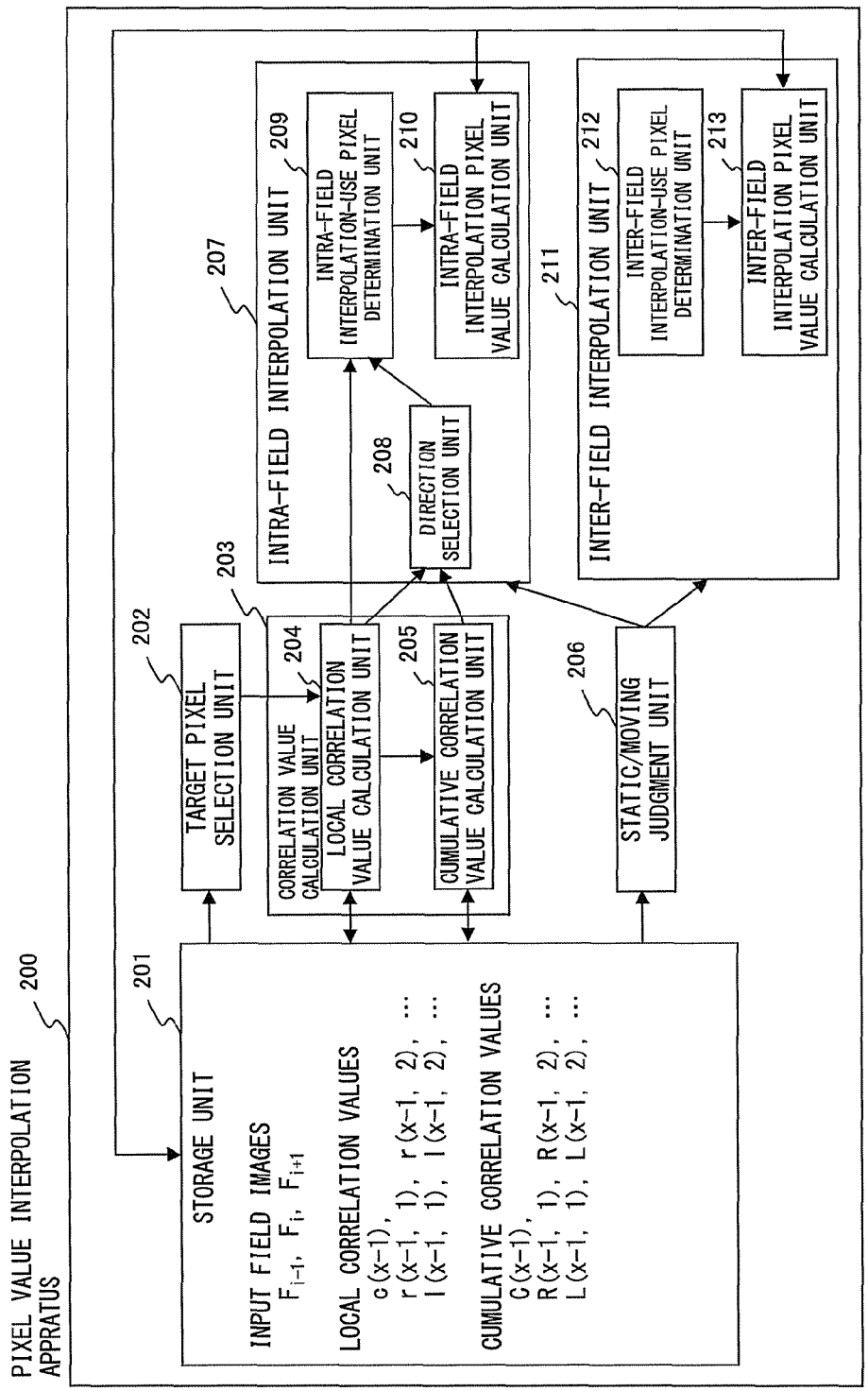
FIG. 9 is the functional block configuration diagram of a pixel value interpolation apparatus according to the first embodiment.

Next is a brief description of the functional block configuration of a pixel value interpolation apparatus 200 according to the first embodiment by referring to FIG. 9. The functions of the respective constituent components shown in FIG. 9 are described in detail later along with a flow chart.

The pixel value interpolation apparatus 200 shown in FIG. 9 is one of specific examples of the interpolation method determination apparatuses 100 shown in FIG. 7. The pixel value interpolation apparatus 200 not only determines an interpolation method for a pixel value but also interpolates the pixel value on the basis of the determined method, and is therefore named differently from the interpolation method determination apparatuses 100. The pixel value interpolation apparatus 200 comprises a storage unit 201, a target pixel selection unit 202, a correlation value calculation unit 203, a static/moving judgment unit 206, an intra-field interpolation unit 207 and an inter-field interpolation unit 211. The correlation value calculation unit 203 comprises a local correlation value calculation unit 204 and a cumulative correlation value calculation unit 205; the intra-field interpolation unit 207 comprises a direction selection unit 208, an intra-field interpolation-use pixel determination unit 209 and an intra-field interpolation pixel value calculation unit 210; and the inter-field interpolation unit 211 comprises an inter-field interpolation-use pixel determination unit 212 and an inter-field interpolation pixel value calculation unit 213. The present embodiment is configured to store an interpolated image in the storage unit 201. This procedure is expressed by the arrows pointing at the storage unit 201 from the intra-field interpolation pixel value calculation unit 210 and inter-field interpolation pixel value calculation unit 213.

The pixel value interpolation apparatus 200 shown in FIG. 9 comprises constituent components specifying the respective constituent components of the interpolation method determination apparatus 100 of FIG. 7 and further comprises constituent component not included in the configuration shown in FIG. 7. The relationship between FIGS. 7 and 9 is as follows.

The storage unit 201 is similar to the storage unit 101, and FIG. 9 shows the storage contents further specifically than FIG. 7. The target pixel selection unit 202 corresponds to the target pixel selection unit 102, with the selection sequence direction being specified for the former. The local correlation value calculation unit 204 and cumulative correlation value calculation unit 205 correspond to the local correlation value calculation unit 103 and cumulative correlation value calculation unit 104, respectively, with the calculation formulae of the local correlation value and cumulative correlation value being specified for the former two components. The direction selection unit 208 corresponds to the direction selection unit 105, with a criterion for a selection being specified for the former. The intra-field interpolation-use pixel determination unit 209 corresponds to the interpolation-use pixel determination unit 106 with the procedure of determining an interpolation-use pixel being specified for the former.

Next is a description of an interpolation process carried out by the pixel value interpolation apparatus 200 according to the first embodiment by referring to a flowchart shown in FIG. 10. The interpolation process includes an interpolation method determination process for determining an interpolation method for a pixel value and a process for interpolating the pixel value in accordance with the determination. The process shown in FIG. 10 is a more detailed example of the process of FIG. 8.

In the step S201, the target pixel selection unit 202 initializes variables x and y. The variables x and y are those indicating the x and y coordinates of a target pixel. That is, the target pixel selection unit 202 selects a target pixel by setting the values of the variables x and y.

In order to implement the operations in accordance with the above noted assumptions (f), (h) and (i), the target pixel selection unit 202 substitutes both "0" for the variable x and an "ofst" of a value corresponding to a clock time $t_i$ for the variable y in the step 201. The value of the ofst is "1" if the clock time $t_i$ corresponds to an even field and "0" if it corresponds to an odd field. That is, if the clock time $t_i$ corresponds to an even field, the y coordinate of the interpolation line is an odd number and therefore an odd number "1" is substituted for the variable y. In contrast, if the clock time $t_i$ corresponds to an odd field, the y coordinate of the interpolation line is an even number and therefore an even number "0" is substituted for the variable y. After the initialization, the process proceeds to the step S202.

The steps S202 through S209 are in double loops. The outside loop is that for processing interpolation lines sequentially one by one downward from the top, which is related to the assumption (i) noted above. The inside loop is that for processing target pixels sequentially one by one from left to right on one interpolation line, which is related to the assumption (h).

In the step S202, the target pixel selection unit 202 judges whether or not the position (x,y) of the target pixel is lower than the bottom edge of the image. It is possible to judge by comparing between the variable y and the constant value M because of the assumptions (i) and (j). The judgment result is "yes" if the comparison result is $y \geq M$, or "no" if it is $y \leq M-1$. If the judgment result is "yes", meaning that the process is complete for all interpolation lines, the interpolation process shown in FIG. 10 ends. If the judgment result is "no", meaning that at least one interpolation line to be processed still remains, the process proceeds to the step S203.

In the step S203, the target pixel selection unit 202 judges whether or not the position (x,y) of the target pixel is further rightward than the right edge of the image. A judgment is possible by comparing between the variable x and the constant value N because of the assumptions (h) and (j). The judgment result is "yes" if the comparison result is $x \geq N$ or "no" if it is $x \leq N-1$. If the judgment result is "yes", meaning that the process is complete for all pixels on the present (i.e., currently processed) interpolation line, the process proceeds to the step S209 for shifting to the next interpolation line. If the judgment result is "no", meaning that at least one pixel to be processed still remains on the present interpolation line, the process proceeds to the step S204.

In the step S204, the correlation value calculation unit 203 calculates correlation values for the target pixel positioned at (x, y). Specifically, the local correlation value calculation unit 204 calculates local correlation values while the cumulative correlation value calculation unit 205 calculates cumulative correlation values. Both the local correlation values and cumulative correlation values are stored in the storage unit 201. The calculation method is described in detail later.

In the step S205 following the step S204, the static/moving judgment unit 206 performs a static/moving judgment, that is, it judges whether or not there is a motion at the position expressed by a pair of coordinates (x,y) or in its neighborhood at the clock time $t_i$. A specific method for the static/moving judgment is arbitrary.

In general, a static/moving judgment for the target pixel positioned at (x,y) in a target field image $F_i$ utilizes the precedent field image $F_{i-1}$ and subsequent field image $F_{i+1}$. As an example, a static/moving judgment may be carried out by comparing the pixel values p1 and p2 of the respective real pixels existing at the same position expressed by the coordinates (x,y) in the precedent field image $F_{i-1}$, and subsequent field image $F_{i+1}$. The pixel values p1 and p2 can be represented by the following expressions (1) and (2) in accordance with the notation as noted in the above paragraph (g):

$$p1 = p(i-1, x, y) \quad (1)$$

$$p2 = p(i+1, x, y) \quad (2)$$

As an example, the static/moving judgment unit 206 may judge that the target pixel is moving if the $\Delta p$ represented by the following expression (3) exceeds a predefined threshold value pt or that the target pixel is static if the $\Delta p$ is no greater than the threshold value pt:

$$\Delta p = |p2 - p1| \quad (3)$$

Further, the static/moving judgment may use one or more pixels positioned in the neighborhood of the coordinates (x, y). Note that, if the subsequent field image $F_{i+1}$ is used for the static/moving judgment as noted above, the process shown in FIG. 10 for the target field image $F_i$ is started after a subsequent field image $F_{i+1}$ is input to the pixel value interpolation apparatus 200 at the clock time $t_{i+1}$. Further, the precedent field image $F_{i-1}$ needs to be kept stored in the storage unit 201, instead of being erased, until at least the completion of the process for the target field image $F_i$ shown in FIG. 10 for performing the static/moving judgment.

If the target pixel is judged to be moving as a result of the static/moving judgment, that is, if a motion is detected, the process proceeds to the step S206, while if it is judged to be static, the process proceeds to the step S207.

The step S206 is the process in the case of a motion being detected in the static/moving judgment. In this case, it is preferable to interpolate the target pixel by utilizing one or more pixels positioned in the neighborhood of the target pixel within the target field image $F_i$. Therefore, the intra-field interpolation unit 207 interpolates the target pixel by an intra-field interpolation in the step S206, followed by shifting to the step S208. The process in the step S206 is described later in detail with reference to FIG. 14.

The step S207 is the process when the target pixel is judged to be static in the static/moving judgment. For example, according to a certain method for a static/moving judgment, the target pixel is judged to be static if the $\Delta p$ of the expression (3) is no greater than the predefined threshold value pt. In this case, the pixel value of the pixel at (x, y) can be deemed to have changed little during the period from the clock time $t_{i-1}$ to clock time $t_{i+1}$. That is, it can be regarded that the pixel values p1 and p2 scarcely differ from each other. Thus, the pixel value at the clock time $t_i$, which is within the above-mentioned period, also can be regarded as a value which is substantially same as the pixel values p1 and p2. Based on this, in the step S207, the inter-field interpolation unit 211 performs the process for assigning the target pixel a value such as (p1+p2)/2, p1, p2 or a value of the result of internally dividing the p1 and p2 by an appropriate ratio, as the pixel value of the target pixel.

That is, the inter-field interpolation-use pixel determination unit 212 selects, for example, two real pixels existing at the same position expressed by the coordinates (x, y) respectively in the precedent field image $F_i$ and subsequent field image $F_{i+1}$ as interpolation-use pixels to be used for an inter-field interpolation, followed by the inter-field interpolation pixel value calculation unit 213 calculating a pixel value to be assigned to the target pixel on the basis of the pixel values of those selected interpolation-use pixels. Then, the process proceeds to the step S208 upon completion of these processes.

In the step S208, the target pixel selection unit 202 adds "1" to the variable x. That is, the target pixel selection unit 202 selects, as a new target pixel, a pixel adjacent to the right of the present target pixel (namely, the current target pixel) which has been interpolated in the step S206 or S207. Then the process returns to the step S203.

The step S209 is carried out at the end of one interpolation line, and here the subject of the process shifts to the next interpolation line. That is, the target pixel selection unit 202 substitutes "0" for the variable x and adds "2" to the variable y. Since the interpolation lines and real lines exist alternately in the interlace image, it is "2", not "1", which is added to the variable y. With this procedure, the pixel at the left edge of the next interpolation line is selected as a new target pixel. Then the process returns to the step S202.

As a result of the process as described above, all the pixels on all the interpolation lines included in the target field image $F_i$ are interpolated.

Next is a description of local correlation values calculated in the step S204 of FIG. 10 by referring to FIG. 11. As described for the step S102 shown in FIG. 8, the local correlation values are calculated for plural correlation calculation directions for one target pixel. FIG. 11 is a diagram exemplifying plural correlation calculation directions and describing the calculation method for local correlation values corresponding to the correlation calculation directions.

The local correlation value is a value indicating the strength of correlation between two groups, each group comprising one pixel or more and the two groups being positioned symmetrically in relation to a target pixel T being sandwiched in between. Then, the relative position between each group and the target pixel T is determined by the correlation calculation direction, and local correlation values are calculated for the plural correlation calculation directions, respectively. The first embodiment is configured such that each group is constituted by one or two pixels. Further, the strength of correlation between groups is calculated on the basis of the pixel value of pixel(s) constituting each group.

FIG. 11 shows the state in which the pixel positioned at the coordinates (x, y) of a target field image $F_i$ is selected as a target pixel T. FIG. 11 shows the target pixel T and a total of ten real pixels positioned in the neighborhood of the target pixel T, the ten real pixels being on the two real lines 220 and 222 above and below the interpolation line 221 on which the target pixel T is positioned. The local correlation value is calculated on the basis of the pixel values of these real pixels. FIG. 11 further delineates nine correlation calculation directions for the target pixel T. First, the terminology and notation for description are defined as follows:

The nine correlation calculation directions are called as c direction, r1 direction, r2 direction, r3 direction, r4 direction, l1 direction, l2 direction, l3 direction and l4 direction.

The real lines above and below the interpolation line are respectively called as "upper real line" and "lower real line" which are referred to by the respective signs "220" and "222".

The pixels existing at the coordinates (x−2,y−1), (x−1,y−1), (x,y−1), (x+1,y−1) and (x+2,y−1) on the upper real line 220 are respectively referred to by the signs u0, u1, u2, u3 and u4.

The pixels existing at the coordinates (x−2,y+1), (x−1,y+1), (x,y+1), (x+1,y+1) and (x+2,y+1) on the lower real line 222 are respectively referred to by the signs d0, d1, d2, d3 and d4.

The pixel values of the ten real pixels are represented by the same signs as those of the respective pixels. For example, the pixel value of the pixel u0 is represented by "u0". Therefore, they are defined as the following expressions (4) through (13):

$$u0 = p(i, x-2, y-1) \quad (4)$$

$$u1 = p(i, x-1, y-1) \quad (5)$$

$$u2 = p(i, x, y-1) \quad (6)$$

$$u3 = p(i, x+1, y-1) \quad (7)$$

$$u4 = p(i, x+2, y-1) \quad (8)$$

$$d0 = p(i, x-2, y+1) \quad (9)$$

$$d1 = p(i, x-1, y+1) \quad (10)$$

$$d2 = p(i, x, y+1) \quad (11)$$

$$d3 = p(i, x+1, y+1) \quad (12)$$

$$d4 = p(i, x+2, y+1) \quad (13)$$

First is a description of the c direction. The local correlation value c (i, x, y), corresponding to the c direction, of the target pixel T positioned at the coordinates (x, y) of the target field image $F_i$ is calculated in accordance with the following expression (14):

$$c(i,x,y) = |p(i,x,y-1) - p(i,x,y+1)| = |u2 - d2| \quad (14)$$

The c direction is the vertically above direction. Therefore, the pixel value u2 of the pixel u2 existing in the vertically above direction of the target pixel T on the upper real line 220 is utilized for calculating the local correlation value c(i, x, y). Further, the pixel value d2 of the pixel d2 existing at a position symmetrical with the pixel u2 with the target pixel being at the center is also utilized for calculating the local correlation value c (i, x, y). Expressing the position of the pixel d2 in other words, it is the pixel existing in the vertically below direction which is opposite to the c direction viewed from the target pixel T and existing on the lower real line 222.

As represented by the expression (14), the local correlation value c(i, x, y) of the target pixel T corresponding to the c direction is the absolute value of the difference between the pixel values u2 and d2, indicating the strength of the correlation between the pixels u2 and d2. Note that the local correlation value decreases with the strength of correlation, that is, with the magnitude of correlation.

Here, focusing on a certain interpolation line within a certain target field image $F_i$, the values of i and y are constant, and only the value of x changes with the selections of target pixels T sequentially from the left to right. Accordingly, introducing a simplified notation by removing the variables i and y from the expression (4), the local correlation value of the c direction is represented by the c(x) of the expression (15) in the following description:

$$c(x) = |u2 - d2| \quad (15)$$

Next is a description of the r1 direction. The local correlation value r(x, 1) of a target pixel T corresponding to the r1 direction is calculated by the following expression (16). Note that the second argument "1" of the r(x, 1) corresponds to the "1" of "r1 direction".

$$r(x,1) = |(u2+u3)/2 - (d1+d2)/2| \quad (16)$$

The r1 direction represents a "right-upward direction". The words "right-upward direction" generally represents a large width of concept including a right upward direction of various inclinations, whereas the r1 direction is a right-upward direction with a specific inclination which is the inclination, i.e., "rightward by half a pixel and upward by one pixel". Applicable to the r1 direction of the target pixel T on the upper real line 220 is the border between the pixels u2 and u3. Likewise, the direction opposite to the r1 is the left-downward direction with the inclination of "leftward by half a pixel, downward by one pixel". Then, the applicable to the direction opposite to the r1 viewed from the target pixel T on the lower real line 222 is the border between the pixels d1 and d2.

Meanwhile, where a group consisting of the pixels u2 and u3 is referred to by the sign "U2_3", the middle point of the group U2_3 is a position in the r1 direction of the target pixel T on the upper real line 220. Further, where a group consisting of the pixels d1 and d2 is referred to by the sign "D12", the middle point of the group D1_2 is a position in the direction opposite to the r1 direction viewed from the target pixel T on the lower real line 222. The distance between these middle points in the x direction is "1". The "1" of the name "r1 direction" corresponds to the distance "1".

Here, let it be assumed that the average of the pixel values u2 and u3 is assigned as the pixel value which represents the group U2_3, with the average between the pixel values d1 and d2 being assigned as the pixel value which represents the group D1_2. Further assumed is that these pixel values are referred to by the same sign as the group. Then, the right side of the expression (16) represents the absolute value of the difference between the pixel values U2_3 and D1_2. As shown in the expression (14), the absolute value of the difference between two values can be utilized as the value indicating the strength of the correlation between the two values.

That is, the local correlation value r(x, 1) calculated by the expression (16) is the strength of the correlation between the groups U2_3 and D1_2.

Alternatively, the expression (16) can also be interpreted as follows. Let it be assumed an imaginary pixel existing at the center point between the pixels u2 and u3 and having the pixel value which is the average of the pixel values u2 and u3. The pixel is called an "imaginary pixel" which is referred to by the sign "u2_3" in the following description. Likewise assumed is an imaginary pixel existing at the center point between the pixels d1 and d2 and having the pixel value which is the average of the pixel values d1 and d2. The imaginary pixel is referred to by the sign "d1_2" in the following description. Also suppose that the pixel values of the imaginary pixels u2_3 and d1_2 are referred as signs u2_3 and d1_2, respectively. From the above assumption, the local correlation value r(x, 1) is the absolute value of the difference between the pixel values u2_3 and d1_2 and is the strength of the correlation between the imaginary pixels u2_3 and d1_2.

Further from the above assumption, the imaginary pixel u2_3 is regarded to be existing at the coordinates (x+0.5, y−1) and the imaginary pixel d1_2 existing at the coordinates (x−0.5, y+1), and therefore the distance between the imaginary pixels u2_3 and d1_2 in the x direction is "1". The "1" of the name "r1 direction" corresponds to the distance "1".

Such is the description of the expression (16) in two ways of interpretation, and in summary, the description can be represented by the following expressions (17) through (19). The expression (19) is similar to the expression (14).

$$U2\_3 = u2\_3 = (u2+u3)/2 \quad (17)$$

$$D1\_2 = d1\_2 = (d1+d2)/2 \quad (18)$$

$$r(x,1) = |U2\_3 - D1\_2| = |u2\_3 - d1\_2| \quad (19)$$

Incidentally, if the simplified notation is not used, the local correlation value r(x, 1) can be represented by the following expression (20):

$$r(i,x,y,1)$$
$$= |\{p(i,x,y-1)+p(i,x+1,y-1)\}/2 -$$
$$\{p(i,x-1,y+1)+p(i,x,y+1)\}/2| \quad (20)$$

Next is a description of the l1 direction. The l1 direction is a left-upward direction which is horizontally symmetrical to the r1 direction and therefore the description in detail is not provided here. Likewise the r1 direction, a local correlation value l(x, 1) is defined by the following expression (21):

$$l(x,1) = |(u1+u2)/2 - (d2+d3)/2| \quad (21)$$

Next is a description of the r2 direction. The r2 direction represents a right-upward direction, with the inclination being gentler than the r1 direction. The local correlation value r(x, 2) of a target pixel T corresponding to the r2 direction is calculated by the following expression (22). Note that the second argument "2" of the r(x, 2) corresponds to "2" of the "r2 direction":

$$r(x,2) = |u3 - d1| \quad (22)$$

The inclination of the r2 direction is that of "upward by one pixel and rightward by one pixel". Therefore, what exists in the r2 direction viewed from the target pixel T on the upper real line 220 is the pixel u3. Further, a direction opposite to the r2 direction is a left-downward direction with an inclination being "downward by one pixel and leftward by one pixel". Accordingly, what exists in a direction opposite to the r2 direction viewed from the target pixel T on the lower real line 222 is the pixel d1. Therefore, the local correlation value r(x, 2) corresponding to the r2 direction is the absolute value of the difference between the pixel values u3 and d1 as represented by the expression (22), indicating the strength of the correlation between the pixels u3 and d1. Meanwhile, the distance between the pixels u3 and d1 in the x direction is "2" (=(x+1)−(x−1)). The "2" of the name "r2 direction" represents the distance "2".

Note that the r(x, 2) can also be interpreted as the correlation between a group U3 consisting of only one pixel u3 and a group D1 consisting of only one pixel d1.

Next, describing the l2 direction, it represents a left-upward direction and is a direction horizontally symmetrical (or in a mirror-symmetric) to the r2 direction. Therefore, the local correlation value l(x, 2) is defined by the following expression (23), while the description in detail is not provided here:

$$l(x,2) = |u1 - d3| \quad (23)$$

Next is a description of the r3 direction which represents a right-upward direction, with the inclination being further gentler than the r2 direction. The local correlation value r(x, 3) of a target pixel T corresponding to the r3 direction is calculated by the following expression (24), with the second argument "3" of the r(x, 3) corresponding to "3" of the "r3 direction":

$$r(x,3) = |(u3+u4)/2 - (d0a+d1)/2| \quad (24)$$

The inclination of the r3 direction is that of "upward by one pixel and rightward by one and a half pixels". Therefore, what is applicable to the r3 direction of the target pixel T on the upper real line 220 is the border between the pixels u3 and u4. Accordingly, likewise the case of the r1 direction, suppose that the average of the pixel values u3 and u4 is assigned to the group U3_4 consisting of pixels u3 and u4. Alternatively, an imaginary pixel existing at the center point between the pixels u3 and u4 and having a pixel value which is the average of the pixel values u3 and u4 is assumed. Then, the following expression (25) is obtained in a similar manner as the case of the calculation of the r(x, 1):

$$U3\_4 = u3\_4 = (u3+u4)/2 \quad (25)$$

Further, a direction opposite to the r3 direction is a left-downward direction with an inclination, i.e., "downward by one pixel and leftward by one and a half pixels". Then, what is applicable to a direction opposite to the r3 direction viewed from the target pixel T on the lower real line 222 is the border between the pixels d0 and d1. Accordingly, suppose that the average of the pixel values d0 and d1 is assigned to the group D0_1 consisting of the pixels d0 and d1 in a similar manner as the case of the r1 direction. Alternatively, an imaginary pixel d0_1 existing at the center point between the pixels d0 and d1 and having a pixel value which is the average of the pixel values d0 and d1 is assumed. Then, the following expression (26) is obtained in a similar manner as the case of calculating the r(x, 1):

$$D0\_1 = d0\_1 = (d0+d1)/2 \quad (26)$$

Therefore, the local correlation value r(x,3) corresponding to the r3 direction can also be interpreted as the strength of the correlation between the two groups U3_4 and D0_1, and as the strength of the correlation between the imaginary pixels u3_4 and d0_1.

Next, describing the l3 direction, it indicates a left-upward direction which is horizontally symmetrical to the r3 direction. Therefore, the local correlation value l(x, 3) is defined by the following expression (27), while the description in detail is not provided here:

$$l(x,3)=|(u0+u1)/2-(d3+d4)/2| \quad (27)$$

Next is a description of the r4 direction which indicates a right-upward direction, with the inclination being further gentler than the r3 direction. The local correlation value r(x, 4) of the target pixel T corresponding to the r4 direction is calculated by the following expression (28). Incidentally, the second argument "4" of the r(x, 4) corresponds to "4" of the "r4 direction":

$$r(x,4)=|u4-d0| \quad (28)$$

The inclination of the r4 direction is that of "upward by one pixel and rightward by two pixels". Accordingly, what exists in the r4 direction viewed from the target pixel T on the upper real line 220 is the pixel u4. Further, a direction opposite to the r4 direction is a left-downward direction with the inclination being "downward by one pixel and leftward by two pixels". Therefore, what exists in a direction opposite to the r4 direction viewed from the target pixel T on the lower real line 222 is the pixel d0. Therefore, the local correlation value r (x, 4) corresponding to the r4 direction is the absolute value of the difference between pixel values u4 and d0 as represented by the expression (28), expressing the strength of the correlation between the pixels u4 and d0. Further, the local correlation value r(x, 4) can also be interpreted as the correlation between the group U4 consisting of only the pixel u4 and the group D0 consisting of only the pixel d0 likewise the case of the r2 direction.

Next is the description of the l4 direction which indicates a left-upward direction and which is horizontally symmetrical to the r4 direction. Therefore, the local correlation value l(x, 4) is defined by the following expression (29), while the description in detail is not provided here:

$$l(x,4)=|u0-d4| \quad (29)$$

As such, the method for calculating the local correlation value and the interpretation thereof have been provided for the nine correlation calculation directions by referring to FIG. 11; the number of the correlation calculation directions to be considered is arbitrary depending on the embodiment. Using a notation without abbreviation likewise the expressions (14) and (20), the expression of a local correlation value in the case of a right-upward direction can be expressed in a general form. That is, it can be represented as the following expressions (30) and (31) by using an integer "m" of 1 or greater. It is similar in the case of a left-upward direction:

$$r(i,x,y,2m^{-1})$$
$$=|\{p(i,x+m-1,y-1)+p(i,x+m,y-1)\}/2-$$
$$\{p(i,x-m,y+1)+p(i,x-m+1,y+1)\}/2| \quad (30)$$

$$r(i,x,y,2m)=|p(i,x+m,y-1)-p(i,x-m,y+1)| \quad (31)$$

Next is a description of cumulative correlation values calculated in the step S204 of FIG. 10. As described for FIG. 8, the respective cumulative correlation values correspond to respective correlation calculation directions. That is, a cumulative correlation value is defined and calculated for each of the c direction, rj directions and lj directions (where j=1, 2, 3, 4), for which the local correlation values have been calculated as described above. Further, the cumulative correlation value is calculated by being accumulated in accordance with the selection sequence direction. The first embodiment is configured such that the selection sequence direction is the direction "from left to right" for one interpolation line based on the assumption (h). That is, the selection sequence direction is the direction increasing the values of x coordinate.

In the following description, the cumulative correlation value corresponding to the c direction is expressed as C(x), the cumulative correlation value corresponding to the rj direction is expressed as R(x, j) and the cumulative correlation value corresponding to the lj direction is expressed as L(x, j), all of which are for the target pixel T positioned at position expressed by the coordinates (x, y). Here, j is any of 1, 2, 3 and 4. Note that the C (x), R (x, j) and L (x, j) are simplified notation likewise the case of the local correlation value. That is, the notation such as C(x), R(x, j) and L(x, j) focuses on the change in x only, assuming that the target field image $F_i$ and y coordinate are constant.

A description of the cumulative correlation values is provided after the definitions are shown in a lump. The cumulative correlation values are defined by the following expressions (32) through (34) when x=0 and are recursively defined by the following expressions (35) through (43) when x>0:

$$C(0)=0 \quad (32)$$

$$L(0,j)=\text{BIG (where } j=1, 2, 3, 4) \quad (33)$$

$$R(0,j)=\text{BIG (where } j=1, 2, 3, 4) \quad (34)$$

$$C(x)=\min(L(x-1,1),C(x-1),R(x-1,1))+c(x) \quad (35)$$

$$R(x,4)=\min(R(x-1,4),R(x-1,3))+r(x,4) \quad (36)$$

$$R(x,3)=\min(R(x-1,4),R(x-1,3),R(x-1,2))+r(x,3) \quad (37)$$

$$R(x,2)=\min(R(x-1,3),R(x-1,2),R(x-1,1))+r(x,2) \quad (38)$$

$$R(x,1)=\min(R(x-1,2),R(x-1,1),C(x-1))+r(x,1) \quad (39)$$

$$L(x,4)=\min(L(x-1,4),L(x-1,3))+l(x,4) \quad (40)$$

$$L(x,3)=\min(L(x-1,4),L(x-1,3),L(x-1,2))+l(x,3) \quad (41)$$

$$L(x,2)=\min(L(x-1,3),L(x-1,2),L(x-1,1))+l(x,2) \quad (42)$$

$$L(x,1)=\min(L(x-1,2),L(x-1,1),C(x-1))+l(x,1) \quad (43)$$

In the above expressions, the min(a, b) indicates the minimum values of a and b, and the min(c, d, e) indicates the minimum values of c, d and e. Meanwhile, the "BIG" is a discretionary constant larger than the upper limit of a possible value as a cumulative correlation value. If the above expressions are regarded as mathematical models, the BIG is equivalent to infinity. Therefore, no matter what value is added to BIG, the result is regarded as BIG, a calculation is carried out. One example of a calculation using BIG is exemplified by the following expression (44):

$$\begin{aligned}L(1, 2) &= \min(L(0, 3), L(0, 2), L(0, 1)) + l(1, 2) \\ &= \min(\text{BIG}, \text{BIG}, \text{BIG}) + l(1, 2) \\ &= \text{BIG} + l(1, 2) \\ &= \text{BIG}\end{aligned} \quad (44)$$

Next is a description of the meaning of a cumulative correlation value. As understood by the above recursive definition, a cumulative correlation value is a value obtained by adding cumulatively the local correlation values on the left side of the target pixel T positioned at (x, y). A local correlation value is nonnegative from the above definition, with the value decreasing with the correlation. Therefore, the cumulative correlation value obtained by cumulatively adding local correlation values is also nonnegative, with the value decreasing with the correlation. Therefore, the use of the function "min" (simply noted as "function min" hereinafter) in the expressions (35) through (43) indicates the fact of selecting the maximum correlation from among two or three cumulative correlation values and the BIG indicates that the correlation is infinitesimal.

Here, because local correlation values obtained from the left side of the target pixel T are cumulatively added, if the target pixel T is positioned at the left edge of an image, that is, if x=0, it is understandably a special case. If x=0, a certain cumulative correlation value is incalculable depending on the correlation calculation direction. This fact is described by referring to FIG. 11 as follows.

If x=0 in the example of FIG. 11, all the pixels u0, u1, d0 and d1 do not exist. For example, the local correlation value r(x, 2) for the r2 direction is the correlation between the pixel u3 existing in the r2 direction viewed from the target pixel T and the pixel d1 existing in a direction opposite to the r2 direction viewed from the target pixel T. Therefore, if x=0, the local correlation value r (x, 2) is incalculable because the pixel d1 does not exist. Here, the local correlation value and cumulative correlation value are the same in terms of the two being defined for each correlation calculation direction. Therefore, if the pixel d1 does not exist, neither local correlation value r(x, 2) nor cumulative correlation value R(x, 2) is calculable for the r2 direction. Due to a similar reason, the cumulative correlation value is incalculable for directions other than the c direction if x=0.

In contrast, the c direction is the only direction for which the value is calculable when x=0. Therefore, a cumulative correlation value C (0) may be defined by using, for example, the local correlation value c(0) for the c direction; the present embodiment is, however, configured to calculate the cumulative correlation value C (0) by using the expression (32). As described later, while the cumulative correlation value C(0) evenly influences all other cumulative correlation values, cumulative correlation values are used for comparing the magnitude. Therefore, the cumulative correlation value C(0) can be defined as an appropriate constant such as the expression (32) without causing a problem. Further, as for the rj directions and lj directions (where j=1, 2, 3 and 4), for which the local and cumulative correlation values are incalculable when x=0, the cumulative correlation values R(0, j) and L(0, j) are uniformly defined as BIG as shown in the expressions (33) and (34).

Next is a description of the meanings of the expressions (35) through (43) in the case of x>0. The expressions (35) through (43) are all the same where they are the sum of: (i) the minimum value of plural cumulative correlation values calculated for the pixel positioned at the immediate left to the present target pixel T; and (ii) the local correlation value of the present target pixel T. Further, the fact that the local correlation value used for the calculation of a cumulative correlation value corresponding to a certain correlation calculation direction "d" is the local correlation value corresponding to the same correlation calculation direction d is also common to the expressions (35) through (43).

Here, sorting the nine correlation calculation directions shown in FIG. 11 by the angle of the inclination, the sorted order is the l4 direction, l3 direction, l2 direction, l1 direction, c direction, r1 direction, r2 direction r3 direction followed by the r4 direction. Reviewing the expressions (35) through (43) by focusing on the order, the following is generally true. That is, in the calculation of the cumulative correlation value of the correlation calculation direction "d", the cumulative correlation values having been calculated and being given to the function min as arguments correspond to the correlation calculation direction d per se and one or more correlation calculation directions in front and/or back of the aforementioned direction d in terms of the sorted order.

For example, the expression (40) corresponds to the l4 direction. Since the l4 direction is the first in the aforementioned sorted order, there is no correlation calculation direction prior to the l4 direction in the sorted order. Therefore, the cumulative correlation values corresponding to the l4 direction, which is the first in order, and to the l3 direction, which is the second in order, are given to the function min. Meanwhile, the expression (41) corresponds to the l3 direction. Since the l3 direction is second in order, the cumulative correlation values corresponding to the front and back of the l3 direction, that is, the l4 direction, which is the first in order, and to the l2 direction, which is the third in order, are given to the function min as the arguments.

In other words, a plurality of correlation calculation directions is associated with each correlation calculation direction, the plurality of which needs to be considered for the calculation of a cumulative correlation value corresponding to each respective correlation calculation direction. Thusly associated correlation calculation directions are called "associated directions" in the following description. For example, the associated directions of the l4 direction are two, i.e., the l4 and l3 directions, while the associated directions of the c direction are three, i.e., r1, c and l1 directions.

That is, the first term including the function min in each of the expressions (35) through (43) has two meanings as follows:
  One or more correlation calculation directions close to the focused correlation calculation direction d and the correlation calculation direction d itself are pre-associated with the correlation calculation direction d as the associated directions.
  A cumulative correlation value of a correlation calculation direction having the strongest correlation is selected from among a plurality of cumulative correlation values calculated for the pixel to the left of the target pixel T by one pixel corresponding to those associated directions.

These two points represents, intuitively, whether the correlation corresponding to a direction close to the presently focused correlation calculation direction d is in a strong trend, or weak trend, on the left side of the target pixel T. If the correlation is strong in a certain correlation calculation direction d, it is implicitly assumed that the correlation is relatively strong in another correlation calculation direction d' which is close to the aforementioned certain correlation calculation direction d.

For example, let it be considered the case in which the local correlation value corresponding to the r1 direction is the maximum for the majority of pixels on the left side of a target pixel T on a certain interpolation line. In this case, the correlation corresponding to the r1 direction is naturally in a strong trend on the left side of the target pixel T. Further, since the c direction and r2 direction are nearby the r1 direction, the correlations corresponding to the c and r2 directions are inferred to be also in a relatively strong trend on the left side of the target pixel T. Such an intuitive understanding is reflected in the recursive definition of the expressions (35) through (43). In this example, the r1 direction is associated with the c and r2 directions as the associated direction, and therefore the cumulative correlation value R(x−1, 1) corresponding to the r1 direction, which indicates the strong correlation as assumed in this example, is selected by the function min and added in the cumulative addition of the cumulative correlation values C(x) and R(x, 2) corresponding to the c and r2 directions. As a result, the cumulative correlation values C(x) and R(x,2) also show values indicating relative strong correlations, that is, relatively small values.

FIG. 12 is a diagram describing a specific example of the calculation of a cumulative correlation values described above. FIG. 12 exemplifies the calculation of the cumulative correlation values for a pixel on the interpolation line 221 lying between the upper real line 220 and lower real line 222. FIG. 12 consists of the left column showing the calculation of the cumulative correlation values for the target pixel T1 positioned at the coordinates (x−1,y), the center column showing the calculation of the cumulative correlation values for the target pixel T2 positioned at the coordinates (x,y) and the right column showing the expressions defining cumulative correlation values.

Each column also shows them for five directions, i.e., r2, r1, c, l1, and l2 directions in order from the top.

The left column of FIG. 12 includes the calculation description diagrams 230, 231, 232, 233 and 234 corresponding to the respective cumulative correlation values, i.e., R(x−1,2), R(x−1,1), C(x), L(x−1,1) and L(x−2,2), which have been calculated for the target pixel T1 positioned at the coordinates (x−1,y). Note that FIG. 12 shows only five correlation calculation directions due to the limitation of the drawing; the assumption is that the local correlation values and cumulative correlation values are calculated for the directions not shown in the drawing, such as the r3 direction. Further, FIG. 12 shows only seven pixels in the horizontal direction, that is, in the x direction, due to the limitation of the drawing; there are actually more pixels on both the left and right sides.

For example, the cumulative correlation value R(x−1,2) corresponding to the r2 direction related to the target pixel T1 is a sum of the minimum value of three cumulative correlation values and the local correlation value r(x−1,2) as it is made clear by the expression (38). The local correlation value r(x−1,2) corresponds to the r2 direction. Therefore, in the calculation description diagram 230 of the cumulative correlation value R(x−1,2), the local correlation value r(x−1,2) is indicated by the double-pointed solid line arrow A14 pointing to the r2 direction and a direction opposite thereto with the target pixel T1 being at the center.

Likewise, in the calculation description diagram 231 of the cumulative correlation value R(x−1,1), the local correlation value r(x−1,1) is indicated by the double-pointed solid line arrow A18 pointing to the r1 direction and a direction opposite thereto with the target pixel T1 being at the center.

The center column of FIG. 12 shows, likewise the left column, the calculation description diagrams 235 through 239 for the cumulative correlation values corresponding to five correlation calculation directions. In the center column, the pixel on the next right of the previous target pixel T1, that is, the pixel at the coordinates (x,y) is the current target pixel T2.

As an example, the bold line arrows A24, A25 and A26 are drawn, to the calculation description diagram 236 showing the calculation of the cumulative correlation value R(x, 1) corresponding to the r1 direction for the target pixel T1, respectively from the calculation description diagram 230 showing the calculation of R(x−1,2), the calculation description diagram 231 showing the calculation of R(x−1, 1) and the calculation description diagram 232 showing the calculation of C (x−1). The bold line arrows A24, A25 and A26 indicate that three cumulative correlation values, i.e., the R(x−1,2), R(x−1,1) and C(x−1), are given to the function min as the arguments in the expression (39) defining the R(x, 1). Further, the R(x−1, 1) is assumed to be the minimum of these three values in the example of FIG. 12. Accordingly, only the bold line arrow A25 corresponding to the R(x−1,1), among the three bold line arrows A24, A25 and A26, is indicated by the solid line and the other two arrows A24 and A26 are indicated by the dotted lines.

It is similar for the calculation description diagram 235 showing the calculation of R(x,2). The bold line arrow A23 from the calculation description diagram 231 corresponding to the R(x−1,1), the bold line arrow A22 from the calculation description diagram 230 corresponding to the R(x−1,2) and the bold line arrow A21 from a calculation description diagram (not shown in a drawing herein) corresponding to the R(x−1,3) are drawn to the calculation description diagram 235. Further, the R(x−1,1) is assumed to be the minimum among these three cumulative correlation values in the example of FIG. 12. Accordingly, the bold line arrow A23 corresponding to the R(x−1, 1) is delineated by a solid line and the bold line arrows A21 and A22 are delineated by dotted lines.

Under the assumptions described above, the R(x,2) is the sum of the R (x−1, 1) and the local correlation value r (x, 2). In the calculation description diagram 235, the double-pointed solid line arrow A35 pointing to the r2 direction and a direction opposite thereto with the target pixel T2 being at the center indicates the r(x,2).

Meanwhile, in the calculation description diagram 235, there are four double-pointed dotted line arrows on the left side of the solid line arrow A35. That is, there are the dotted line arrow A34 corresponding to the (x−1), the dotted line arrow A33 corresponding to the (x−2), the dotted line arrow A32 corresponding to the (x−3) and the dotted line arrow A31 corresponding to the (x−4). Next is a description of these dotted line arrows.

A cumulative correlation value is clearly the sum of one local correlation value or more, except for the case of a value being BIG, from the definitions of the expressions (32) through (43). These local correlation values are defined as "constituent components" of the cumulative correlation value herein. The dotted line arrows A31 through A34 drawn in the calculation description diagram 235 of the R(x,2) represent the constituent components of the R(x−1, 1) selected by the function min in the calculation of the R(x,2).

For example, the r(x−1, 1) is included in the R(x−1,1) as a constituent component as described above, and the fact is expressed by the solid line arrow A18 drawn in the calculation description diagram 231. Further, the R(x,2) is the sum of R(x−1,1) and r(x,2) and therefore the r(x−1,1) which is a constituent component of the R(x−1,1) is also a constituent component of the R(x,2) in this example. Therefore, the dotted line arrow A34 corresponding to the solid line arrow A18 drawn in the calculation description diagram 231 exists in the calculation description diagram 235, and the dotted line arrow A34 indicates the r (x−1, 1). That is, the dotted line arrow A34 is a double-pointed dotted line arrow pointing to the r1 direction and a direction opposite thereto with the coordinates (x−1, y) being at the center.

Likewise, the dotted line arrows A31, A32 and A33 drawn in the calculation description diagram 235 respectively correspond to the dotted line arrows A15, A16 and A17 drawn in the calculation description diagram 231. That is, each of the constituent components of the R(x−1, 1) selected by the function min for the calculation of the R(x,2) is also the constituent component of the R(x,2) and therefore the direction pattern of the dotted line arrows drawn in the calculation description diagram 231 is succeeded by that of the dotted line arrows drawn in the calculation description diagram 235. Therefore, the R(x,2) includes c(x−4), c(x−3), r(x−2,1), r(x−

1,1) and r2(x,2) as constituent components. These five local correlation values correspond respectively to the dotted line arrow A31, dotted line arrow A32, dotted line arrow A33, dotted line arrow A34 and solid line arrow A35, all of which are drawn in the calculation description diagram 235.

Meanwhile, comparing between the calculation description diagram 230 showing the calculation of the R(x−1,2) and the calculation description diagram 235 showing the calculation of the R(x,2), the direction patterns of the dotted line arrows are different from each other, while the both correspond to the r2 direction. The reason is that the R(x−1,2) was not selected by the function min for the calculation of the R(x,2).

Meanwhile, a local correlation value corresponding to a direction other than the associated direction is sometimes included in a cumulative correlation value as a constituent component. For example, the associated directions of the r2 direction corresponding to the R(x,2) are three directions, i.e., r1, r2 and r3 directions. In the meantime, the dotted line arrows A31 and A32, which correspond to the c direction, exist in the calculation description diagram 235 showing the calculation of the R(x,2).

The right column of FIG. 12 shows the expressions defining the cumulative correlation values corresponding to the five correlation calculation directions, that is, shows the above described expressions (38), (39), (35), (43) and (42).

Figure 13:
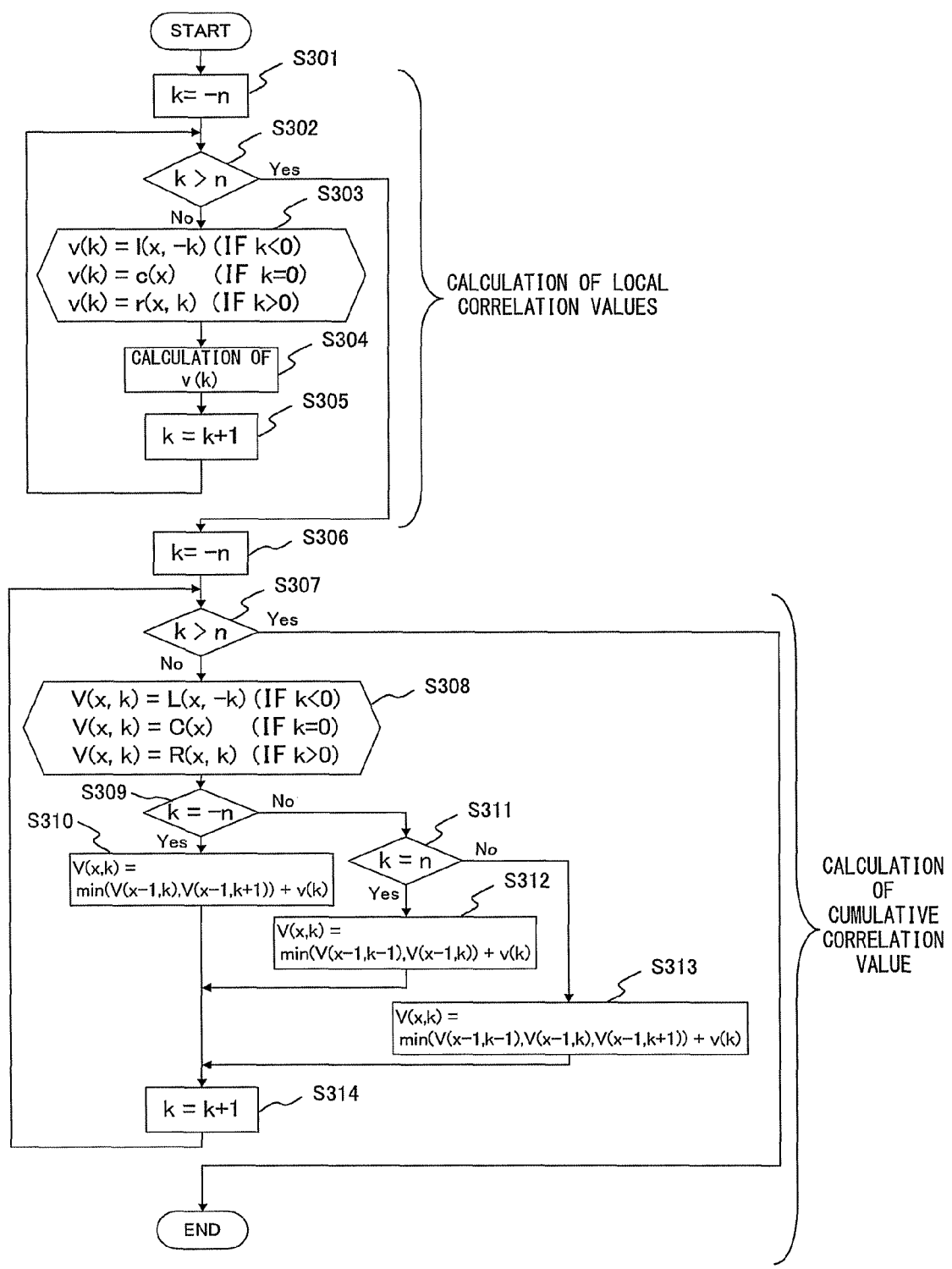
FIG. 13 is the flow chart of the calculation of the local correlation values and cumulative correlation values according to the first embodiment.

As such, the definitions and meanings of the local correlation value and cumulative correlation value have been described. Next is a description of the actual calculation procedure. FIG. 13 is the flow chart of the calculation of correlation values carried out in the step S204 shown in FIG. 10. FIG. 13 shows the process for the local correlation value calculation unit 204 and cumulative correlation value calculation unit 205 respectively calculating the local correlation values and cumulative correlation values which are defined by the expressions described above.

Note that FIG. 13 is described on the premise that the calculation is carried out for a target pixel T positioned at the coordinates (x,y) in the target field image $F_i$. Also assumed for FIG. 13 is x>0. That is, accurately speaking, FIG. 13 is the flow chart in the case of x>0 in the step S204 shown in FIG. 10.

The case of x=0 is an exceptional case as it is made clear by the definitions of the local correlation value and cumulative correlation value. Further, in the case of x=0, neither local correlation value nor cumulative correlation value is incalculable except for the c direction, and accordingly the cumulative correlation value calculation unit 205 simply determines each of cumulative correlation values L(0, j) and R(0, j) to be a prescribed value "BIG" in accordance with the expressions (33) and (34) to store it in the storage unit 201. Therefore the flow chart is not provided for the case of x=0.

In contrast, the process of FIG. 13 is carried out in the case of x>0. First, in the step S301, the local correlation value calculation unit 204 performs an initialization by substituting "−n" for a variable k. The variable k is a variable for designating one of plural correlation calculation directions. An "n" is a prescribed constant defined so that "2n+1" is the number of correlation calculation directions. The "n" is a positive integer pre-determined by the embodiment. Note that it is desirable that the directions to be considered as correlation calculation directions include the c direction without fail and include the same number of right-upward directions and left-upward directions, and these desirable conditions are implicitly premised for FIG. 13.

In an embodiment considering, for example, nine directions, i.e., r4, r3, r2, r1, c, l1, l2, l3 and l4 directions, there are respectively four directions in the right-upward directions and left-upward directions, and therefore n=4. After the initialization of the variable k, the process shifts to the step S302 (also simply noted as "S302" hereinafter).

The steps S302 through S305 configure a loop repeatedly carried out by changing a value of the variable k. This loop shows that the local correlation values are calculated for the respective correlation calculation directions.

In S302, the local correlation value calculation unit 204 judges whether or not the k is larger than the n. If the k is larger than the n, the judgment is "yes", the calculation of the local correlation values for the target pixel T is ended and the process shifts to S306. If the k is no larger than the n, the judgment is "no" and the process shifts to S303.

The S303 describes the notation of a local correlation value for FIG. 13. In S303, no process is carried out and the process shifts to S304. In the example of FIG. 13, the local correlation value for the target pixel T positioned at (x,y) is represented by unified notation "v (k)" by defining it as the expressions (45) through (47). For example, v(−3)=l(x,3) and v(2)=r(x,2).

$$v(k)=l(x,-k) \text{ (if } k<0) \tag{45}$$

$$v(k)=c(x) \text{ (if } k=0) \tag{46}$$

$$v(k)=r(x,k) \text{ (if } k>0) \tag{47}$$

In S304 following the S303, the local correlation value calculation unit 204 calculates the local correlation value v(k) for the target pixel T corresponding to the correlation calculation direction indicated by the present value of the variable k, and stores the v(k) in the storage unit 201. That is, the local correlation value calculation unit 204 reads, from the storage unit 201, the pixel values of plural pixels necessary for calculating the local correlation value v(k) from among the pixels within the target field image $F_i$ in accordance with the above described definition of the local correlation value, calculates the local correlation value v(k) on the basis of these read pixel values and stores the local correlation value v(k) in the storage unit 201.

Note that the respective pieces of data, i.e., an input field image, local correlation values and cumulative correlation values, are stored in the storage unit 201 as shown in FIG. 9. The first embodiment is configured to store these pieces of data in the respectively determined areas within the storage unit 201; however, storage areas to store respective pieces of data may alternatively be determined and allocated dynamically.

In S305 following the calculation and storage of the v(k), the local correlation value calculation unit 204 adds "1" to the variable k. This means that the local correlation value calculation unit 204 selects the next adjacent correlation calculation direction in the sorted order of the correlation calculation directions described above. After the addition, the process returns to the S302.

S306 is carried out if the judgment of the S302 is "yes". The steps S301 through S305 are processes for the local correlation value calculation unit 204 calculating the local correlation values, and the steps S306 through S314 are processes for the cumulative correlation value calculation unit 205 calculating the cumulative correlation values.

In the S306, the cumulative correlation value calculation unit 205 performs an initialization by substituting "−n" for the variable k, and the process shifts to S307. This is similar to the S301.

The steps S307 through S314 configure a loop repeatedly carried out by changing the value of the variable k. This loop shows that the cumulative correlation values are calculated for the respective correlation calculation directions.

In the S307, the cumulative correlation value calculation unit 205 judges whether or not the k is larger than the n. If the k is larger than the n, the judgment is "yes", ending the calculation of the cumulative correlation values for the target pixel T, and the entire process of FIG. 13 ends. If the k is no larger than the n, the judgment is "no" and the process shifts to S308.

The S308 explains the notation of the cumulative correlation value for FIG. 13, with no substantial process being carried out, and the process shifts to S309. In the example shown in FIG. 13, the cumulative correlation value for the target pixel T positioned at (x,y) is expressed by unified notation "V(x,k)" by defining it as the following expressions (48) through (50). For example, $V(-3)=L(x,3)$ and $V(x,2)=R(x,2)$:

$$V(x,k)=L(x,-k) \text{ (if } k<0\text{)} \quad (48)$$

$$V(x,k)=C(x) \text{ (if } k=0\text{)} \quad (49)$$

$$V(x,k)=R(x,k) \text{ (if } k>0\text{)} \quad (50)$$

The steps S309 through S313 are steps for the cumulative correlation value calculation unit 205 to calculate the cumulative correlation value V(k) on the basis of the definition depending on the value of the variable k, and store it in the storage unit 201.

In the S309, the cumulative correlation value calculation unit 205 judges whether or not the variable k is equal to the −n. If k=−n, the judgment is "yes" and the process shifts to the S310, while if k≠−n, the judgment is "no" and the process shifts to the S311.

In the S310, the cumulative correlation value calculation unit 205 calculates a cumulative correlation value V(x,k). Since the S310 is carried out in the case of k=−n, the correlation calculation direction indicated by the variable k is the left-upward direction having the gentlest inclination angle among the correlation calculation directions, that is, an ln direction. The ln direction is the first direction in order of the above described sorting of the correlation calculation directions. As clear from the expression (40) exemplifying the case of n=4, the cumulative correlation values given as arguments to the function min are only two values in this case. That is, the cumulative correlation values V(x−1,k) and V(x−1,k+1), which have been calculated in the past for the pixel positioned at (x−1,y) corresponding to the first and second correlation calculation directions in terms of the sorted order of the correlation calculation directions, are arguments of the function min. In the S310, the cumulative correlation value V (x,k) is defined by the following expression (51) generalizing the expression (40) so that the cumulative correlation value calculation unit 205 calculates the V(x,k) on the basis of the expression (51):

$$V(x,k)=\min(V(x-1,k),V(x-1,k+1))+v(k) \quad (51)$$

That is, the cumulative correlation value calculation unit 205 reads, from the storage unit 201, the cumulative correlation values V(x−1,k) and V(x−1,k+1) which have been calculated in the past and stored in the storage unit 201. The cumulative correlation value calculation unit 205 selects the minimum value of the two values. Note that the "calculated in the past" noted above specifically means having been calculated in the step S204 which has been carried out in the loop immediately prior to the presently executed S204. The cumulative correlation value calculation unit 205 also reads the local correlation value v(k) calculated and stored in the storage unit 201 in the S304, and calculates a V(x,k) by adding the selected minimum value to the v(k) and stores the V(x,k) in the storage unit 201. Then the process shifts to S314.

In S311, the cumulative correlation value calculation unit 205 judges whether or not the variable k is equal to the n. If k=n, the judgment is "yes" and the process shifts to S312, while if k≠n, the judgment is "no" and the process shifts to S313.

In the S312, the cumulative correlation value calculation unit 205 calculates a cumulative correlation value V(x,k). It is the case of k=n when the S312 is carried out, and therefore the correlation calculation direction indicated by the variable k is a right-upward direction with the gentlest inclination angle among the correlation calculation directions, that is, the rn direction. That is, in the S312, the cumulative correlation value calculation unit 205 calculates the cumulative correlation value corresponding to a correlation calculation direction horizontally symmetrical to the direction considered in the S310. The cumulative correlation value to be calculated in the S312 is defined by the expression (52). The expression (52) is a generalization of the expression (36). The operation of the cumulative correlation value calculation unit 205 is similar to that of the S310 and therefore the description is not provided here. After the execution of the S312, the process shifts to S314.

$$V(x,k)=\min(V(x-1,k-1),V(x-1,k))+v(k) \quad (52)$$

In the S313, the cumulative correlation value calculation unit 205 calculates a cumulative correlation value V(x,k). It is the case of −n<k<n when the S313 is carried out. That is, three associated directions are defined for the correlation calculation direction indicated by the variable k. The V(x,k) is accordingly defined by the following expression (53):

$$V(x,k)=\min(V(x-1,k-1),V(x-1,k),V(x-1,k+1))+v(k) \quad (53)$$

The expression (53) is the generalization of the expressions (35), (37) through (39), and (41) through (43). The operation of the cumulative correlation value calculation unit 205 is similar to that of the S310, except for the number of cumulative correlation values read from the storage unit 201, and therefore the description is not provided here. After the execution of the S313, the process shifts to S314.

In the S314, the cumulative correlation value calculation unit 205 adds "1" to the variable k. This means that the cumulative correlation value calculation unit 205 selects the adjacent next correlation calculation direction in the sorted order of the correlation calculation directions described above. After the addition, the process returns to the S307.

When the correlation value calculation unit 203 completes the process of FIG. 13 as described above, the process proceeds to the S205 shown in FIG. 10.

Incidentally, a cumulative correlation value is a value reflecting the trend of the correlation found in the left side of a target pixel; while the amount of computer resource required for the calculation is not substantially large. That is, a cumulative correlation value can be calculated merely by selecting a minimum value and performing addition as shown by the expressions (51) through (53). The thusly defined cumulative correlation value does not cause the computational complexity to increase exponentially with, for example, the value of x or the number of correlation calculation directions.

Meanwhile, as clear from the expressions (51) through (53), the first embodiment is configured to enable the calculation of the cumulative correlation values for a target pixel positioned at the coordinates (x,y), only if the cumulative correlation values for the pixel positioned at the coordinates (x−1,y) are stored in the storage unit 201. That is, even if the cumulative correlation values for the pixel at the coordinates (x−2,y) or on the left side thereof have been erased from the storage unit 201, the cumulative correlation values for the target pixel at the coordinates (x,y) are calculable. Therefore, the first embodiment has the advantage of requiring small capacity of the storage unit 201 necessary to calculate cumulative correlation values even if the number of pixels of an input image is large.

Figure 14:
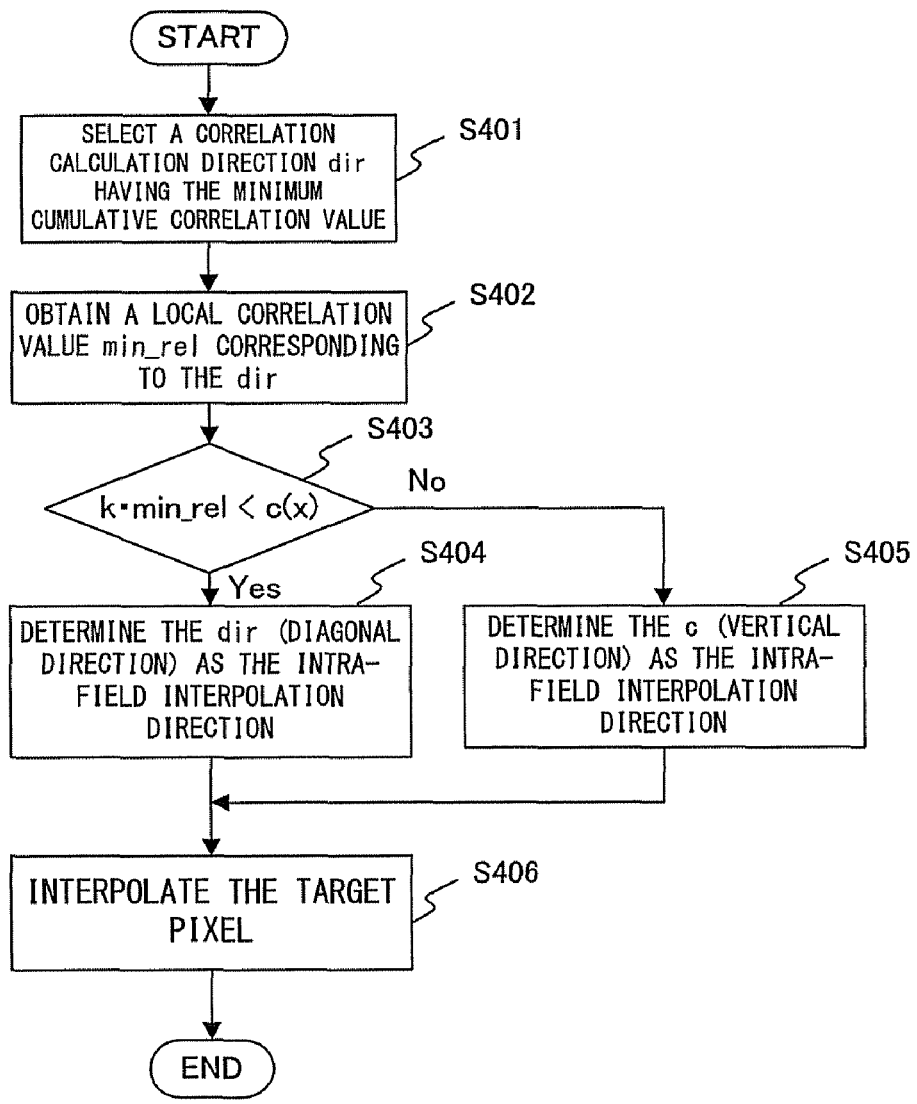
FIG. 14 is the flow chart of an intra-field interpolation according to the first embodiment.

Next is a description of the step S206 of FIG. 10 in detail by referring to FIG. 14. FIG. 14 is the flow chart of an intra-field interpolation according to the first embodiment, showing the process for the target pixel at the coordinates (x,y), the coordinates being designated by the variables x and y in FIG. 10. The process of FIG. 14 is carried out by the intra-field interpolation unit 207. The steps S401 through S405 are the process for determining an interpolation-use pixel used for interpolating a target pixel, and S406 is the process for interpolating the target pixel.

In S401, the direction selection unit 208 selects a correlation calculation direction "dir" (simply noted as "correlation calculation direction dir" or further simply "dir" hereinafter) for which the cumulative correlation value is the minimum. As shown in FIG. 13, the cumulative correlation value calculation unit 205 has already calculated respective cumulative correlation values for the 2n+1 pieces (i.e., directions) of correlation calculation directions. Therefore, the direction selection unit 208 selects a correlation calculation direction corresponding to the cumulative correlation value of the minimum value among these 2n+1 pieces of cumulative correlation values. Note that the cumulative correlation value is nonnegative and the correlation becomes stronger as the cumulative correlation value becomes smaller, and therefore it can be paraphrased that "the direction selection unit 208 selects the correlation calculation direction having the strongest cumulative correlation as a dir".

Further, if there is a plurality of cumulative correlation values having the minimum value, the direction selection unit 208 selects, from among the respective correlation calculation directions corresponding to the plurality of cumulative correlation values, a correlation calculation direction closest to the c direction. For example, if an L(x,2) corresponding to the l2 direction and an R(x,1) corresponding to the r1 direction are the same value and the minimum among 2n+1 pieces of cumulative correlation values, the r1 direction is selected as a dir in the S401 because the r1 direction is closer to the c direction than the l2 direction is. After selecting the dir, the process shifts to S402.

In the S402, the intra-field interpolation-use pixel determination unit 209 obtains a local correlation value min_rel corresponding to the dir. For example, if the dir is the r2 direction, the min_rel is r(x,2), if the dir is the c direction, the min_rel is c(x), and if the dir is the l1 direction, the min_rel is l(x,1). After obtaining the min_rel, the process shifts to S403.

In the S403, the intra-field interpolation-use pixel determination unit 209 compares between the c(x) and the product of a predefined constant k and the min_rel, and, if the following expression (54) applies, judges it as "yes", while if the expression (54) does not apply, judges it as "no":

$$k \cdot \min\_rel < c(x) \tag{54}$$

Note that the k is a predetermined constant, with the value preferably between approximately 1.0 and 2.0. The value of 2.0 is not a theoretical border value but an approximate number obtained empirically, while it is described in detail later. The k can be a value not included within the aforementioned range between 1.0 and 2.0.

If the judgment of the S403 is "yes", the intra-field interpolation-use pixel determination unit 209 determines the intra-field interpolation direction as the dir in S404. Here, the "intra-field interpolation direction" is defined as a direction determined by the positional relationship among plural interpolation-use pixels to be utilized for interpolating a target pixel by intra-field interpolation. The determination of an intra-field interpolation direction and that of an interpolation-use pixels mean the same.

That is, the "intra-field interpolation direction is determined to be dir" means the following paragraphs (1a) through (3a):

(1a) A group consisting of one pixel or more on the upper real line 220 and in the dir direction viewed from the target pixel is determined.

(2a) A group consisting of one pixel or more on the lower real line 222 and in a direction opposite to the dir viewed from the target pixel is determined.

(3a) Plural real pixels included in these two groups are determined as the interpolation-use pixels used for interpolating the target pixel.

Note that the (1a) through (3a) described above can be paraphrased as the following (1b) through (3b):

(1b) One real pixel or one imaginary pixel on the upper real line 220 and in the dir direction viewed from the target pixel is determined.

(2b) One real pixel or one imaginary pixel on the lower real line 222 and in a direction opposite to the dir viewed from the target pixel is determined.

(3b) The two real pixels identified in the paragraphs (1b) and (2b) or the two imaginary pixels identified in the paragraphs (1b) and (2b) are determined as the interpolation-use pixels used for interpolating the target pixel.

Likewise a correlation calculation direction corresponding the local correlation value is expressed by the double-pointed dotted line arrow A11 or the like in FIG. 12, an intra-field interpolation direction may also be expressed by a double-pointed arrow in the following drawings.

Next is a description of the interpolation-use pixels selected in the step S403 by referring to FIG. 11. For example, if dir=r1, a group U2_3 consisting of the pixels u2 and u3 is identified in the above paragraph (1a), a group D1_2 consisting of the pixels d1 and d2 is identified in the (2a), and the four pixels u2, u3, d1 and d2 are determined to be the interpolation-use pixels for interpolating the target pixel T in the (3a). In other words, imaginary pixel u2_3 is identified in the (1b), imaginary pixel d1_2 is identified in the (2b), and two imaginary pixels u2_3 and d1_2 are determined to be the interpolation-use pixels for interpolating the target pixel T.

Likewise, for example, if dir=r2, a group consisting of only the pixel u3 is identified in the above paragraph (1a), a group consisting of only the pixel d1 is identified in the (2a), and the two pixels u3 and d1 are determined to be the interpolation-use pixels for interpolating the target pixel T in the (3a). In other words, the real pixel u3 is identified in the (1b), the real pixel d1 is identified in the (2b), and the two real pixels u3 and d1 are determined to be the interpolation-use pixels for interpolating the target pixel T in the (3b).

When an intra-field interpolation direction is determined to be a dir in a manner described above, the process shifts to S406.

In contrast, if the judgment of the S403 is "no", the intra-field interpolation-use pixel determination unit 209 determines the intra-field interpolation direction to be the c direction in S405. That is, the pixel u2 vertically above the target pixel T and the pixel d2 vertically below the target pixel T are determined to be the interpolation-use pixels for interpolating the target pixel T. This is the operation of substituting the c direction for the dir direction in the paragraphs (1a) through (3a) and (1b) through (3b), the paragraphs being described with reference to the S404. After determining the intra-field interpolation direction, the process shifts to S406.

In the S406, the intra-field interpolation pixel value calculation unit 210 performs an intra-field interpolation for the target pixel in accordance with the intra-field interpolation direction determined in the S404 or S405. That is, the intra-field interpolation pixel value calculation unit 210 calculates the pixel value of the target pixel.

Figure 15:
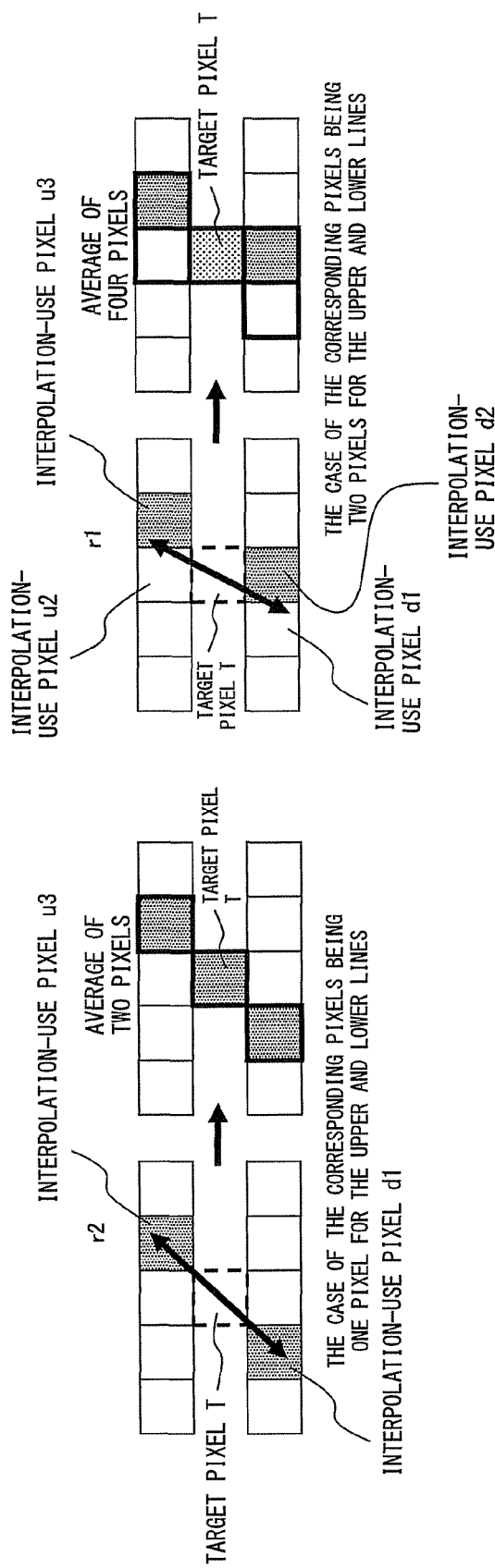
FIG. 15 is a diagram describing the calculation of a pixel value performed by an intra-field interpolation.

An example of calculation of a pixel value in the S406 is described by referring to FIG. 15. For example, if the intra-field interpolation direction is the r2, the interpolation-use pixels for the target pixel T are two pixels, i.e., the pixels u3 and d1. In this case, the intra-field interpolation pixel value calculation unit 210 calculates the pixel value T of the target pixel T in accordance with the following expression (55) and performs an intra-field interpolation for the target pixel T. The expression (55) expresses the average of the pixel values of the two interpolation-use pixels:

$$T=(u3+d1)/2 \quad (55)$$

In the example of FIG. 15, both the pixels u3 and d1 are black, the target pixel T for which the pixel value T is calculated by the expression (55) is also interpolated as black.

Further, for example, if an intra-field interpolation direction is the r1, the interpolation-use pixels for the target pixel T are four real pixels, i.e., the pixels u2, u3, d1 and d2, as described above. In this case, the intra-field interpolation pixel value calculation unit 210 calculates the pixel value T of the target pixel T in accordance with the following expression (56) and performs an intra-field interpolation for the target pixel T. The expression (56) represents the average of the pixel values of the four interpolation-use pixels:

$$T=(u2+u3+d1+d2)/4 \quad (56)$$

Note that the expression (56) can also be modified to the following expression (57) by using the expressions (17) and (18):

$$T=(u2\_3+d1\_2)/2 \quad (57)$$

The expression (57) is based on the interpretation that the interpolation-use pixels for a target pixel T are regarded as two imaginary pixels u2_3 and d1_2. The expression (57) shows that the average of the pixel values of the two interpolation-use pixels is the pixel value T of the target pixel T. While the expressions (56) and (57) are represented by different forms in accordance with the different interpretations, the substantial contents of them is the same.

When the target pixel T is interpolated by intra-field interpolation in the S406 as described above, the intra-field interpolation process of FIG. 14 is completed. Then the process shifts to S208, returning to FIG. 10.

Note that the significance of the process shown in FIG. 14 can be supplemented as follows. The cumulative correlation values are considered in the S401 and the local correlation values are considered in the S402 and S403, and therefore an intra-field interpolation considering both the local correlation values and cumulative correlation values is carried out in FIG. 14. Further, knowledge empirically obtained by experiment is reflected in the steps S403 through S405. That is, the steps S403 through S405 show a process biased so that the c direction tends to be selected as an intra-field interpolation direction for the purpose of improving the image quality of the post-interpolation image.

Figure 1:
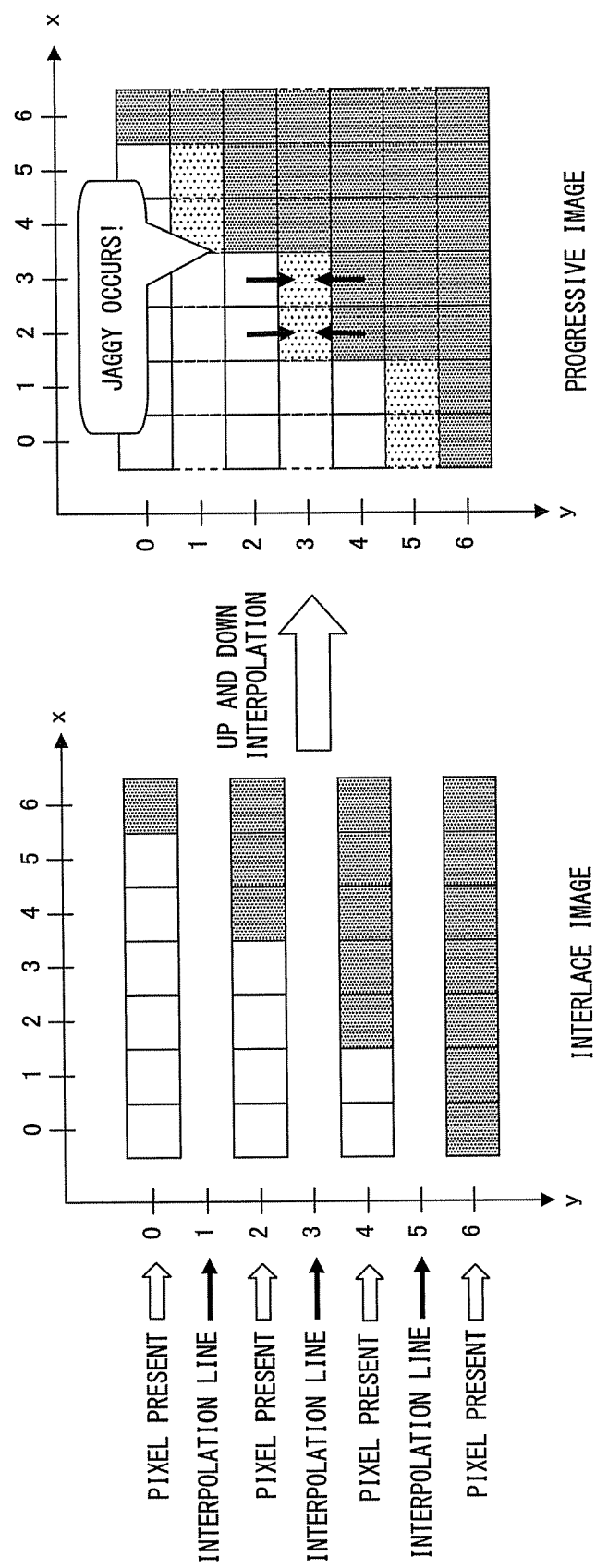
FIG. 1 is a diagram describing the occurrence of a "jaggy" caused by a conventional interpolation method.
Figure 2:
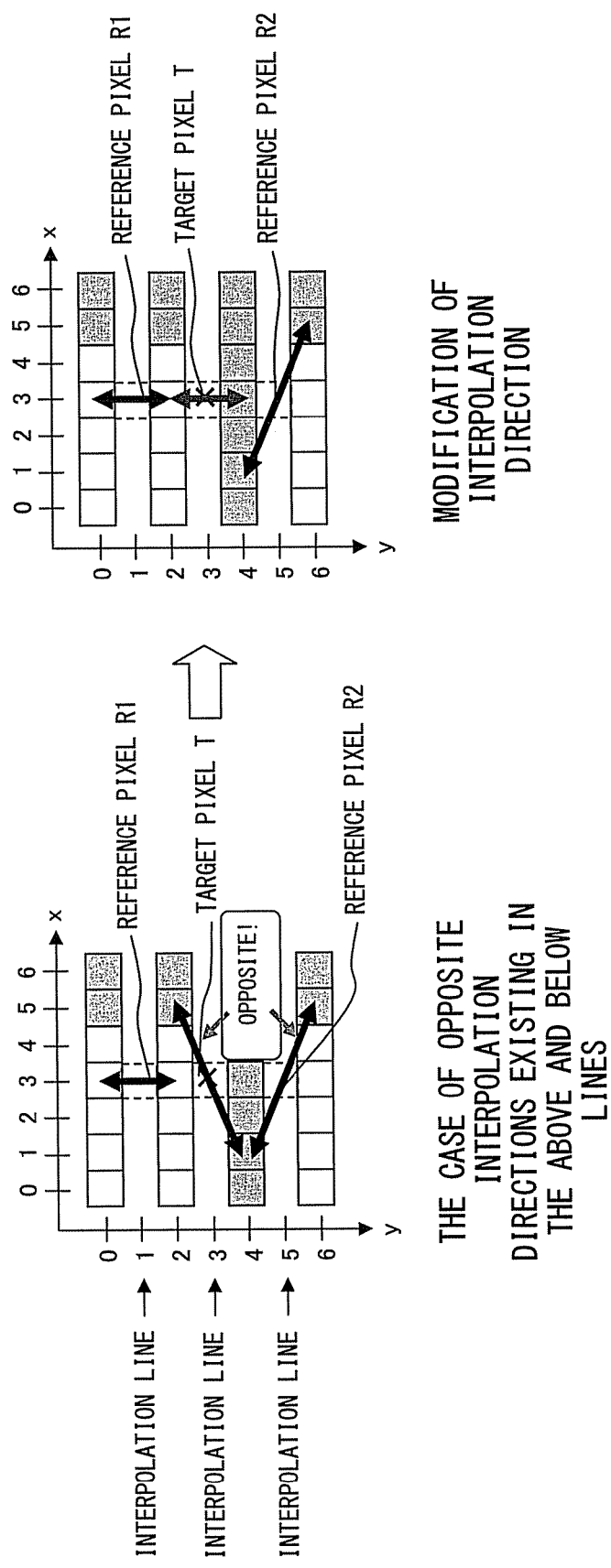
FIG. 2 is a diagram describing the interpolation method noted in the reference patent document 1.
Figure 3:
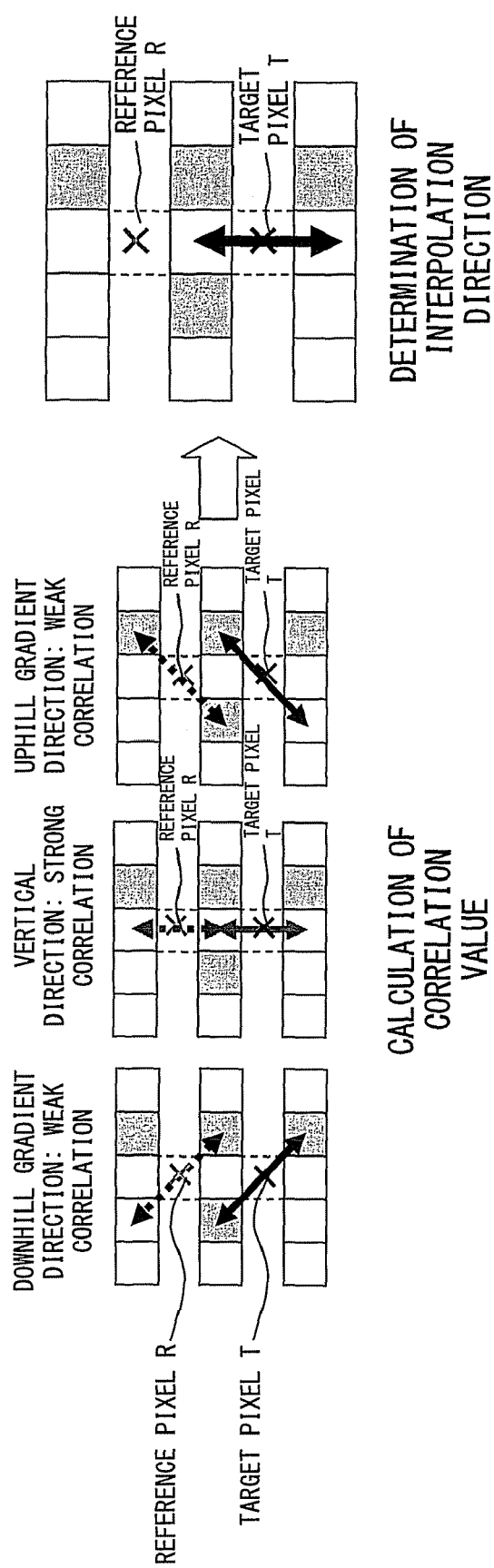
FIG. 3 is a diagram describing the interpolation method noted in the reference patent document 2.
Figure 4:
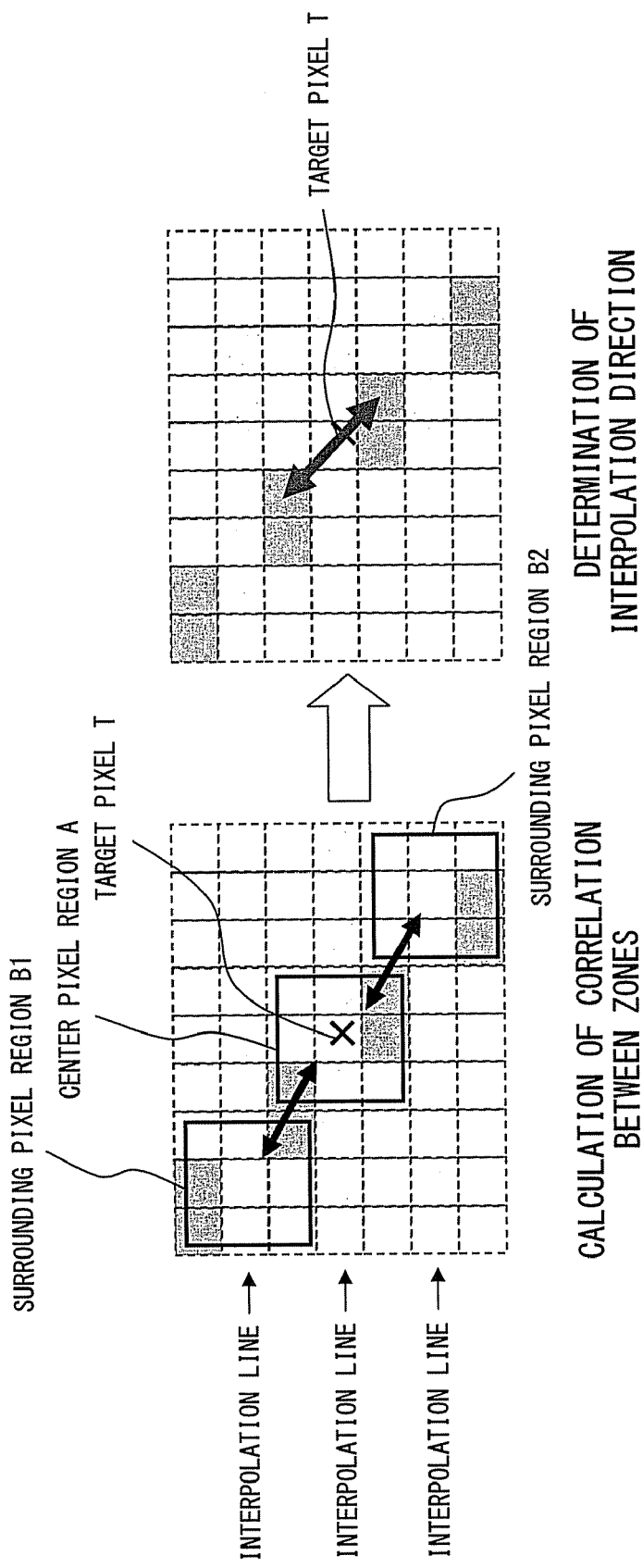
FIG. 4 is a diagram describing the interpolation method noted in the reference patent document 3.
Figure 6:
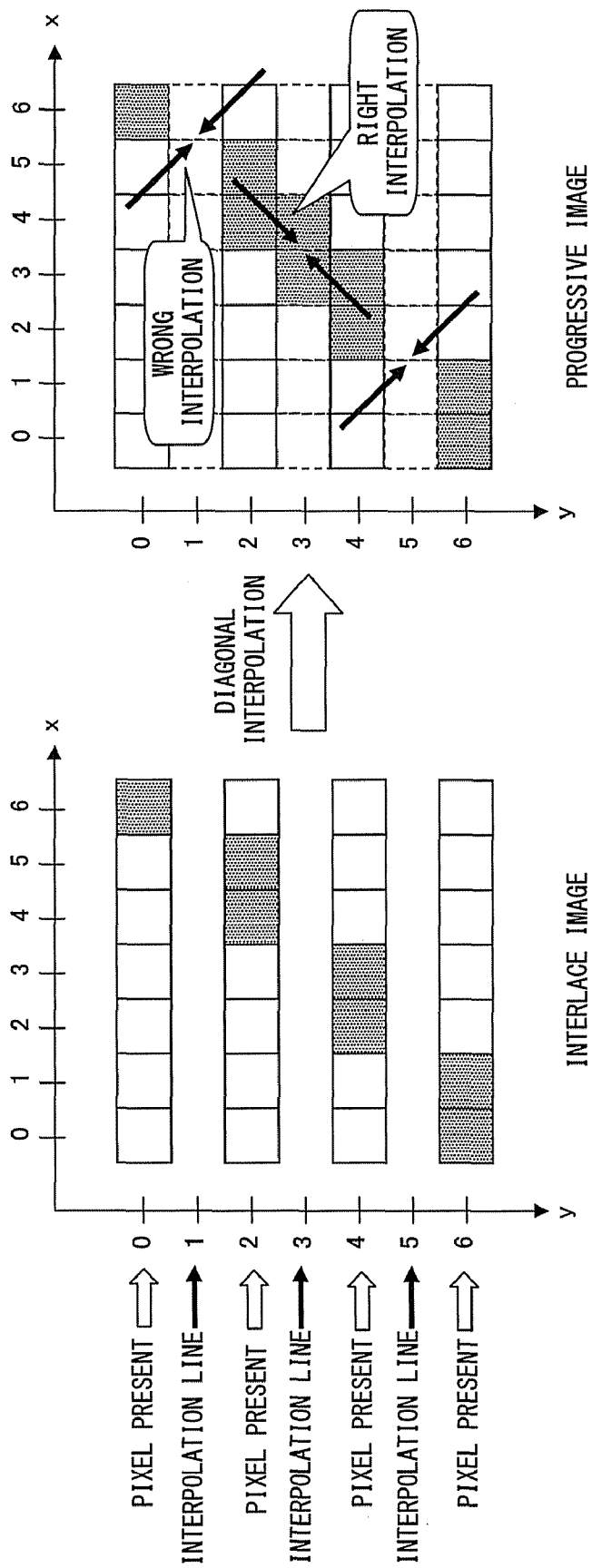
FIG. 6 exemplifies an image for which a wrong interpolation method is apt to be selected.

As described above, determining always the c direction to be the intra-field interpolation direction causes to generate a jaggy as shown in FIG. 1, leading to a degradation of the image quality of the post-interpolation image. In contrast, as shown in FIG. 6, the application of an intra-field interpolation to a target pixel by determining a diagonal direction, that is, a direction other than the c direction to be the intra-field interpolation direction can obtain a result of a high image quality if the determined intra-field interpolation direction is appropriate, while if it is not, a degradation of the image quality worse than a jaggy shown in FIG. 1 may result. Because of this, the experiences have made it comprehend that the application of an intra-field interpolation in a diagonal direction is effective for improving the image quality only if the diagonal direction is deemed to be clearly an appropriate direction in a high degree of confidence. That is, if the degree of confidence on the dir selected in the S401 being an appropriate intra-field interpolation direction is low, the application of an intra-field interpolation in the c direction, rather than in the dir, empirically prevents a degradation of image quality.

Such biasing so that the c direction tends to be selected as an intra-field interpolation direction is specifically implemented by the expression (54) of the S403 according to the present embodiment. In the present embodiment, a local correlation value is nonnegative and indicates a stronger correlation as the value decreases. Therefore, in order to implement the bias described above, the value of k must be larger than 1.0.

Assuming, for example, k=1.5, the expression (54) applies if a local correlation value min_rel corresponding to the correlation calculation direction dir is smaller than two thirds (⅔) of a local correlation value c(x) corresponding to the c direction. That is, the expression (54) applies only if the local correlation corresponding to the dir is clearly stronger than that corresponding to the c direction, while the expression (54) does not apply if there is no significant difference between the two local correlations. The judgment of "clearly stronger" in this event specifically depends on the value of k. If the k is an extremely large value, the judgment result obtained in the S403 is almost always "no" because the min_rel and c(x) are nonnegative, resulting in the c direction being almost always selected as the intra-field interpolation direction. Therefore, the value of k is desired to be appropriately determined by an experiment or the like. The range between 1.0 and 2.0 noted above is an example range of preferred values.

Meanwhile, if the cumulative correlation values are the minimum in plural correlation calculation directions in the S401, a direction closest to the c direction is selected as dir from among those plural correlation calculation directions, the procedure of which is also based on a similar consideration as the biasing described above. That is, the consideration is such that, if the calculated cumulative correlation values are approximately the same, a degree of confidence that the cumulative correlation is actually strong is higher in a correlation calculation direction closer to the c direction than in a correlation calculation direction far from the c direction.

Figure 16:
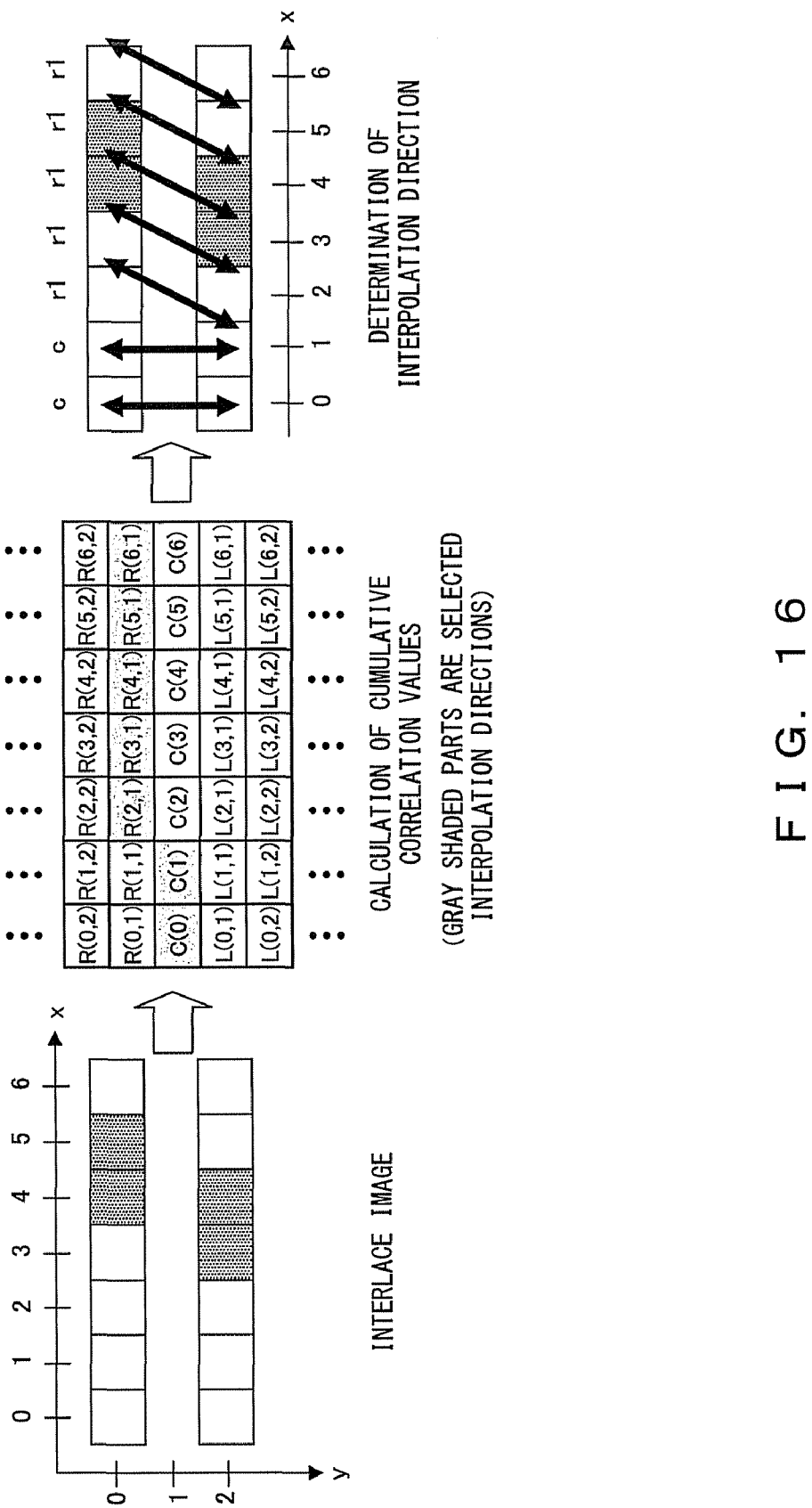
FIG. 16 is a diagram exemplifying the determination of an intra-field interpolation direction.

As such, the operation of the pixel value interpolation apparatus 200 according to the first embodiment has been described; the flow of the operation is schematically illustrated in FIG. 16. FIG. 16 exemplifies the determination of an intra-field interpolation direction.

As shown in the left column of FIG. 16, the line of y=1 is the interpolation line in this example. The pixels on the interpolation line are selected as target pixels sequentially from left, and interpolated. FIG. 16 shows the interpolation of seven target pixels positioned at the coordinates (0,1) through (6,1).

As shown in the center column of FIG. 16, plural cumulative correlation values respectively corresponding to plural correlation calculation directions are calculated for each target pixel.

FIG. 16 shows only five correlation calculation directions due to the limitation of the drawing. FIG. 16 also shows the selection of a dir in the S401 in gray. For example, when the coordinates of a target pixel are expressed as (1,1), the cumulative correlation value C(1) is assumed to be the minimum among the cumulative correlation values R(1,j), C(1) and L(1,j) (where j=1, 2, 3 and so on) in this example. The C(1) is accordingly indicated in gray.

Further, the example shown in FIG. 16 assumes that the motions are detected for all target pixels in the S205. Therefore, an actual intra-field interpolation direction is determined for each target pixel in accordance with the steps S402 through S405 on the basis of the thusly selected dir. The right column of FIG. 16 shows the determined intra-field interpolation directions by using double-pointed arrows. As it is made comprehensible from the comparison between the center and right columns of FIG. 16, a target pixel judged as "no" in the S403 does not exist in this example.

Next is a description of the mutual relations between FIG. 8 and FIGS. 10, 13 and 14.

The S101 of FIG. 8 corresponds to the steps S201, S208 and S209 of FIG. 10, during the steps of which the variables x and y are substituted for.

The steps S102 and S103 of FIG. 8 correspond to the S204 of FIG. 10. More precisely, the S102 corresponds to the steps S301 through S305 of FIG. 13, while the S103 corresponds to the steps S306 through S314 of FIG. 13.

The steps S104 and S105 of FIG. 8 correspond to S206 of FIG. 10. More precisely, the S104 corresponds to the S401 of FIG. 14, while the S105 corresponds to the steps S402 through S405 of FIG. 14.

The S106 of FIG. 8 corresponds to S203 of FIG. 10, and the judgment of "yes" in S106 corresponds to that of "no" in the S203. Note that FIG. 8 shows that the interpolation methods are determined sequentially along one selection sequence direction for plural target pixels, and therefore the process is ended if the judgment is "no" in the S106. For example, in the case of determining interpolation methods along a selection sequence direction that is left to right for plural target pixels positioned on a certain one horizontal interpolation line, FIG. 8 shows that the process is ended at the right edge of the interpolation line. In contrast, FIG. 10 shows also the process for plural interpolation lines. Therefore, in FIG. 10, the process is not ended even if the judgment is "yes" in the S203, and instead the process shifts to S209 for moving to the next interpolation line. FIG. 10 is equivalent to a repeated execution of the process of FIG. 8 for the number of interpolation lines.

Next is a description, by referring to FIGS. 17 through 20, of the advantages of utilizing the cumulative correlation values as described above when performing an intra-field interpolation. A first advantage point is described by referring to FIGS. 17 and 18, and a second advantage point is described by referring to FIGS. 19 and 20. Note that assumptions (a) through (j) noted above are also applied to the examples shown in FIGS. 17 through 20. Particularly, FIGS. 17 through 20 indicate the pixel values of individual pixels for describing the specific examples by using numbers. From the assumption (e) noted above, a square with "100" inscribed therein indicates a white pixel, for example.

Figure 17:
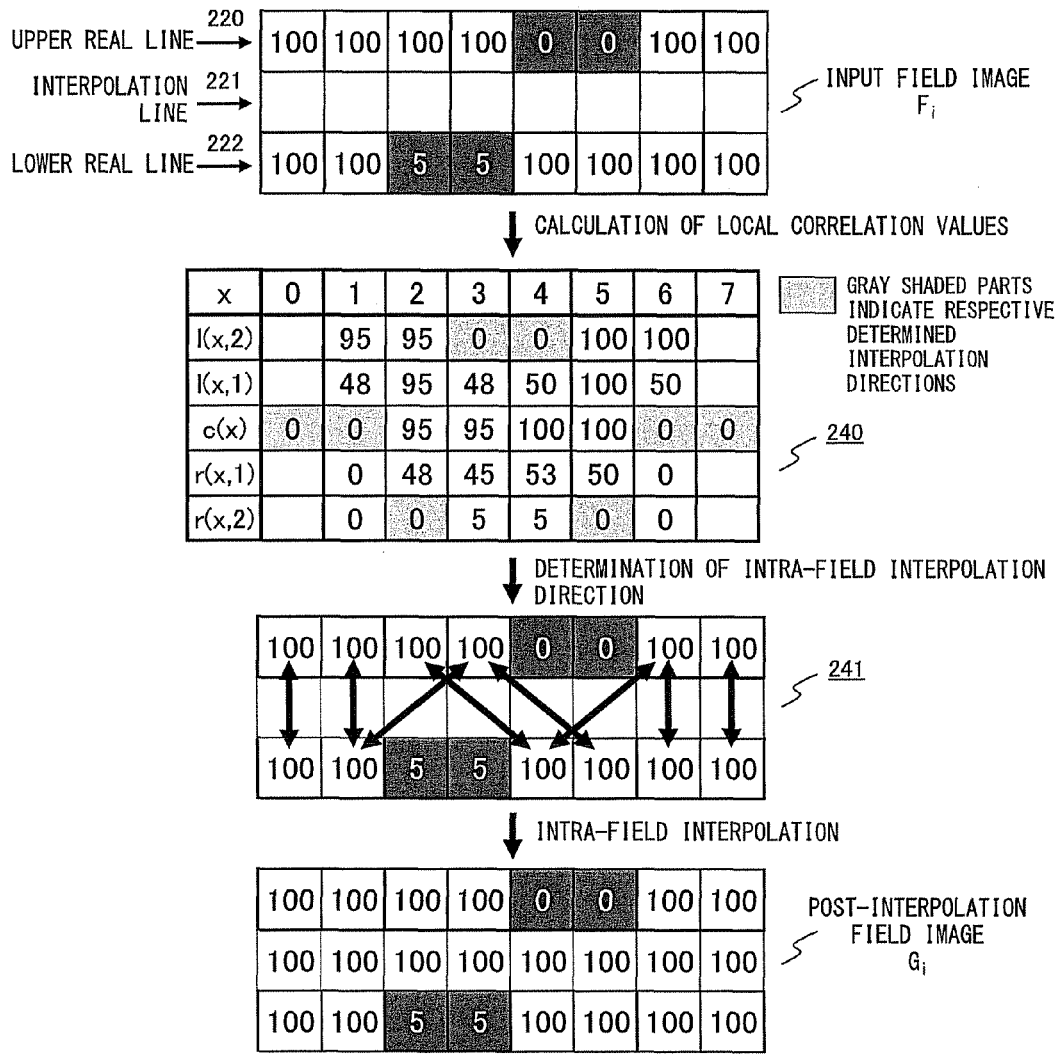
FIG. 17 is a diagram describing a conventional example determining intra-field interpolation-use pixels by using local correlation values and performing interpolation.
Figure 18:
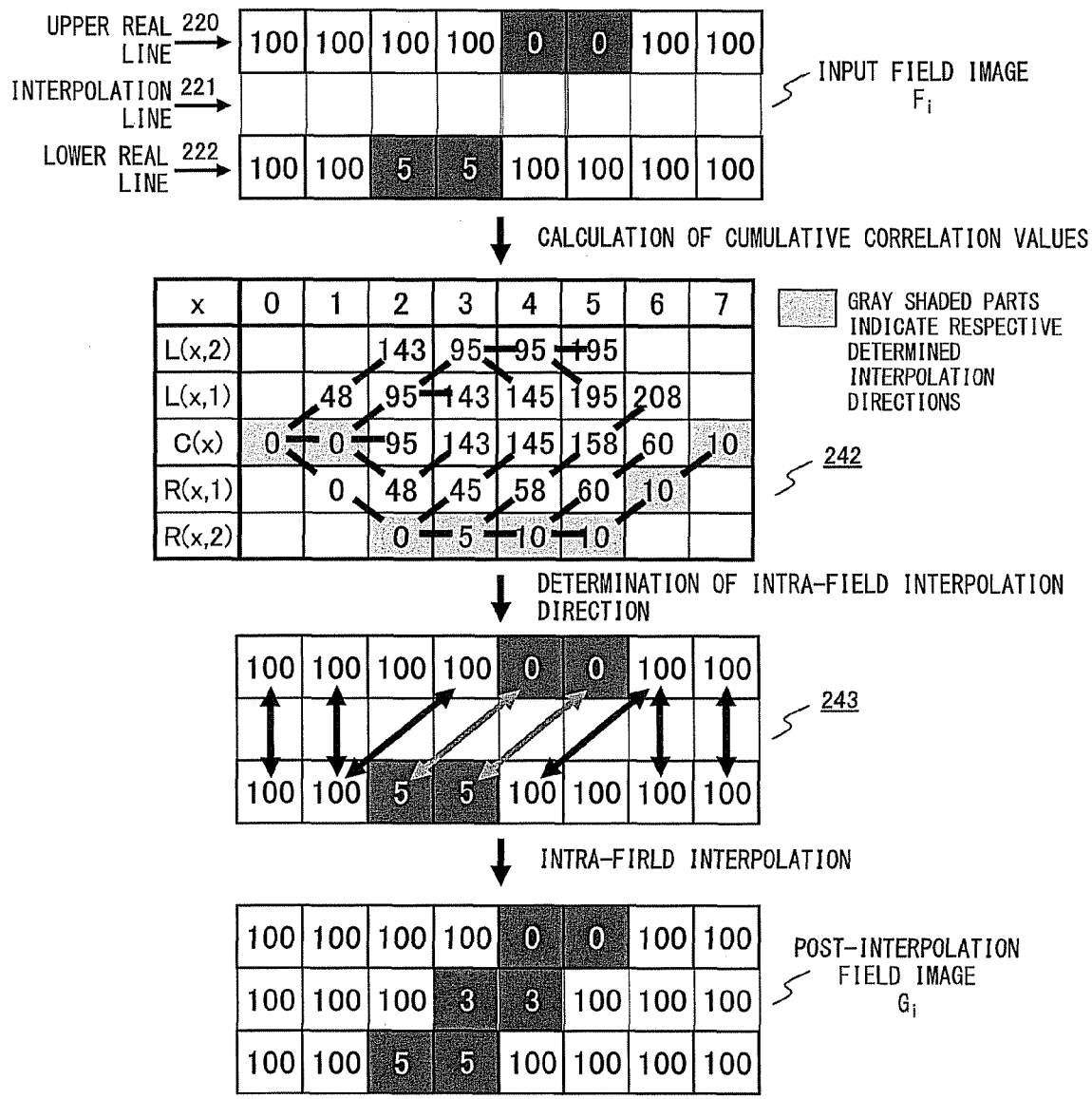
FIG. 18 is a diagram describing an example of determining intra-field interpolation-use pixels by using cumulative correlation values and performing interpolation according to the first embodiment.

FIG. 17 is a diagram describing a conventional example determining intra-field interpolation-use pixels by using a local correlation values and performing interpolation; and FIG. 18 is a diagram describing an example of determining intra-field interpolation-use pixels by using cumulative correlation values and performing interpolation according to the first embodiment. The input image to FIGS. 17 and 18 is the same input field image $F_i$ which is an image with a very dark diagonal line, which may be recognized as a black line by human eyes, having the pixel value being "0" or "5" in a white background having the pixel value being "100".

The conventional method shown in FIG. 17 utilizes the local correlation values defined in the same manner as that of the above described first embodiment, that is, the local correlation values shown in the expression (14) through (29), while the method shown in FIG. 17 does not utilize a cumulative correlation value. The example of FIG. 17 considers only five directions as the correlation calculation directions, i.e., l2 direction, l1 direction, c direction, r1 direction and r2 direction. Further, the width of the input field image $F_i$ is eight pixels of which the x coordinate is in the range between "0" and "7". The eight pixels on the interpolation line 221 are selected as target pixels sequentially from left to right, and the local correlation values for the respective five correlation calculation directions are calculated for each selected target pixel.

The calculated local correlation values are as shown in a local correlation value list 240. Note that these values are indicated after rounded to the nearest integer in the local correlation value list 240. The blank box of the local correlation value list 240 means that a calculation is impossible by definition. Note also that the local correlation value list 240 is a table for description and that all the local correlation values shown in the local correlation value list 240 are not necessarily stored simultaneously in the storage unit 201. In the method shown in FIG. 17, a direction for which the local correlation value is the smallest, that is, the local correlation is the strongest, is determined to be the intra-field interpolation direction. For each target pixel, the direction, for which the local correlation value is the smallest, among the five correlation calculation directions, is indicated by gray in the local correlation value list 240.

The diagram, in which the thusly determined intra-field interpolation directions are indicated by double-pointed arrows representing the respective directions, is an intra-field interpolation direction description diagram 241. Then, the result of the interpolation based on the intra-field interpolation directions is a post-interpolation field image $G_i$. The eight pixels on the interpolation line 221 are all interpolated as while pixels having the pixel value of 100 in the post-interpolation field image $G_i$. Therefore the black diagonal line is broken on the interpolation line 221.

That is, the local correlation is the strongest in the l2 direction horizontally symmetrical to the r2 direction which is the correct intra-field interpolation direction for the pixels at the positions of x=3 and x=4, the method of FIG. 17 performs an erroneous interpolation. Specifically, the local correlation is stronger in the l2 direction than in the r2 direction at x=3 because of r(3,2)>l(3,2), and the local correlation is stronger in the l2 direction than in the r2 direction at x=4 because of r(4,2)>l(4,2). Therefore, the intra-field interpolation direction for the pixels at x=3 and x=4 is the l2 direction, resulting in these two pixels being interpolated as while.

In contrast, FIG. 18 exemplifies the case of the same input field image $F_i$ as that shown in FIG. 17 being interpolated by the process according to the first embodiment. Likewise FIG. 17, the example of FIG. 18 also considers only the five directions as the correlation calculation directions. It is further the same as FIG. 17 where the eight pixels on the interpolation line 221 are sequentially selected as target pixels from the left to right. The difference from FIG. 17 lies in the pixel value interpolation apparatus 200 calculating not only local correlation values but also cumulative correlation values and determining an intra-field interpolation direction by utilizing the cumulative correlation values in the example of FIG. 18.

The calculated cumulative correlation values are as shown in a cumulative correlation value list 242. Note that the values are shown after rounded to the nearest integer in the cumulative correlation value list 242. The blank box of the cumulative correlation value list 242 indicates a cumulative correlation value being the aforementioned "BIG". Further, in the cumulative correlation value list 242, a bold line connecting a pair of cumulative correlation values means the same as the bold line arrows A23, A25 and so on shown in FIG. 12. For example, the R(3,1) is calculated by the following expression (58) from the definition of the expression (39):

$$R(3, 1) = \min(R, (2, 2), R(2, 1), C(2)) + r(3, 1) \qquad (58)$$
$$= \min(0, 48, 95) + 45$$
$$= 0 + 45$$
$$= 45$$

What is selected by the function min in the expression (58) is the value "0" representing the R(2,2). Therefore, a bold line is drawn from the "0" representing the R(2,2) to "45" representing the R(3,1) in the cumulative correlation value list 242.

Further, for each target pixel, the direction for which the cumulative correlation value is the smallest, among the five correlation calculation directions, is indicated by gray within the cumulative correlation value list 242. That is, a gray box corresponds to the dir in the S401 of FIG. 14. Also in FIG. 18, assuming that the value of the constant k of the expression (54) is "2", for example, the judgment is never "no" in the S403 except at x=6. Therefore, the gray box also represents the intra-field interpolation direction determined in the S404, except at x=6. At x=6, it is min_rel=r(6,1)=0 and c(x)=0, and therefore the judgment in the S403 is "no", resulting in the intra-field interpolation direction being determined to be the c direction.

What shows the thusly determined intra-field interpolation directions by using double-pointed arrows representing the directions is an intra-field interpolation direction description diagram 243. The result of the interpolation based on the intra-field interpolation directions is a post-interpolation field image $G_i$. As clear from the cumulative correlation value list 242 and intra-field interpolation direction description diagram 243, the utilization of cumulative correlation values causes the cumulative correlation value for the r2 direction to be the minimum at x=3 and x=4 even if the local correlation value for the r2 direction is not a minimum. That is, R(3,2)<L(3,2) and R(4,2)<L(4,2) are applied. As a result, an intra-field interpolation direction is correctly determined to be the r2 direction at x=3 and x=4, the black diagonal line is uninterruptedly included in the post-interpolation field image $G_i$, and thus a good image quality is achieved.

Figure 20:
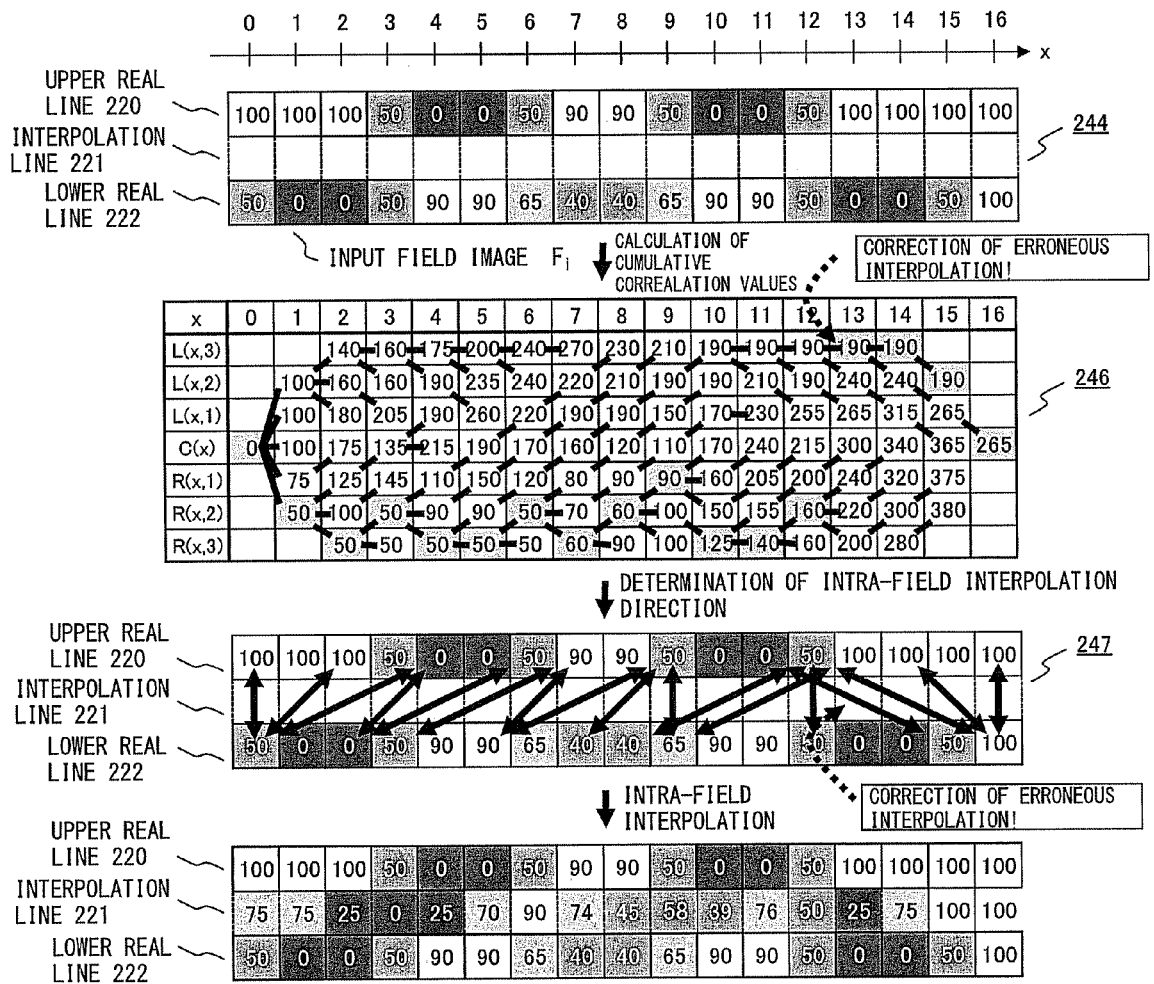
FIG. 20 is a diagram showing the case of processing the same image as FIG. 19 by using an interpolation method determination process modifying the first embodiment.

Next a description of the second advantage of utilizing cumulative correlation values by referring to FIGS. 19 and 20. FIG. 19 exemplifies a conventional interpolation chain-reacting erroneous interpolations; and FIG. 20 is a diagram showing the case of processing the same image as FIG. 19 by using an interpolation method determination process modifying the first embodiment.

The upper part of FIG. 19 shows an original image P in which all lines are real lines, the middle part shows an interlace image I corresponding to the original image P, and the lower part shows an intra-field interpolation direction description diagram 245 related to a part of the interlace image I. Note that FIG. 19 is shown as the interlace image I being obtained on the basis of the original image P for the convenience of description. In reality, however, the original image P may not exist and instead the original image P is a progressive image which should be obtained from an interlace image I, assuming that a correct, ideal IP conversion is carried out.

The original image P is an image in which two gray edges of an inverted V are vertically lined up in a whitish background and is a horizontal 17 pixels by vertical 9 pixels in size. The interlace image I is an image in which every other line has been thinned out from nine lines. The interlace image I includes five real lines, while interpolation is required for four interpolation lines. FIG. 19 is herein described by focusing on the second and third real lines. The part consisting of these two real lines and the interpolation line sandwiched thereby is called a "focus part" and is referred to by the sign "244". As clear by comparing the focus part 244 with the original image P, if a right-upward direction, such as the r3 direction, is determined to be the intra-field interpolation direction in the range 0≦x≦7 of the focus part 244, and if a left-upward direction, such as the l3 direction, is determined to be the intra-field interpolation direction in the range of 8≦x≦16, a result with a high image quality should be obtained.

The conventional method described in FIG. 19, however, determines the intra-field interpolation direction for a target pixel depending on the intra-field interpolation direction for the neighboring pixel near the target pixel, thereby causing an error in the intra-field interpolation direction like a chain reaction (such kind of error is called "erroneous interpolation" hereinafter). In this example, since the interpolation line is interpolated sequentially from the left to right, the "neighboring pixel" is specifically the pixel on the left side of a target pixel.

That is, even in the range of 8≦x≦16 where the left-upward direction is desired to be determined as the intra-field interpolation direction, an intra-field interpolation direction is determined dependent on the right-upward direction selected, as the intra-field interpolation direction, on the left side of the aforementioned range. This accordingly results in the right-upward direction being determined to be the intra-field interpolation direction also for a target pixel in the range of 8≦x≦116 as shown in the intra-field interpolation direction description diagram 245, thus erroneous interpolation being performed like a chain reaction. Further, the chain reaction continues across the range of 8≦x≦16 as shown in the drawing.

That is, if an image is such that desirable intra-field interpolation directions greatly change at a bordering position, such as an image including a V-shaped or inverted V-shaped edge, the conventional method of FIG. 19 may cause a continued erroneous interpolation. The reason is that the intra-field interpolation direction is determined under the influence of the previous intra-field interpolation direction even after crossing the border. For example, once an erroneous interpolation occurs for a certain target pixel nearby the border, the erroneous interpolation influences target pixels positioned in a wide range, resulting in erroneous interpolations in chain reaction in a wide range.

In contrast, the interpolation method determination process according to the first embodiment limits such a chain reaction of erroneous interpolation to a certain range if it occurs and is capable of recovering from the chain reaction of the erroneous interpolation. This fact is described by referring to FIG. 20. Note that FIG. 20 is a diagram based on an interpolation method determination process partially modified from the first embodiment, in which the modification is concerning the process related to the left and right edges of an image and therefore the determination of an interpolation method is basically similar to the first embodiment described above.

The first row of FIG. 20 shows the focus part 244 of FIG. 19 together with the numerical values of pixel values. The pixel value interpolation apparatus 200 receives, as an input field image $F_i$, the image including the upper real line 220 and lower real line 222. The interpolation line 221 is a line to be interpolated, being sandwiched between the two real lines 220 and 222. The pixel value interpolation apparatus 200 then carries out the processes shown in FIGS. 10, 13 and 14. Note that the example shown in FIG. 20 considers seven directions, i.e., l3, l2, l1, c, r1, r2 and r3 directions, as correlation calculation directions.

The calculated cumulative correlation values are as shown in a cumulative correlation value list 246 drawn in the second row. The notation of the cumulative correlation value list 246 is similar to that of the cumulative correlation value list 242 shown in FIG. 18, indicating the box corresponding to the directions selected as dir having the minimum cumulative correlation value in gray.

Note that, in the cumulative correlation value list 246, the values such as "100" and "50" are written in the boxes indicating L(1,2) and R(1,2), that is, a numerical value is written in a box which should be blank because the cumulative correlation value would be "BIG" according to the definition of the cumulative correlation value as described above. The reason is that a part of the calculation method for the cumulative correlation value according to the first embodiment is changed in FIG. 20. As shown in the expression (44), L(1,2)= BIG in accordance with the calculation method of the first embodiment. That is, there are several cumulative correlation values calculated to be "BIG" at or near the left edge and right edge of an image. FIG. 20 shows an example modified from the first embodiment so as to reduce the number of cumulative correlation values calculated to be "BIG".

That is, two or three associated directions are associated for each correlation calculation direction in the expressions (35) through (43); in the example of FIG. 20, however, the number of associated directions is increased exceptionally at and near the left or right edge of an image. For example, in the pixel at x=1, the associated directions of the l2 direction also includes the c direction, in addition to the three direction, i.e., the l3, l2 and l1 direction, as in the first embodiment. Such increase in the associated directions makes it possible to calculate cumulative correlation values L(1,2) and R(1,2) even for the pixel positioned at x=1.

Such modification of increasing the associated directions is to enable the calculation of a cumulative correlation value corresponding to the correlation calculation direction for which a local correlation value is calculable. For the pixel, for example, at x=1, local correlation values corresponding to the five directions, i.e., l2 through r2 directions, are calculable. Therefore, increasing the associated directions exceptionally at x=1 as described above enables the calculations, for the pixel at x=1, of the cumulative correlation values for the five directions, i.e., l2 through r2 directions. Such a modification, however, is not mandatory, and instead it is naturally possible to calculate cumulative correlation values strictly in accordance with the expressions (32) through (43).

Meanwhile, as clear from the bold lines connecting pairs of cumulative correlation values in the cumulative correlation value list 246, all cumulative correlation values include the C(0) as a constituent component. That is, the cumulative correlation value C(0) influences all cumulative correlation values evenly. Therefore, the specific value of the cumulative correlation value C(0) does not influence which of a pair of cumulative correlation values is larger.

An intra-field interpolation direction description diagram 247 shown in the third row shows the determined intra-field interpolation directions by using arrows. In FIG. 20, the value of k used in the S403 of FIG. 14 is assumed to be 1.5. Then, the judgment in the S403 is "no" only at x=0, 9 and 12, and the intra-field interpolation direction is changed to the c direction. The fourth row shows the result of interpolation.

In the example of FIG. 20, inappropriate intra-field interpolation directions are selected in 7≦x≦12. As clear by looking at the original image P shown in FIG. 19, the edge represented by the pixels on the lower real line 222 in the range of 6≦x≦9 does not exist in the upper real line 220. Therefore, an erroneous interpolation occurs in this range, and the erroneous interpolation is chain-reacted until the x=12 as a result. In the range of 13≦x≦16, however, an appropriate interpolation is carried out by being recovered from the chain-reaction of the erroneous interpolation and selecting the appropriate direction as intra-field interpolation direction.

Either of the l2 and l3 directions was not actually selected as an intra-field interpolation direction in the range of x<13 because of not indicating the strongest correlation. However, as shown in FIG. 20, correlations in the l2 and l3 directions are relatively strong at, for example, x=11 and x=12. Such a trend of correlation in the l2 and l3 directions in the range of x<13 can be considered for the target pixel at x=13 via the cumulative correlation values according to the above described embodiment. For example, while the l3 direction was not selected in the case of x=12, the L (12,3) corresponding to the l3 direction is stored in the storage unit 201 and referred to when determining an intra-field interpolation direction for interpolating the pixel at x=13, and the l3 direction is appropriately selected as the intra-field interpolation direction at x=13 as a result.

As such, a correlation in a direction which was not selected for the previous pixel is also considered in the above described embodiment by way of the cumulative correlation values. Therefore, if an erroneous interpolation is carried out, a chain reaction of it in a wide range does not easily occur. In the case of an image in which the inverted V-shaped or V-shaped edge is repeated several times, such as the original image P shown in FIG. 19, there actually is significant difference in the image quality of the output progressive image depending on whether or not it is possible to recover from the chain reaction of an erroneous interpolation in the middle of a process, that is, whether or not it is possible to correct the erroneous interpolation at a certain point in time.

Next is a description of a second embodiment of the present invention by referring to FIGS. 21 through 30. The second embodiment differs from the first embodiment, where the former is configured to carry out a mixed interpolation in lieu of the intra-field interpolation when a motion is detected by a static/moving judgment. Described in detail later, the "mixed interpolation" is an interpolation in combination between the intra-field interpolation and an inter-field interpolation. The first and second embodiments, however, are much in common, such as the calculation of a cumulative correlation value based on a local correlation value. Further, the assumptions (a) through (j) used for the first embodiment are also applied to the second embodiment. The difference between the first and second embodiments lies in the difference in the interpolation-use pixel determination unit 106 shown in FIG. 7 and in the difference in the step S105 shown in FIG. 8.

Figure 21:
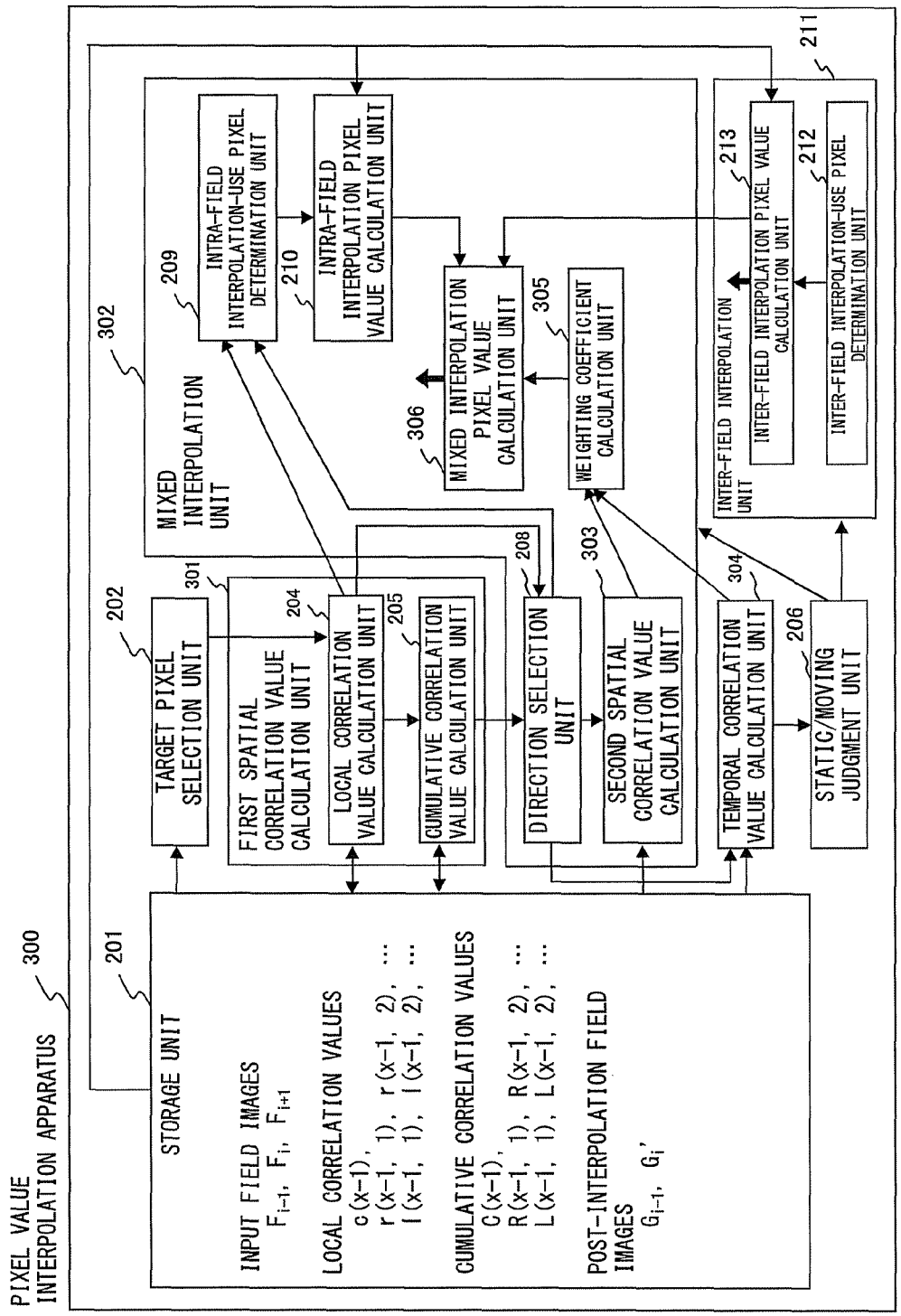
FIG. 21 is the functional block configuration diagram of a pixel value interpolation apparatus according to a second embodiment.

FIG. 21 is the functional block configuration diagram of a pixel value interpolation apparatus 300 according to the second embodiment. Likewise the pixel value interpolation apparatus 200 of FIG. 9, the pixel value interpolation apparatus 300 shown in FIG. 21 is also one of specific example of the interpolation method determination apparatus 100 of FIG. 7. The pixel value interpolation apparatus 300 not only determines an interpolation method for a pixel value but also interpolates the pixel value on the basis of the determined method, and therefore has the name different from the interpolation method determination apparatus 100. A brief description of the configuration of the pixel value interpolation apparatus 300 is only provided here, and the function of each constituent component is described in detail later. Further, the same constituent component as, or similar to, that used for the configuration of FIG. 9, among those components comprised by the pixel value interpolation apparatus 300, is referred to by assigning the same component sign among in the following description.

The pixel value interpolation apparatus 300 comprises a storage unit 201, a target pixel selection unit 202, a first spatial correlation value calculation unit 301, a temporal correlation value calculation unit 304, a static/moving judgment unit 206, a mixed interpolation unit 302 and an inter-field interpolation unit 211.

The storage unit 201 shown in FIG. 21 is similar to the storage unit 201 of FIG. 9. The second embodiment needs also post-interpolation field images for interpolating a target pixel as described later, and FIG. 21 clearly shows the fact of the storage unit 201 storing also post-interpolation field images. Note that, in the drawing, a post-interpolation field image obtained by interpolating a precedent field image $F_{i-1}$ is referred to by the sign "$G_{i-1}$," and an image which is obtained from a target field image $F_i$ and which is interpolated for only a part of pixels (and the remainder of pixels are yet to be interpolated) is referred to by the sign "$G_i'$". Note also that an image $G_i'$ is also called "post-interpolation field image" because whether or not an interpolation is completed for the entirety of an image is not so important in the second embodiment. Also, a post-interpolation field image obtained by completing an interpolation for all pixels on all interpolation lines of a target field image $F_i$ is referred to by the sign "$G_i$," in the following description, though the post-interpolation field image $G_i$ is not shown in FIG. 21.

The first spatial correlation value calculation unit 301, being similar to the correlation value calculation unit 203 of FIG. 9 in terms of its function despite the name is different, comprises the local correlation value calculation unit 204 and cumulative correlation value calculation unit 205. The mixed interpolation unit 302 comprises a direction selection unit 208, a second spatial correlation value calculation unit 303, an intra-field interpolation-use pixel determination unit 209, an intra-field interpolation pixel value calculation unit 210, a weighting coefficient calculation unit 305 and a mixed interpolation pixel value calculation unit 306. The inter-field interpolation unit 211 comprises the inter-field interpolation-use pixel determination unit 212 and inter-field interpolation pixel value calculation unit 213 likewise FIG. 9.

Referring to FIG. 21, arrows not pointing at anything are drawn out of the mixed interpolation pixel value calculation unit 306 and inter-field interpolation pixel value calculation unit 213, respectively. These two arrows are meant to point at the storage unit 201, while they cannot be delineated as such due to the limitation of the drawing. The second embodiment is configured to calculate the pixel value of a target pixel by using the mixed interpolation pixel value calculation unit 306 or inter-field interpolation pixel value calculation unit 213 as described later. The data of a post-interpolation field image stored in the storage unit 201 includes the data of the aforementioned calculated pixel value. These two arrows represent the storing of the post-interpolation field image.

The pixel value interpolation apparatus 300 shown in FIG. 21 comprises the constituent components which are specific respective examples of the constituent components of the interpolation method determination apparatus 100 of FIG. 7, and in addition, comprises constituent components not comprised in the configuration of FIG. 7.

FIG. 21 corresponds to FIG. 7 as follows.

The storage unit 201 is similar to the storage unit 101, and FIG. 21 shows the storage contents more specifically than FIG. 7. The target pixel selection unit 202 corresponds to the target pixel selection unit 102, with the selection sequence direction being made more specific in the former. The local correlation value calculation unit 204 and cumulative correlation value calculation unit 205 correspond to the local correlation value calculation unit 103 and cumulative correlation value calculation unit 104, respectively, with the calculation formulae of the local correlation value and cumulative correlation value being made specific for the former two units. The direction selection unit 208 corresponds to the direction selection unit 105, with the criteria for selection being made specific for the former. The intra-field interpolation-use pixel determination unit 209 and inter-field interpolation-use pixel determination unit 212 correspond to the interpolation-use pixel determination unit 106, with the procedure for the determination of an interpolation-use pixel being made specific for the former two units.

Figure 22:
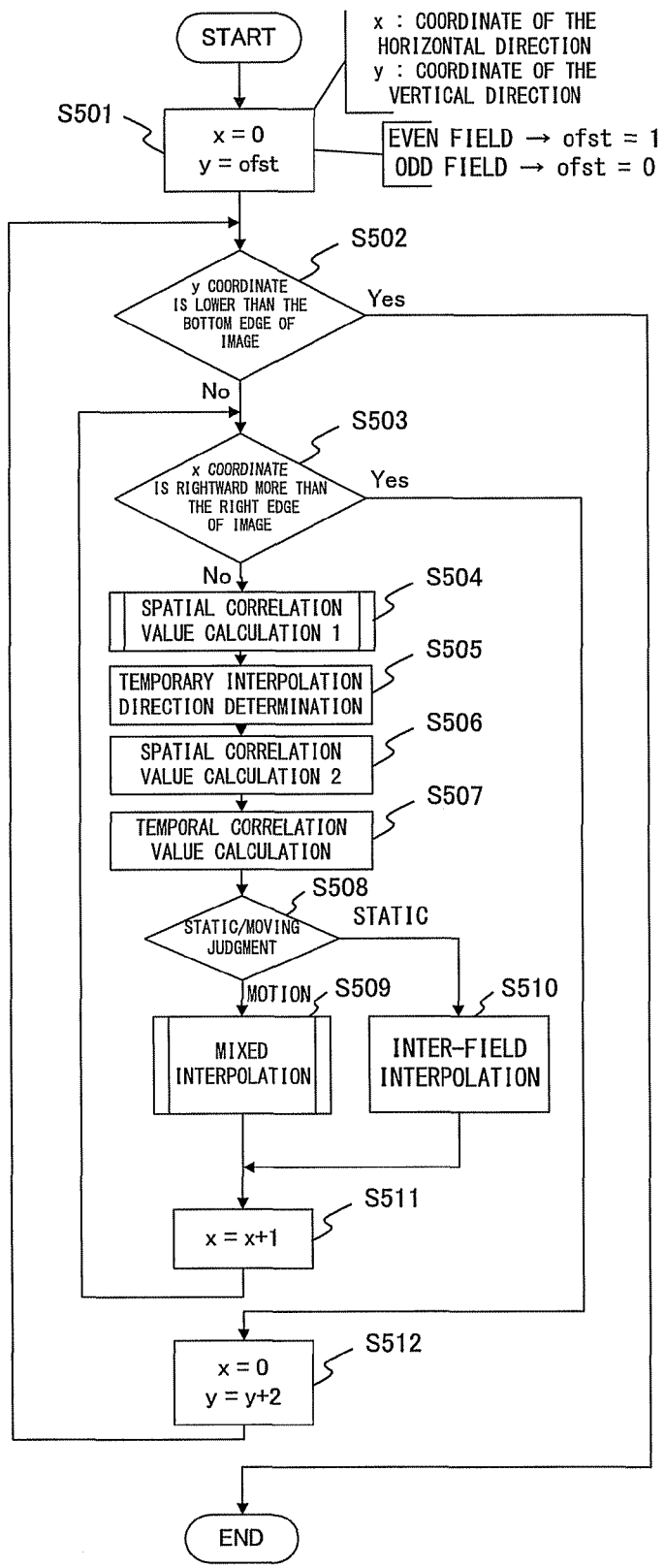
FIG. 22 is the flow chart of an interpolation process according to the second embodiment.

Next is a description of an interpolation process carried out by the pixel value interpolation apparatus 300 according to the second embodiment by referring to a flow chart shown in FIG. 22. The interpolation process includes an interpolation method determination process for determining an interpolation method for a pixel value and a process for interpolating the pixel value in accordance with the determination. The process shown in FIG. 22 is a specification of the process of FIG. 8. FIG. 22 includes some steps similar to those in the flow chart of FIG. 10 showing the first embodiment. First, the common features with FIG. 10 are described.

FIG. 10 shows that the loop related to a variable y is repeatedly executed after the initialization of the variables x and y and the loop related to the variable x is repeatedly executed for one certain value of the variable y. The double loop structure is similar for FIG. 22. That is, in FIG. 10 and FIG. 22, the corresponding steps are: S201 to S501, S202 to S502, S203 to S503, S208 to S511, and S209 to S512. The above noted steps in FIG. 22 are similar to the corresponding steps of FIG. 10 in terms of operations executed therein and therefore the description is not provided here.

That is, the difference between the first and second embodiments is the difference between the steps S204 through S207 shown in FIG. 10 and the steps S504 through S510 shown in FIG. 22. The steps S504 through S510 are accordingly described in the following.

The S504 is approximately same as the S204. In the S504, the first spatial correlation value calculation unit 301 calculates spatial correlation values for a target pixel positioned at (x,y) and stores them in the storage unit 201. Here, the "spatial correlation value" is an upper level concept comprehending the local correlation value and cumulative correlation value which are described in the first embodiment. The spatial correlation values calculated in the S504 are specifically the local correlation values and cumulative correlation values. That is, the local correlation value calculation unit 204 calculates local correlation values and the cumulative correlation value calculation unit 205 calculates cumulative correlation values. The calculation method for the local correlation values and cumulative correlation values are exactly the same as the case of the first embodiment, which are shown in FIG. 13.

A local correlation value is calculated on the basis of the pixel values of plural pixels included in the same field image $F_i$. These plural pixels exist at different positions. Note that a position is a spatial concept. Meanwhile, a cumulative correlation value is calculated by accumulating the local correlation values. Therefore, it can be said that the local correlation value and cumulative correlation value represent respective certain spatial correlations.

Note that the second embodiment is configured to utilize also a spatial correlation value other than the local correlation value and cumulative correlation value as described later in detail. Either spatial correlation value represents a spatial correlation which is calculated on the basis of the pixel values of pixels at different plural positions in the same field image $F_i$.

After calculating the local correlation value and cumulative correlation value, the process shifts to S505. In the S505, the direction selection unit 208 determines a temporary interpolation direction "dir" for the target pixel. The "temporary interpolation direction" in this event is defined as a direction with the smallest cumulative correlation value from among correlation calculation directions. That is, a process similar to that of the S401 of FIG. 14 is carried out in the S505. Then, the process shifts to S506.

In the S506, the second spatial correlation value calculation unit 303 calculates spatial correlation values rel_xy and rel_skew, taking the pixel value of a post-interpolation pixel into account. While these spatial correlation values are described in detail later, they are utilized for calculating a weighting coefficient in a later described step S509. Further, the specific calculation method for the rel_skew is different depending on the dir. After calculating the rel_xy and rel_skew, the process shifts to S507.

In the S507, the temporal correlation value calculation unit 304 calculates temporal correlation values. The "temporal correlation value" is a concept forming a pair with the spatial correlation value. The temporal correlation value is calculated on the basis of the pixel values of plural pixels included in plural field images. The plural different field images correspond to plural different time points, and therefore a correlation value calculated on the basis of the pixel values of plural pixels included in plural field images represents a temporal correlation. The temporal correlation value and spatial correlation value alike are words representing a large width of concept.

In the S507, three kinds of temporal correlation values, i.e., rel_xt, rel_yt and rel_yt2, are specifically calculated, while the calculation method is described in detail later. Among the three, the specific calculation method is different for the rel_yt2 depending on the dir. After the temporal correlation value calculation unit 304 calculates these temporal correlation values, the process shifts to S508.

In the S508, the static/moving judgment unit 206 performs a static/moving judgment. The specific process of the static/moving judgment may be the same as the S205 of FIG. 10; the second embodiment is configured to perform a static/moving judgment by utilizing the temporal correlation values calculated in the S507, thereby judging whether there is a motion nearby the target pixel at a clock time $t_i$.

If the static/moving judgment judges that there is a "motion", that is, if a motion is detected, the process shifts to S509, while if it judges as static, the process shifts to S510.

The S509 is carried out if a motion is detected in the static/moving judgment, and a mixed interpolation of a combination between an intra-field interpolation and an inter-field interpolation is carried out. The outline of the mixed interpolation is as follows, while it is described in detail later in association with the flow chart shown in FIG. 29.

A pixel value, which would be used for interpolating a target pixel if an intra-field interpolation were applied, is calculated by the intra-field interpolation-use pixel determination unit 209 and intra-field interpolation pixel value calculation unit 210. Also, a pixel value, which would be used for interpolating a target pixel if an inter-field interpolation were applied, is calculated by the inter-field interpolation-use pixel determination unit 212 and inter-field interpolation pixel value calculation unit 213. Then, the weighting coefficient calculation unit 305 calculates two weighting coefficients to be multiplied respectively to the two pixel values, and the mixed interpolation pixel value calculation unit 306 calculates the weighted sum of the two pixel values by using the weighting coefficients, thereby interpolating the target pixel.

After the interpolation for the target pixel, the process shifts to the S511.

Meanwhile, the S510 is carried out if it is judged as static by the static/moving judgment. In the S510, the inter-field interpolation unit 211 carries out an inter-field interpolation in a method similar to the S207 of FIG. 10. After the execution of the inter-field interpolation, the process shifts to S511.

The steps S511 and S512 are similar to the respective corresponding steps of FIG. 10 as described above. By performing the process of FIG. 22, all the pixels on all the interpolation lines included in the target field image $F_i$ are interpolated.

Next is a description of a spatial correlation value rel_skew calculated in the S506 shown in FIG. 22 by referring to FIG. 23. As noted above, the specific calculation method for the rel_skew is different depending on the selected temporary interpolation direction dir. A local correlation value and a rel_skew are similar in terms of the calculation method being defined in accordance with the direction.

The common notation with FIG. 11 shown for a local correlation value is utilized for FIG. 23. The positional relationship of the upper real line 220, interpolation line 221 and lower real line 222 shown in FIG. 23 is the same as FIG. 11. Further, the pixels u0 through u4 and the pixels d0 through d4, all of which are shown in FIG. 23, are real pixels, with the relative positions with the target pixel T being defined as same as those of FIG. 11. That is, the pixel values u0 through u4 and the pixel values d0 through d4 of these pixels are as shown in the expressions (4) through (13). Note that FIG. 11 has drawn nine correlation calculation directions, while FIG. 23 draws only five directions, i.e., c, l1, l2, r1 and r2 directions due to the limitation of the drawing.

While a local correlation value is calculated by using only the pixel values of real pixels, a spatial correlation value rel_skew is calculated by considering also the pixel value of a post-interpolation pixel, namely, a pixel on an interpolation line with its pixel value having been interpolated. A post-interpolation pixel is called "post-interpolation pixel" and the pixel value thereof is called "post-interpolation pixel value" in the following description. Note that a post-interpolation pixel value is also a kind of pixel value and it may accordingly be called simply "pixel value".

Let it be defined that, with the position of a target pixel T being (x,y), the post-interpolation pixel existing at the adjacent left position (x−1,y) is referred to by the sign "m1", and the post-interpolation pixel existing at the adjacent left position (x−2, y) of the pixel m1 is referred to by the sign "m0". Using notation similar to the above paragraph (g) and expressing the post-interpolation pixel value q of the post-interpolation pixel existing at the position (x,y) in a field image $F_i$ corresponding to a clock time $t_i$ as q(j,x,y), then the post-interpolation pixel values m0 and m1 are represented by the following expressions (59) and (60):

$$m0=q(i,x-2,y) \qquad (59)$$

$$m1=q(i,x-1,y) \qquad (60)$$

The rel_skew is defined in accordance with the temporary interpolation direction dir, and the rel_skew is represented by the following expression (61) when dir=c:

$$rel\_skew=\alpha \times |i2-d2|+(1-\alpha) \times (|u1-m1|,|d1-m1|) \qquad (61)$$

Here, "α" (where $0 \leq \alpha \leq 1$) is a coefficient adjusting the contribution of the first term and second term, respectively, of the right side to the rel_skew. Empirically, an α is desirably between 0.5 and 0.75. The α may be a prescribed constant in accordance with the embodiment or it may be specified by a user.

Meanwhile, "f" is the function with two arguments, and the two arguments are both the absolute values of differences between pixel values in the expression (61). Any appropriate function may be used as the function f. Specific examples of the function f are the following expression (62) representing the maximum value of two arguments and expression (63) representing the average of two arguments:

$$f(a,b)=\max(a,b) \qquad (62)$$

$$f(a,b)=(a+b)/2 \qquad (63)$$

The use of a function max as in the expression (62) causes a large number to be reflected to the rel_skew if either of the |u1−m1| and |d1−m1| is the large number in the expression (61). Therefore, the expression (62) represents a bias reflecting the difference in pixel values to the rel_skew highly sensitively.

There is no such bias in the expression (63) and thus neutral. The use of the function f of the expression (63) causes the |u1−m1| and |d1−m1| to be evenly reflected to the rel_skew in the expression (61).

In contrast, the function min selecting the minimum value represents a bias opposite to that represented by the function "max" (simply noted as "function max" hereinafter). While the reason is described later, it is desirable to determine the rel_skew to be a value reflecting the difference in the pixel values. Therefore, the use of the function min as a function f is not preferred.

The first term, i.e., α×|u2−d2|, of the expression (61) represents the correlation between the real pixels u2 and d2. The real pixel u2 is in the c direction viewed from the target pixel T and exists on the upper real line 220, while the real pixel d2 is in a direction opposite to the c direction viewed from the target pixel T and exists on the lower real line 222. The stronger the correlation between the real pixels u2 and d2 is, the smaller the numerical value of the first term of the expression (61) is.

The second term, i.e., (1−α)×f(|u1−m1|,|d1−m1|), of the expression (61) represents the correlation between the real pixel and post-interpolation pixel, both of which exist nearby the target pixel T and both of which are mutually positioned in a direction parallel to the direction connecting the two real pixels considered in the first term. In the case of dir=c, such a set of the real pixel and post-interpolation pixel includes the set of pixels u1 and m1 and the set of pixels d1 and m1 as shown in FIG. 23. Therefore, the second term considers the two sets.

Next is a description of the case of dir=l1. When dir=l1, the rel_skew is as represented by the following expression (64):

$$rel\_skew=\alpha \times |u2-d3|+(1-\alpha) \times f(|u1-m1|,|d2-m1|) \qquad (64)$$

The constant α and function f in the expression (64) are the same as those of the expression (61). That is, a spatial correlation value rel_skew is defined by using the same constant α and function f for any temporary interpolation direction dir.

The commonality between the expressions (64) and (61) lies where the first term represents the correlation between real pixels and the second term represents the correlation between a real pixel and a post-interpolation pixel. The difference between the expressions (64) and (61) lies in positional relationship between the pixels used for calculating a rel_skew.

The first term of the expression (64) considers the correlation between the real pixels u2 and d3. In FIG. 23, the double-pointed arrow connecting between the real pixels u2 and d3 is parallel to the double-pointed arrow indicating the l1 direction in FIG. 11. The difference, however, from FIG. 11 is that neither a pixel existing in the l1 direction viewed from the target pixel T nor a pixel existing in a direction opposite to the l1 direction viewed from the target pixel T is considered in FIG. 23.

The positional relationship between the real pixels u2 and d3 satisfies all of the following three conditions:

Both exist nearby the target pixel T;

The first pixel exists on the upper real line 220 and the second pixel exists on the lower real line 222; and The first pixel exists in the l1 direction when viewed from the second pixel; that is, the second pixel exists in a direction opposite to the l1 direction when viewed from the first pixel.

In other words, when dir=l1, the rel_skew is calculated by using two real pixels existing in the positional relationship satisfying all of these conditions. The second embodiment is configured to use the set of the pixels u2 and u3 among the sets of two real pixels satisfying the above noted three conditions.

The second term of the expression (64) represents the correlation between the real pixel and post-interpolation pixel which exist nearby the target pixel T and have the positional relationship in a direction close to the l1 direction which is considered for the first term. Sorting the correlation calculation directions according to the angle of inclination as described above, the immediate front and back of the l1 direction are l2 direction and c direction. Therefore, the second embodiment is configured to utilize the following two sets of pixels for calculating the second term of the rel_skew when dir=l1:

The set of the post-interpolation pixel m1 on the adjacent left of a target pixel T and the real pixel u1 existing in the c direction when viewed from the post-interpolation pixel m1 and existing on the upper real line 220; and The set of the post-interpolation pixel m1 on the adjacent left of a target pixel T and the real pixel d2 existing in a direction opposite to the l2 direction when viewed from the post-interpolation pixel m1 and existing on the lower real line 222.

Next is a description of the case of dir=r1. In this case, a rel_skew is represented by the following expression (65):

$$rel\_skew = \alpha \times |u3-d2| + (1-\alpha) \times f(|u2-m1|,|d1-m1|) \quad (65)$$

Different from the local correlation value described for FIG. 11, the calculation of the rel_skew which is a spatial correlation value considering a post-interpolation pixel value is not mirror-symmetrical (here, being "mirror-symmetrical" means being horizontally symmetrical with a symmetry axis parallel to the y axis). That is, the expression (64) corresponding to the l1 direction and the expression (65) corresponding to the r1 direction are not mirror-symmetrical, while the l1 and r1 directions are mirror-symmetrical.

The reason for being asymmetrical is that a post-interpolation pixel is utilized for calculating the rel_skew. Likewise the first embodiment, the second embodiment is configured to also select, and interpolate, target pixels sequentially in accordance with the selection sequence direction. That is, the target pixels are selected, and interpolated, sequentially from the left to right on a certain interpolation line. Therefore, a post-interpolation pixel exists only on the left side of a current target pixel T on the interpolation line 221. Therefore, it is not possible to define a mirror-symmetrical expression for the expression (64) corresponding to the l1 direction.

It is, however, possible to define a rel_skew in the case of dir=r1 on the basis of a similar concept to the l1 direction. The expression (65) represents such a definition.

That is, the first term of the expression (65) represents the correlation between two real pixels in the positional relationship satisfying all of the following three conditions:
Both exist nearby a target pixel T;
The first pixel exists on the upper real line 220 and the second pixel exists on the lower real line 222; and
The first pixel exists in the r1 direction when viewed from the second pixel, that is, the second pixel exists in a direction opposite to the r1 direction when viewed from the first pixel.

Further, the second term of the expression (65) represents the correlation between a real pixel and a post-interpolation pixel existing nearby a target pixel T and having a positional relationship of a direction close to the r1 direction. The direction close to the r1 direction specifically includes the r2 and c directions. Therefore, when dir=r1, the calculation of the second term of the rel_skew utilizes the following two sets of pixels:
The post-interpolation pixel m1 on the immediate left of the target pixel T and the real pixel u2 existing in the r2 direction when viewed from the post-interpolation pixel m1 and existing on the upper real line 220; and
the post-interpolation pixel m1 on the immediate left of the target pixel T and the real pixel d1 existing in a direction opposite to the c direction viewed from the post-interpolation pixel m1 and existing on the lower real line 222.

Next is a description of the case of dir=l2, in which case the rel_skew is represented by the following expression (66):

$$rel\_skew = \alpha \times |u1-d3| + (1-\alpha) \times f(|u0-m1|,|d2-m1|) \quad (66)$$

The first term of the expression (66) also represents the correlation between two real pixels existing nearby the target pixel T. Further, the two real pixels are in the positional relationship in which one pixel exists on the upper real line 220 and the other exists on the lower real line 222 with the former pixel existing in the l2 direction viewed from the latter. Further, the second term is calculated by utilizing the following two sets of pixels:
The set of the post-interpolation pixel m1 on the immediate left of the target pixel T and the real pixel u0 existing in the l2 direction viewed from the post-interpolation pixel m1 and existing on the upper real line 220; and
the set of the post-interpolation pixel m1 on the immediate left of the target pixel T and the real pixel d2 existing in a direction opposite to the l2 direction viewed from the post-interpolation pixel m1 and existing on the lower real line 222.

Next is a description of the case of dir=r2, in which case the rel_skew is represented by the following expression (67):

$$rel\_skew = \alpha \times |u3-d1| + (1-\alpha) \times f(|u2-m1|,|d0-m1|) \quad (67)$$

The first term of the expression (67) also represents the correlation between two real pixels existing nearby the target pixel T. Further, the two real pixels are in the positional relationship in which one pixel exists on the upper real line 220 and the other exists on the lower real line 222 with the former pixel existing in the r2 direction viewed from the latter. Further, the second term is calculated by utilizing the following two sets of pixels:
The set of the post-interpolation pixel m1 on the immediate left of the target pixel T and the real pixel u2 existing in the r2 direction viewed from the post-interpolation pixel m1 and existing on the upper real line 220; and
the set of the post-interpolation pixel m1 on the immediate left of the target pixel T and the real pixel d0 existing in a direction opposite to the r2 direction viewed from the post-interpolation pixel m1 and existing on the lower real line 222.

As such, the spatial correlation value rel_skew shown in FIG. 23 has been described; and the rel_skew can be calculated for the l3, l4, r3 and r4 directions (not shown in a drawing herein) in a similar manner. That is, where m is an integer of no smaller than "1", a rel_skew can be defined by the generalization as shown by the expressions (68) through (71) depending on the temporary interpolation direction dir. That is, for dir=lj, where j=2m−1:

$$rel\_skew$$
$$= \alpha \times |p(i,x-m+1,y-1)-p(i,x+m,y+1)|+$$
$$(1-\alpha) \times f(|p(i,x-m,y-1)-q(i,x-1,y)|,$$
$$|p(i,x+m-1,y+1)-q(i,x-1,y)|) \quad (68)$$

For dir=rj, where j=2m−1:

$$rel\_skew$$
$$= \alpha \times |p(i,x+m,y-1)-p(i,x-m+1,y+1)|+$$
$$(1-\alpha) \times f(|p(i,x+m-1,y-1)-q(i,x-1,y)|,$$
$$|p(i,x-m,y+1)-q(i,x-1,y)|) \quad (69)$$

For dir=lj, where j=2m:

$$rel\_skew$$
$$= \alpha \times |p(i,x-m,y-1)-p(i,x+m,y+1)|+$$
$$(1-\alpha) \times f(|p(i,x-m-1,y-1)-q(i,x-1,y)|,$$
$$|p(i,x+m-1,y+1)-q(i,x-1,y)|) \quad (70)$$

For dir=rj, where j=2m:

$$rel\_skew$$
$$= \alpha \times |p(i,x+m,y-1)-p(i,x-m,y+1)|+$$
$$(1-\alpha) \times f(|p(i,x+m-1,y-1)-q(i,x-1,y)|,$$
$$|p(i,x-m-1,y+1)-q(i,x-1,y)|) \quad (71)$$

That is, a spatial correlation value rel_skew represents the correlation between the pixels each of which is in a specific relative position with a target pixel T, where the specific relative position is defined depending on the temporary interpolation direction dir; and the spatial correlation value rel_skew is calculated by using at least the post-interpolation pixel value of one post-interpolation pixel.

The above described spatial correlation value rel_skew is calculated by the second spatial correlation value calculation unit 303 in the S506 of FIG. 22. Furthermore, the second spatial correlation value calculation unit 303 also calculates the spatial correlation value rel_xy defined by the expression (72) in the S506:

$$rel\_xy = \alpha \times |u2-d2| + (1-\alpha) \times f(|u1-m1|, |d1-m1|) \quad (72)$$

The right side of the expression (72) is exactly the same as that of the expression (61), and the rel_xy is equal to the rel_skew in the case of dir=c. As described later, the intra-field interpolation direction determined by the intra-field interpolation-use pixel determination unit 209 comprised by the mixed interpolation unit 302 is either the temporary interpolation direction dir or the c direction. The calculation of a rel_xy is performed to prepare for the case of an intra-field interpolation direction being determined to be the c direction.

Figure 24:
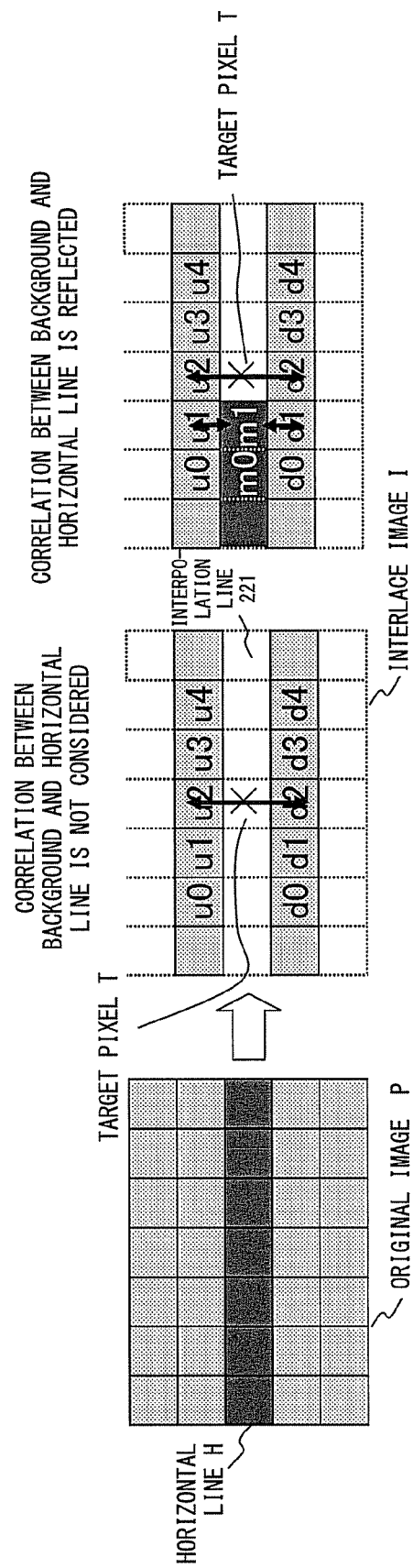
FIG. 24 is a diagram describing the benefit of considering a post-interpolation pixel.

Next is a description, by referring to FIG. 24, of the advantage of calculating a spatial correlation value rel_skew considering a post-interpolation pixel m1. Likewise FIG. 19, FIG. 24 shows an original image P, in which all lines are real lines, in the left column, and the interlace image I corresponding to the original image P in the center column, for convenience of description. What is shown in the right column is how the pixel value interpolation apparatus 300 receives the interlace image I as the input and selects, and interpolates, the pixels positioned on the interpolation line 221 sequentially from the left to right. In this drawing in the right column, the pixels on the left of the target pixel T have already been interpolated.

As shown in FIG. 24, the original image P is an image in which a thin black horizontal line H exists on the interpolation line 221 in a light gray background. The horizontal line H is so thin that it exists only on the interpolation line 221, not on either upper or lower line. The interlace image I accordingly does not includes a horizontal line H at all.

For such an interlace image I, as shown in the center column of FIG. 24, the first embodiment is configured to calculate only local correlation values considering the correlations between the real lines above and below the interpolation line 221 and cumulative correlation values on the basis of the local correlation values. Only the strong correlation between pixels belonging to the background is reflected to the local correlation value, while the correlation between the background and horizontal line H is not reflected thereto.

In contrast, the second embodiment is configured to refer to a post-interpolation pixel m1 and therefore the spatial correlation value rel_skew is a value to which the correlation between the background and horizontal line H is also reflected if the pixel m1 has been appropriately interpolated. In the case of FIG. 24, there is a large difference between the pixel values of the background and horizontal line H, causing the value of rel_skew to be also accordingly large, so that the rel_skew appropriately indicates the fact of the spatial correlation being small near by the target pixel T. As described above, for a certain kind of an original image P, the consideration of the post-interpolation pixel m1 makes it possible to obtain a spatial correlation value representing a spatial correlation more appropriately than another kind of spatial correlation value obtained without taking the post-interpolation pixel m1 into consideration. The fact that an appropriate interpolation is carried out as a result of obtaining an appropriate spatial correlation value is described later in association with FIG. 30.

Next is a description of temporal correlation values calculated by the temporal correlation value calculation unit 304 in the step S507 of FIG. 22 by referring to FIGS. 25 through 28. The present embodiment is configured to utilize a first temporal correlation value, which is calculated on the basis of real pixels existing both in a precedent field image and in a subsequent field image, and a second temporal correlation value which is calculated on the basis of a post-interpolation pixel existing in the precedent field image and a real pixel existing in the target field image.

The real pixels used for calculating the first temporal correlation value are pixels existing at the same position as the target pixel. Alternatively, plural pixels existing at the position of the target pixel and close thereto may be used for calculating the first temporal correlation value. The first temporal correlation value for the present embodiment is specifically the rel_xt.

The position of a post-interpolation pixel and that of a real pixel, both of which are used for calculating the second temporal correlation value, are the same and the position is nearby that of the target pixel. The second temporal correlation values used for the present embodiment are specifically the rel_yt and rel_yt2.

Figure 25:
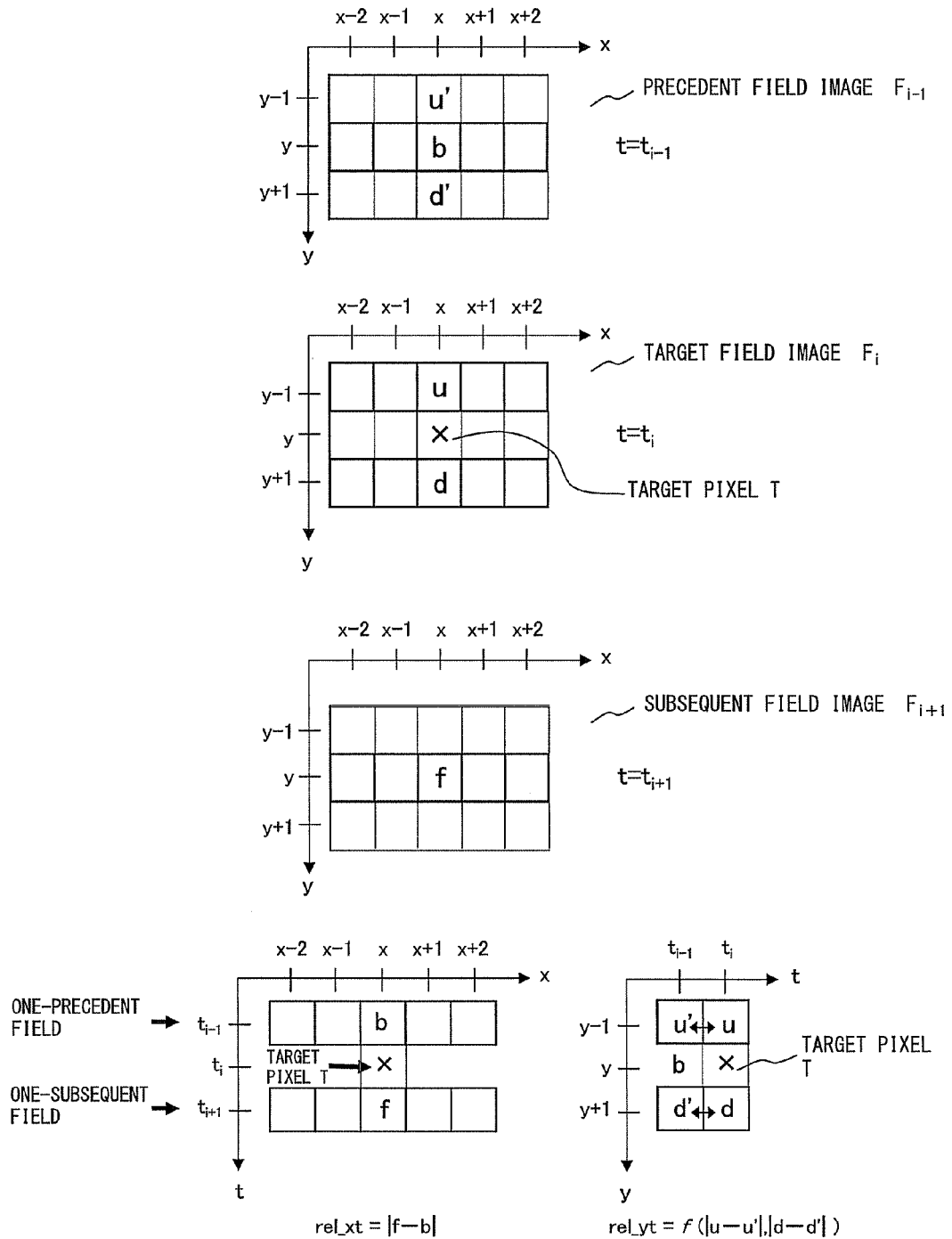
FIG. 25 is a diagram describing temporal correlation values rel_xt and rel_yt according to the second embodiment.
Figure 26:
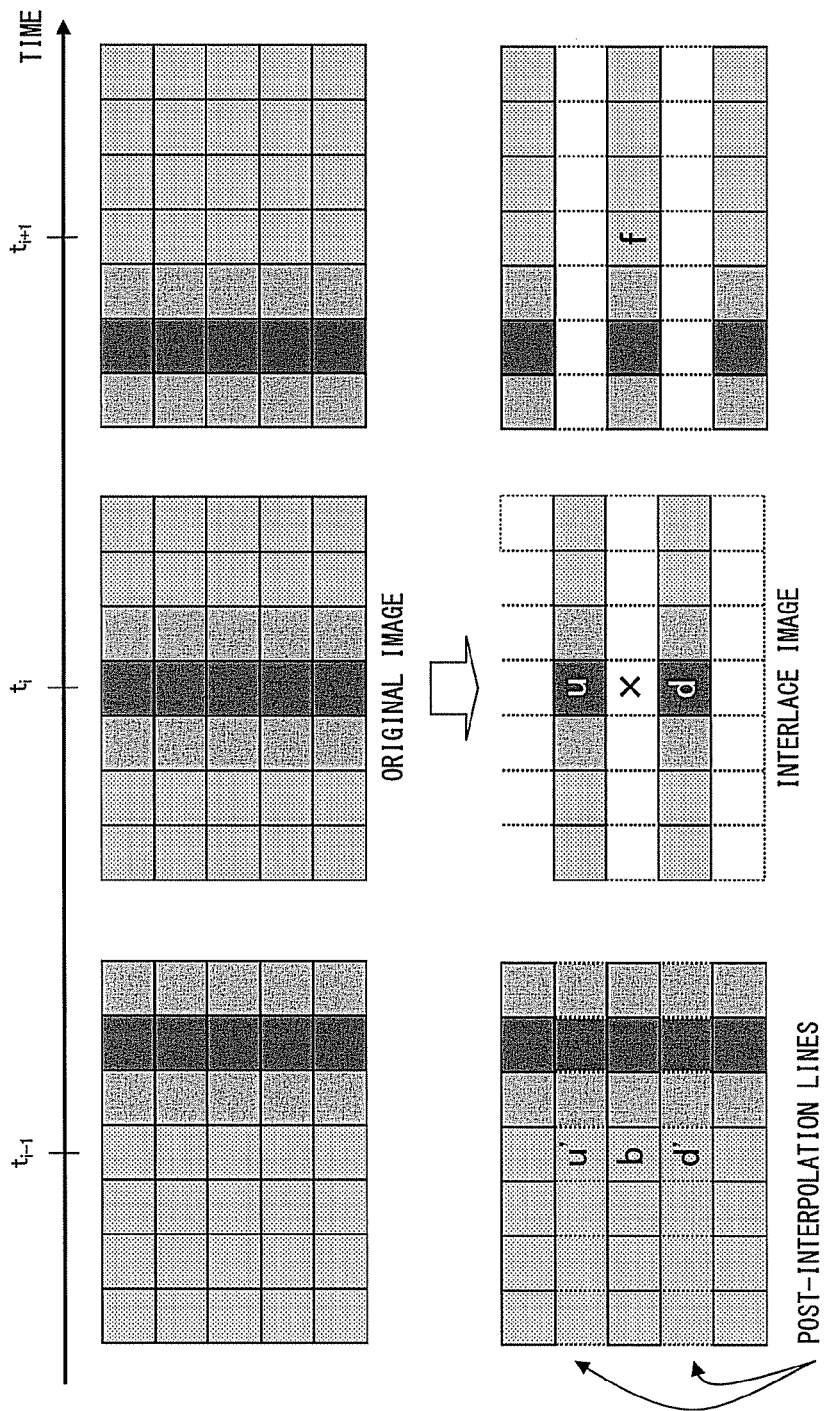
FIG. 26 is a diagram describing the characteristic of temporal correlation values rel_xt and rel_yt in an image in which a vertical line moves fast.

Next are descriptions of the temporal correlation values rel_xt and rel_yt by referring to FIGS. 25 and 26.

FIG. 25 is a diagram for description of the case of interpolating a target pixel T positioned at (x,y) in a target field image $F_i$ corresponding to a clock time $t=t_i$. FIG. 25 shows the precedent field image $F_{i-1}$, target field image $F_i$ and subsequent field image $F_{i+1}$ in the neighborhood of the target pixel T. A real pixel on the real line is indicated by a solid line box and a pixel on the interpolation line is indicated by a dotted line box in FIG. 25.

To begin with, pixels utilized for calculating temporal correlation values are defined as follows:

A real pixel existing at the same position as the target pixel T, that is, at (x,y), in the precedent field image $F_{i-1}$ and the pixel value of the real pixel are referred to by the sign "b".

A real pixel existing at the same position as the target pixel T, that is, at (x,y), in the subsequent field image $F_{i+1}$ and the pixel value of the real pixel are referred to by the sign "f". Incidentally, this "f" is unrelated to the function f of the expressions (61) through (72).

A real pixel existing at the adjoining upper position of the target pixel T, that is, at (x, y−1), in the target field image $F_i$ and the pixel value of the real pixel are referred to by the sign "u".

A real pixel existing at the adjoining lower position of the target pixel T, that is, at (x, y+1), in the target field image $F_i$ and the pixel value of the real pixel are referred to by the sign "d".

A post-interpolation pixel existing at the same position as the pixel u, that is, at (x,y−1), in the precedent field image $F_{i-1}$ and the post-interpolation pixel value of the aforementioned pixel are referred to by the sign "u'".

A post-interpolation pixel existing at the same position as the pixel d, that is, at (x,y+1), in the precedent field image $F_{i-1}$ and the post-interpolation pixel value of the aforementioned pixel are referred to by the sign "d'".

The above definitions are represented by the following expressions (73) through (78):

$$b = p(i-1, x, y) \quad (73)$$

$$f = p(i+1, x, y) \quad (74)$$

$$u = p(i, x, y-1) \quad (75)$$

$$d = p(i, x, y+1) \quad (76)$$

$$u' = q(i-1, x, y-1) \quad (77)$$

$$d' = q(i-1, x, y+1) \quad (78)$$

The temporal correlation value rel_xt represents the correlation between the precedent field image $F_{i-1}$ and subsequent field image $F_{i+1}$ at the position of the target pixel T, and is defined by the following expression (79):

$$rel\_xt = |f - b| \quad (79)$$

Further, the temporal correlation value rel_yt represents the correlation between the precedent field image $F_{i-1}$ and target field image $F_i$ at the upper and lower positions of the target pixel T, and is defined by the following expression (80):

$$rel\_yt = f(|u - u'|, |d - d'|) \quad (80)$$

Since the pixels u and d exist in the neighborhood of the target pixel T, they are called "neighbor pixel" herein. Then, the expression (80) represents the correlation between the neighbor pixel included in the target field image $F_i$ and the post-interpolation pixel existing at the same position as the neighbor pixel in the precedent field image $F_{i-1}$.

Specifically as the function f of the right side of the expression (80), the function shown in, for example, the expression (62) or (63). That is, the function f of the expression (80) performs a function similar to the function used for calculating the spatial correlation value rel_skew. The use of the function f defined by, for example, the expression (62) makes it possible to reflect the difference between the precedent field image $F_{i-1}$ and subsequent field image $F_{i+1}$ to the rel_yt highly sensitively.

Next is a description of the reason for calculating a temporal correlation value rel_yt in addition to a rel_xt by referring to FIG. 26.

FIG. 26 is a diagram describing the characteristic of temporal correlation values rel_xt and rel_yt in an image in which a vertical line moves fast. Likewise FIG. 25, FIG. 26 also shows a target pixel by an x mark, and the signs b, f, u, d, u' and d' represent pixels defined in FIG. 25.

In the example shown in FIG. 26, a dark gray vertical line of only three pixels wide moves from the right to left in a light gray background. This vertical line moves very fast. Therefore, the pixels u', b and d' belong to the background and the vertical line exists to the right of the background in the precedent field image $F_{i-1}$. The vertical line moves to a position, where the positions of the pixel u, target pixel and pixel d is included within the vertical line, in the target field image $F_i$. Then, the vertical line moves to the left of the pixel f in the subsequent field image $F_{i+1}$, causing the pixel f to belong to the background.

In this case, since both the pixels f and b belong to the background, the temporal correlation value rel_xt is a small value and expresses that the correlation between the precedent field image $F_{i-1}$ and subsequent field image $F_{i+1}$ is strong at the position of the target pixel. Therefore, if the static/moving judgment unit 206 performs a static/moving judgment on the basis of only the rel_xt, the judgment results in "being static" at the position of the target pixel at the clock time $t_i$.

As shown in FIG. 26, however, there is actually a very quick motion at the position of the target pixel at the clock time $t_i$. The temporal correlation value rel_yt is for detecting a motion as shown in FIG. 26.

For simplicity of description, the assumption here is that the pixels u' and d' have been appropriately interpolated. This causes both |u−u'| and |d−d'| to be large values and so is the temporal correlation value rel_yt. That is, the rel_yt indicates that the correlation between the precedent field image $F_{i-1}$, and subsequent field image $F_{i+1}$ at least at either one position of the upper and lower sides of the target pixel is weak. The correlation being weak makes it possible to detect a motion in the neighborhood of the target pixel at the clock time $t_i$.

It is, however, desirable to use both the rel_xt and rel_yt as temporal correlation values complementarily, in lieu of using only the rel_yt. The reason is that the rel_yt enables the detection of a quick motion as described above and therefore is superior to the rel_xt in temporal resolution, whereas the rel_yt is inferior to the rel_xt in vertical resolution. That is, while the spread of the pixels used for calculating a rel_xt is only for one pixel in the vertical direction, that is, y direction, the pixels used for calculating a rel_yt exist in the range of three pixels in the vertical direction. Because of this, the vertical resolution of the rel_yt is inferior to that of the rel_xt.

Figure 27A:
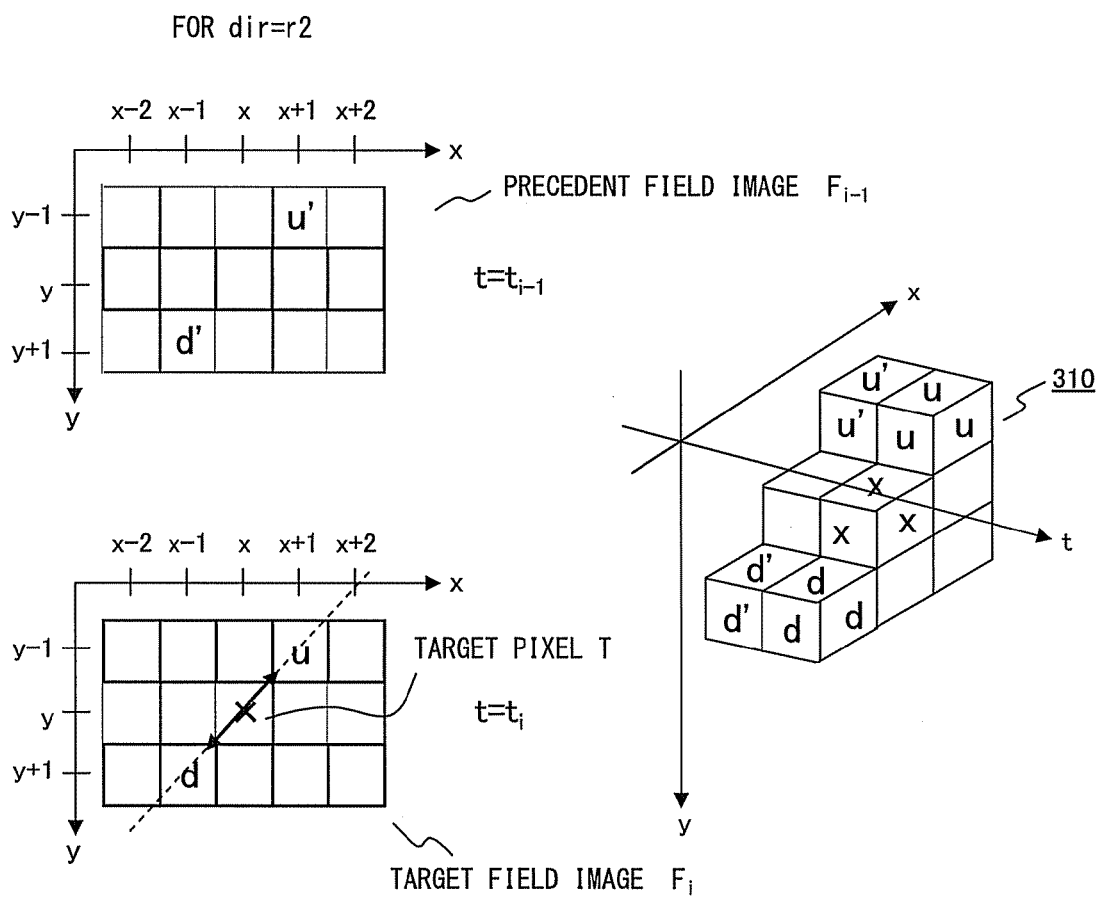
FIG. 27A is a diagram describing a temporal correlation value rel_yt2 according to the second embodiment.
Figure 27B:
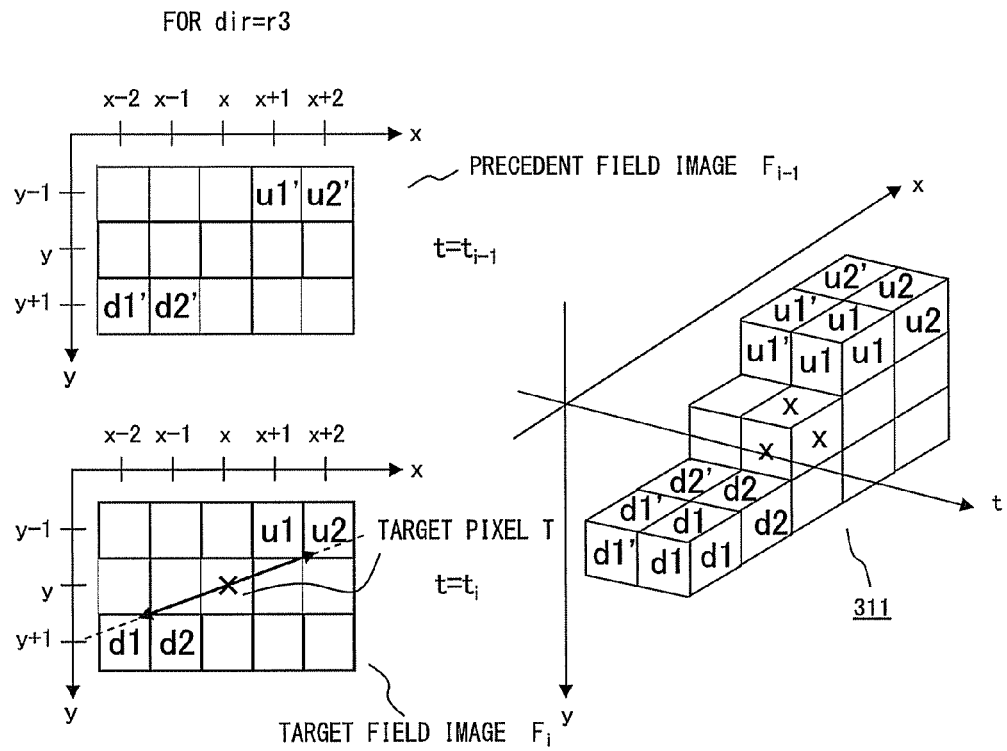
FIG. 27B is a diagram describing a temporal correlation value rel_yt2 according to the second embodiment.

Next is a description of a temporal correlation value rel_yt2, by referring to FIGS. 27A, 27B and 28. As described above, the calculation method of the rel_yt2 is different in accordance with the temporary interpolation direction dir.

FIG. 27A shows the case of dir=r2 and FIG. 27B shows that of dir=r3. Descriptions here are of the two cases in sequence and a common case, followed by the significance of a rel_yt2 by referring to FIG. 28.

FIG. 27A represents the case of interpolating a target pixel T positioned at (x,y) in the target field image $F_i$ corresponding to the clock time t=$t_i$. FIG. 27A shows the precedent field image $F_{i-1}$ and target field image $F_i$, focusing on the neighborhood of the target pixel T.

First, pixels used for calculating a temporal correlation value rel_yt2 in the case of dir=r2 are defined as the following. The caution here is that although the same signs u, d, u' and d' as those used in FIG. 25 are used in the following definitions, they carry the different meanings from the case of FIG. 25:

A real pixel existing on the upper real line and at a position in the r2 direction viewed from the target pixel T, that is, at (x+1,y−1), in a target field image $F_i$ and the pixel value of the real pixel are referred to by the sign "u".

A real pixel existing on the lower real line and at a position in a direction opposite to the r2 direction viewed from the target pixel T, that is, at (x−1,y+1), in the target field image $F_i$ and the pixel value of the real pixel are referred to by the sign "d".

A post-interpolation pixel existing at the same position as the pixel u, that is, at (x+1,y−1) in a precedent field image $F_{i-1}$ and its post-interpolation pixel value are referred to by the sign "u'".

A post-interpolation pixel existing at the same position as the pixel d, that is, at (x−1,y+1) in a precedent field image $F_{i-1}$ and its post-interpolation pixel value are referred to by the sign "d'".

The following expressions (81) through (84) represent the definition noted above:

$$u = p(i, x+1, y-1) \quad (81)$$

$$d = p(i, x-1, y+1) \quad (82)$$

$$u' = q(i-1, x+1, y-1) \quad (83)$$

$$d' = q(i-1, x-1, y+1) \quad (84)$$

The positions of thusly defined pixels u and d correspond to the r2 directions, as clear from a comparison with FIG. 11.

Therefore, the positions of post-interpolation pixels u' and d' also correspond to the r2 direction.

Meanwhile, FIG. 27B also shows the illustration diagram 310 illustrating parts of the precedent field image $F_{i-1}$ and target field image $F_i$ in three dimensions by using the xyt coordinate system. The illustration diagram 310 shows each pixel cubically for convenience.

The following expression (85) represents a temporal correlation value rel_yt2 for dir=r2. For dir=r2, the pixel values defined by the expressions (81) through (84) are used in the following expression (85):

$$rel\_yt2 = f(|u-u'|, |d-d'|) \quad (85)$$

As the function f in the expression (85), the function shown in, for example, the expressions (62) or (63) can be used. That is, the function f in the expression (85) performs the function similar to that of the function f in the expression (80).

Where the temporal correlation value rel_yt2 is calculated by using pixels at specific relative positions related to a target pixel T and the specific relative positions is defined depending on the temporary interpolation direction dir, the rel_yt2 resembles the spatial correlation value rel_skew. Further, where the temporal correlation value rel_yt2 indicates the correlation between the precedent field image $F_{i-1}$, and target field image $F_i$ at a specific position, the rel_yt2 resembles the temporal correlation value rel_yt. That is, likewise the rel_yt, the rel_yt2 also represents the correlation between a neighbor pixel included in the target field image $F_i$ and a post-interpolation pixel existing at the same position as the neighbor pixel in the precedent field image $F_{i-1}$.

Next is a description of a temporal correlation value rel_yt2 in the case of dir=r3 by referring to FIG. 27B. There are many similarities between FIG. 27B and FIG. 27A, and therefore the common parts are not described here.

First, pixels used for calculating a temporal correlation value rel_yt2 in the case of dir=r3 are defined as follows. The caution here is that although the same signs u1, u2, d1 and d2 as those used in FIG. 11 and such are used in the following definitions, they carry the different meanings from the case of FIG. 11 and such:

- In a target field image $F_i$, the position on the upper real line and in the r3 direction viewed from a target pixel T is indicated by the coordinates (x+1.5,y−1). The two pixels adjoining each other and sandwiching the aforementioned position from the immediate left and right are referred to by the signs "u1" and "u2". Further, their pixel values are also referred to by the same signs as the pixels. That is, the pixel u1 is a real pixel existing at (x+1,y−1) and the pixel u2 is a real pixel existing at (x+2,y−1).
- In the target field image $F_i$, the position on the lower real line and in a direction opposite to the r3 direction viewed from the target pixel T is indicated by the coordinates (x−1.5,y+1). The two pixels adjoining each other and sandwiching the aforementioned position from the immediate left and right are referred to by the signs "d1" and "d2". Further, their pixel values are also referred to by the same signs as those of the pixels. That is, the pixel d1 is a real pixel existing at (x−2,y+1) and the pixel d2 is a real pixel existing at (x−1,y+1).
- In the precedent field image $F_{i-1}$, the post-interpolation pixel existing at the same position as the pixel u1, that is, at (x+1, y−1), and its post-interpolation pixel value are referred to by the sign "u1'".
- In the precedent field image $F_{i-1}$, the post-interpolation pixel existing at the same position as the pixel u2, that is, at (x+2, y−1), and its post-interpolation pixel value are referred to by the sign "u2'".
- In the precedent field image $F_{i-1}$, the post-interpolation pixel existing at the same position as the pixel d1, that is, at (x−2, y+1), and its post-interpolation pixel value are referred to by the sign "d1'".
- In the precedent field image $F_{i-1}$, the post-interpolation pixel existing at the same position as the pixel d2, that is, at (x−1, y+1), and its post-interpolation pixel value are referred to by the sign "d2'".

The above noted definitions are represented by the following expressions (86) and (93):

$$u1 = p(i, x+1, y-1) \quad (86)$$

$$u2 = p(i, x+2, y-1) \quad (87)$$

$$d1 = p(i, x-2, y+1) \quad (88)$$

$$d2 = p(i, x-1, y+1) \quad (89)$$

$$u1' = q(i-1, x+1, y-1) \quad (90)$$

$$u2' = q(i-1, x+2, y-1) \quad (91)$$

$$d1' = q(i-1, x-2, y+1) \quad (92)$$

$$d2' = q(i-1, x-1, y+1) \quad (93)$$

The positions of thusly defined pixels u1, u2, d1 and d2 correspond to the r3 direction as evidenced by comparing with FIG. 11. Therefore, the positions of post-interpolation pixels u1', u2', d1' and d2' also correspond to the r3 direction. Likewise FIG. 27A, FIG. 27B also shows the illustration diagram 311 using an xyt coordinate system.

For dir=r3, a temporal correlation value rel_yt2 is represented by the following expression (94). In the case of dir=r3, pixel values defined by the expressions (86) through (93) are used for the following expression (94):

$$rel\_yt2 = f((|u1-u1'|+|u2-u2'|)/2, (|d1-d1'|+|d2-d2'|)/2) \quad (94)$$

The function f in the expression (94) is the same function as the function f of the expression (85).

As clear from the expression (94), for dir=r3, the correlations |u1−u1'|, |u2−u2'|, |d1−d1'| and |d2−d2'| between the precedent field image $F_{i-1}$ and target field image $F_i$ are respectively calculated. These four correlations respectively correspond to specific four positions (x+1,y−1), (x+2,y−1), (x−2, y+1) and (x−1,y+1) corresponding to the r3 direction. Then, the present embodiment is configured to calculate the average of |u1−u1'| and |u2−u2'| as a temporal correlation on the upper real line and in the neighborhood of the target pixel T and to provide the calculated average for the function f as the first argument. It is likewise configured to calculate the average of |d1−d1'| and |d2−d2'| as a temporal correlation on the lower real line and in the neighborhood of the target pixel T and to provide the calculated average for the function f as the second argument. As a result, a rel_yt2, which is the correlation between the precedent field image $F_{i-1}$ and target field image $F_i$ at a specific position corresponding to the temporary interpolation direction dir, is calculated.

Next is a description of the procedure for calculating the rel_yt2 in a direction other than the r2 direction and r3 direction by generalizing the descriptions for FIGS. 27A and 27B. Note that "m" is defined as an integer no less than "1".

For dir=rj, where j=2m, the rel_yt2 is calculated by the expression (85) by substituting the following expressions (95) through (98) for the expressions (81) through (84):

$$u = p(i, x+m, y-1) \tag{95}$$

$$d = p(i, x-m, y+1) \tag{96}$$

$$u' = q(i-1, x+m, y-1) \tag{97}$$

$$d' = q(i-1, x-m, y+1) \tag{98}$$

For dir=lj, where j=2m, the rel_yt2 is calculated in the same manner by the expression (85) which is a result of substituting the following expressions (99) through (102) for the expressions (81) through (84):

$$u = p(i, x-m, y-1) \tag{99}$$

$$d = p(i, x+m, y+1) \tag{100}$$

$$u' = q(i-1, x-m, y-1) \tag{101}$$

$$d' = q(i-1, x+m, y+1) \tag{102}$$

For dir=rj, where j=2m−1, the rel_yt2 is calculated, in the same manner, by the expression (94) which is a result of substituting the following expressions (103) through (110) for the expressions (86) through (93):

$$u1 = p(i, x+m-1, y-1) \tag{103}$$

$$u2 = p(i, x+m, y-1) \tag{104}$$

$$d1 = p(i, x-m, y+1) \tag{105}$$

$$d2 = p(i, x-m+1, y+1) \tag{106}$$

$$u1' = q(i-1, x+m-1, y-1) \tag{107}$$

$$u2' = q(i-1, x+m, y-1) \tag{108}$$

$$d1' = q(i-1, x-m, y+1) \tag{109}$$

$$d2' = q(i-1, x-m+1, y+1) \tag{110}$$

For dir=lj, where j=2m−1, the rel_yt2 is calculated in the same manner by the expression (94) which is a result of substituting the following expressions (111) through (118) for the expressions (86) through (93):

$$u1 = p(i, x-m, y-1) \tag{111}$$

$$u2 = p(i, x-m+1, y-1) \tag{112}$$

$$d1 = p(i, x+m-1, y+1) \tag{113}$$

$$d2 = p(i, x+m, y+1) \tag{114}$$

$$u1' = q(i-1, x-m, y-1) \tag{115}$$

$$u2' = q(i-1, x-m+1, y-1) \tag{116}$$

$$d1' = q(i-1, x+m-1, y+1) \tag{117}$$

$$d2' = q(i-1, x+m, y+1) \tag{118}$$

Note that the c direction can be regarded as r0 or l0 direction as understood from FIG. 11. Therefore, the substitution of m=0 for the expressions (95) through (98) makes it possible to calculate the rel_yt2 for dir=c by using the expression (85).

Based on the expressions noted above, the temporal correlation value calculation unit 304 is enabled to calculate a temporal correlation value rel_yt2 for any temporary interpolation direction dir.

Next is a description of the reason for calculating a rel_yt2 by referring to FIG. 28 which is a similar diagram to FIG. 26.

Further, FIG. 28 exemplifies the case of dir=r2, with the signs u, d, u' and d' defined in the same manner as in FIG. 27A. Note that the target pixel indicated by the x mark, the pixels b and f are defined in the same manner as in FIG. 25.

In the example shown in FIG. 28, a mere three pixel-wide dark gray diagonal line moves from right to left in a light gray background. The diagonal line is parallel with the r2 direction and moves very fast. Therefore, the pixels u', b and d' belong to the background and the diagonal line exists on the right side thereof in the precedent field image $F_{i-1}$. The diagonal line moves to a position, where the positions of the pixel u, target pixel and pixel d is included within the diagonal line, in the target field image $F_i$. Further, the diagonal line moves to the left of the pixel f and thus the pixel f belongs to the background in the subsequent field image $F_{i+1}$.

In this case, both the pixels f and b belong to the background, and therefore a temporal correlation value rel_xt is a small value, indicating that the correlation between the precedent field image $F_{i-1}$ and subsequent field image $F_{i+1}$ is strong at the position of the target pixel. Accordingly, if the static/moving judgment unit 206 carries out a static/moving judgment on the basis of only the rel_xt, the judgment "being static" is given at the position of the target pixel at the clock time $t_i$.

As shown in FIG. 28, however, there is actually a very quick motion at the position of the target pixel at the clock time $t_i$. The temporal correlation value rel_yt2 is for detecting a motion as shown in FIG. 28.

Here, the pixels u' and d' are assumed to have been appropriately interpolated for simplicity of description. Then, both |u−u'| and |d−d'| are large value and accordingly the temporal correlation value rel_yt2 is also a large value. The rel_yt2 in this case indicates the correlation between the precedent field image $F_{i-1}$ and target field image $F_i$ is weak at the diagonally upper or lower position of the target pixel, that is, at the position determined on the basis of the temporary interpolation direction dir. The correlation being weak enables the detection of a motion in the neighborhood of the target pixel at the clock time $t_i$.

As described above, the rel_yt2 possesses a high temporal resolution similar to the rel_yt. In contrast, the vertical resolution of the rel_yt2 is inferior to that of the rel_xt, as the rel_yt is inferior to the rel_xt in vertical resolution. Therefore, it is desired to use the rel_yt2 complementarily with the rel_xt.

Next is a description of the static/moving judgment performed by the static/moving judgment unit 206 in the step S508 of FIG. 22. The static/moving judgment unit 206 receives the temporal correlation values rel_xt, rel_yt and rel_yt2 from the temporal correlation value calculation unit 304. The static/moving judgment unit 206 compares three kinds of the temporal correlation values respectively with a predefined threshold value "timeth" (simply noted as "threshold value timeth" hereinafter), and judges whether or not a motion exists in the neighborhood of the target pixel at the clock time $t_i$ on the basis of the comparison result. Specifically, the present embodiment is configured so that the static/moving judgment unit 206 judges as "static" if all of the following expressions (119) through (121) apply:

$$rel\_xt < timeth \tag{119}$$

$$rel\_yt < timeth \tag{120}$$

$$rel\_yt2 < timeth \tag{121}$$

Generally speaking, the expressions (119) through (121) apply if the correlation between the pixels existing at the same position in different field images is strong. That is, these expressions apply if the correlation between fields is strong because there is no motion or only a very little motion. Therefore, the present embodiment is configured such that it is judged as "static" if all of the expressions (119) through (121) apply, while it is judged as "moving", that is, a motion is detected in other cases.

Incidentally, the condition that all the expressions (119) through (121) apply is strict. The reason for setting such a strict condition is that, if the judgment is "being static" in the S508 of FIG. 22, an inter-field interpolation is performed in the S510, and a pixel in the target field image $F_i$ is not utilized as an interpolation-use pixel. Meanwhile, if a motion is detected in the S508, a mixed interpolation including elements of both the intra-field interpolation and inter-field interpolation is performed in the S509. Therefore, the configuration is such that the process, in the S510, including only one element is performed only in the case in which the aforementioned strict condition is satisfied and therefore there is a high reliability of the inter-field interpolation being appropriate.

Meanwhile, the present embodiment is configured to use the same threshold value timeth for all of the expressions (119) through (121); another embodiment may be configured to compare different threshold values for respective temporal correlation values rel_xy, rel_yt and rel_yt2.

Figure 29:
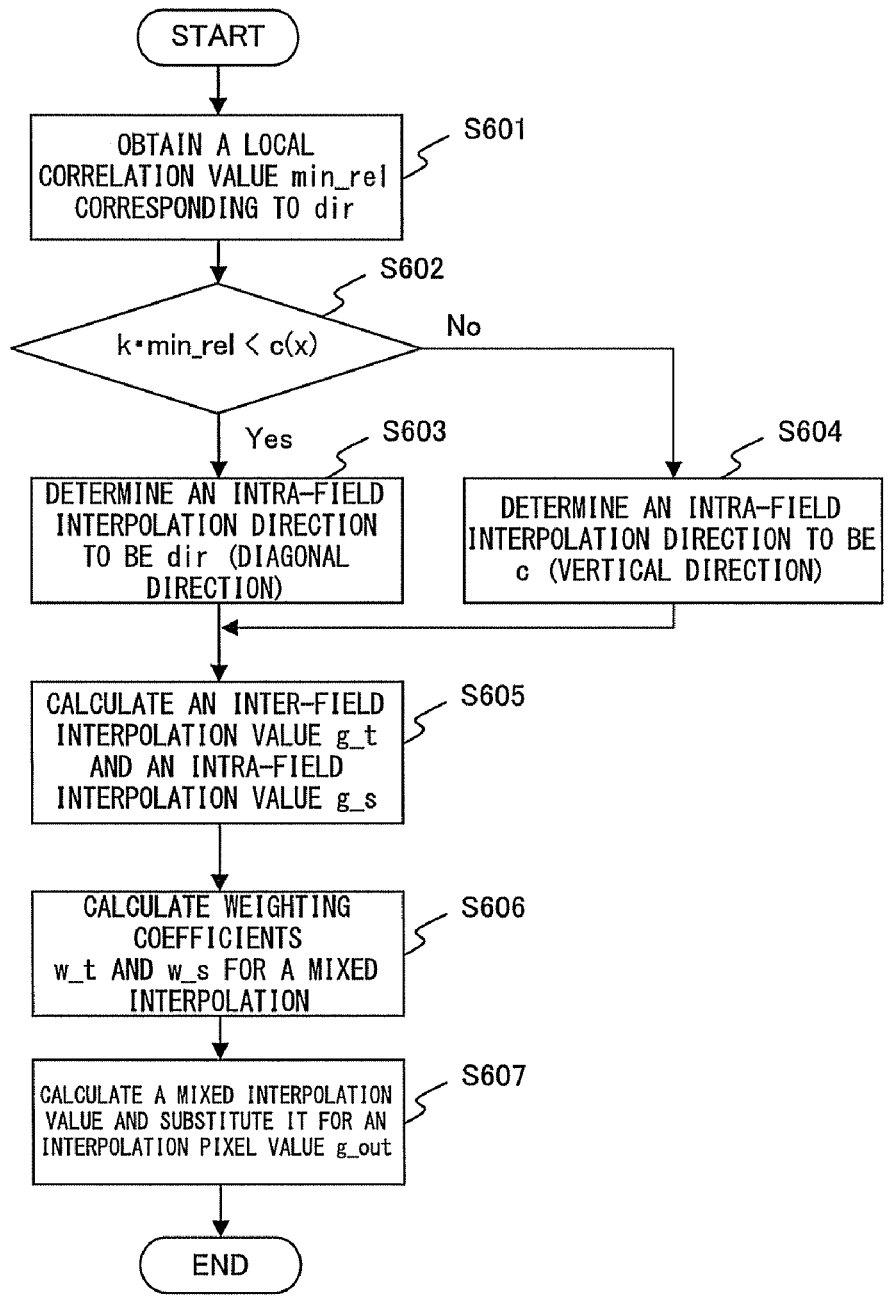
FIG. 29 is the flow chart of a mixed interpolation according to the second embodiment.

Next is a description, in detail, of the mixed interpolation carried out by the mixed interpolation unit 302 in the step S509 of FIG. 22 by referring to the flow chart shown in FIG. 29. FIG. 29 includes the process similar to that of FIG. 14 representing the intra-field interpolation according to the first embodiment.

In S601, the intra-field interpolation-use pixel determination unit 209 obtains a local correlation value min_rel corresponding to the temporary interpolation direction dir. This is similar to the S402 of FIG. 14.

As shown in FIG. 14, in the first embodiment, the correlation calculation direction dir, in which the cumulative correlation value is the minimum, has already been selected in the S401 immediately prior to the S402. In contrast, as shown in FIGS. 22 and 29, in the present second embodiment, the correlation calculation direction dir, in which the cumulative correlation value is the minimum, has already been selected as the temporary interpolation direction prior to the execution of the process shown in FIG. 29, that is, in the S505 of FIG. 22. Thus, the first and second embodiments are the same in terms of the selected correlation calculation direction dir being a direction in which the cumulative correlation value is the minimum. Therefore, the S601 is exactly the same as the S402.

The process shifts to S602 after the S601. The steps S602, S603 and S604 are similar to the respective steps S403, S404 and S405 of FIG. 14, and therefore the description is not provided here. Upon completing the execution of S603 or S604, the process shifts to S605.

In the S605, intra-field interpolation pixel value calculation unit 210 calculates, in a similar manner to the S406 of FIG. 14, a pixel value g_s which would be used for interpolating a target pixel if an intra-field interpolation were performed. The pixel value g_s is called "intra-field interpolation value" hereinafter.

Also in the S605, the inter-field interpolation unit 211 calculates, in a manner similar to the S510 of FIG. 22, a pixel value g_t which would be used for interpolating the target pixel if an inter-field interpolation were performed. The pixel value g_t is called "inter-field interpolation value" hereinafter. Upon calculating both the intra-field interpolation value g_s and inter-field interpolation value g_t, the process shifts to S606.

In the S606, the weighting coefficient calculation unit 305 calculates weighting coefficients w_t and w_s. Each of the weighting coefficients w_t and w_s is defined to have a value between "0" and "1", both ends inclusive, with the sum of the two being "1". Specifically, the weighting coefficients w_t and w_s are calculated differently depending on the intra-field interpolation direction determined in the S603 or S604.

If the intra-field interpolation direction is the c direction, the weighting coefficients w_t and w_s are respectively defined by the following expressions (122) and (123):

$$w\_t = \frac{k2 \cdot \text{rel\_xy}}{(\max(\text{rel\_xt}, \text{rel\_yt}) + \varepsilon) + k2 \cdot \text{rel\_xy}} \quad (122)$$

$$w\_s = \frac{(\max(\text{rel\_xt}, \text{rel\_yt}) + \varepsilon)}{(\max(\text{rel\_xt}, \text{rel\_yt}) + \varepsilon) + k2 \cdot \text{rel\_xy}} \quad (123)$$

The "k2" in the expressions (122) and (123) is a predefined constant and is a coefficient for adjusting a contribution to the weighting coefficient of a spatial correlation value. Empirically, the value of k2 is generally and desirably 1.0.

Meanwhile, the "$\varepsilon$" in the expressions (122) and (123) is also a predefined constant. The $\varepsilon$ is the value added for preventing the denominator from becoming zero when both the temporal correlation values and spatial correlation value are zero. A small value such as 0.01 is accordingly set to the $\varepsilon$.

The temporal correlation values rel_xt and rel_yt, and the spatial correlation value rel_xy used for calculating the weighting coefficients w_t and w_s are nonnegative based on the definitions. Therefore, the k2 and $\varepsilon$ are naturally nonnegative based on the meaning thereof described above. This accordingly makes the weighting coefficients w_t and w_s also nonnegative. Furthermore, the sum of the weighting coefficients w_t and w_s is clearly "1" based on the definitions.

Next is a description of the meanings of the expressions (122) and (123). As described above, the $\varepsilon$ is a constant introduced for the convenience of calculation and therefore $\varepsilon=0$ may be assumed when considering the meaning of the expression. Further, k2=1 is assumed because it is preferable. Based on these assumptions, it will be understood that the weighting coefficient w_t in the expression (122) indicates the ratio of the spatial correlation value to the sum of the temporal correlation value and spatial correlation value, and the weighting coefficient w_s in the expression (123) indicates the ratio of the temporal correlation value to the sum of the temporal correlation value and spatial correlation value.

Next is a description of weighting coefficients w_t and w_s in the case of an intra-field interpolation direction being the same dir as the temporary interpolation direction. In this case, the weighting coefficients w_t and w_s are respectively defined by the following expressions (124) and (125):

$$w\_t = \frac{k2 \cdot \text{rel\_skew}}{(\max(\text{rel\_xt}, \text{rel\_yt2}) + \varepsilon) + k2 \cdot \text{rel\_skew}} \quad (124)$$

$$w\_s = \frac{(\max(\text{rel\_xt}, \text{rel\_yt2}) + \varepsilon)}{(\max(\text{rel\_xt}, \text{rel\_yt2}) + \varepsilon) + k2 \cdot \text{rel\_skew}} \quad (125)$$

The expression (124) is obtained by substituting the spatial correlation value rel_skew for the spatial correlation value rel_xy and substituting the temporal correlation value rel_yt2 for the temporal correlation value rel_yt in the expression (122). The expression (125) is obtained by performing a similar substitution for the expression (123). Meanwhile, the rel_skew and rel_yt2 are nonnegative based on the definitions.

Therefore, the k2 and ϵ are equivalent to those described in the above description and the weighting coefficients w_t and w_s are nonnegative in the expressions (124) and (125). Further, the sum of the weighting coefficients w_t and w_s is clearly "1" based on the definitions.

Incidentally, defining the meaning of an extension from a specific direction, which is the c direction, to a discretionary direction dir as "generalization", the rel_skew is the generalization of the rel_xy and the rel_yt2 is the generalization of the rel_yt as comprehensible from the above description. Therefore, the expressions (124) and (125) can be regarded as the expressions generalizing the expressions (122) and (123) corresponding to a specific direction, which is the c direction, to an expression to be used for the general direction dir. Therefore, it can be said that the weighting coefficient w_t in the expression (124) also indicates the ratio of the spatial correlation value to the sum of the temporal correlation value and spatial correlation value, and that the weighting coefficient w_s in the expression (125) also indicates the ratio of the temporal correlation value to the sum of the temporal correlation value and spatial correlation value.

When the weighting coefficient calculation unit 305 calculate the weighting coefficients w_t and w_s on the basis of the above expressions, the process shifts to S607.

In the S607, the mixed interpolation pixel value calculation unit 306 calculates a mixed interpolation value g_out on the basis of the following expression (126) and interpolates the target pixel by using the mixed interpolation value g_out. Then the process of FIG. 29 ends:

$$g\_out = w\_t \cdot g\_t + w\_s \cdot g\_s \qquad (126)$$

Next is a description of the relationship between the temporal correlation value/spatial correlation value and the weighting coefficients w_t and w_s in the mixed interpolation described above by referring to FIG. 30. The table on the left side of FIG. 30 shows the combinations between the temporal correlation value and spatial correlation value, and the table of the right shows the magnitude of the values of the weighting coefficients corresponding to each combination.

Figure 30:
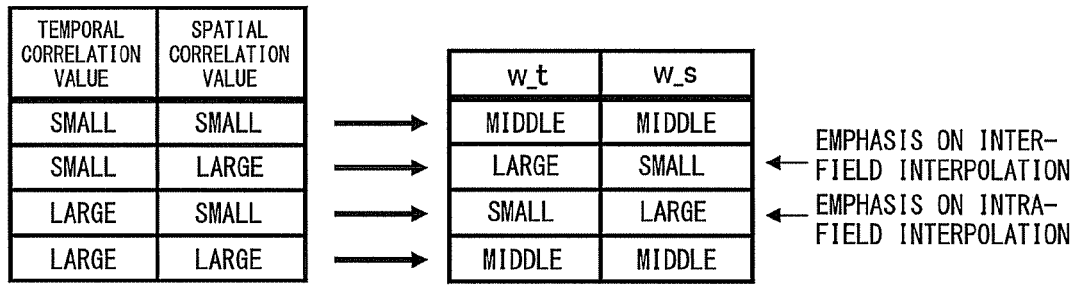
FIG. 30 is a diagram showing the relationship between a temporal correlation value/spatial correlation value and weighting coefficients w_t and w_s.

The w_t and w_s are nonnegative and the sum of the two is "1", and therefore a value close to "0" is indicated by "small", a value close to "0.5" by "middle" and a value close to "1" by "large" in the right-side table of FIG. 30.

In the second embodiment, the correlation is stronger as the value decreases for both the temporal correlation value and spatial correlation value. Further, the maximum and minimum values possible for these temporal and spatial correlation values are common as comprehensible from the above described definitions of rel_xt, rel_yt, rel_yt2, rel_xy and rel_skew. That is, the common minimum value is "0". Further, from the assumption (e) noted above, that is, the pixel values are between 0 and 100, the absolute value of the difference between the pixel values of two pixels is 100 at the maximum. Therefore the common maximum value is 100. This causes the following to apply:

If both the temporal correlation value and spatial correlation value are small or large, that is, the values of them are about the same, the values of the weighting coefficients w_t and w_s are nearly 0.5 based on the expressions (122) through (125). Therefore, the mixed interpolation value g_out is a value close to the average of the inter-field interpolation value g_t and intra-field interpolation value g_s from the expression (126).

If the temporal correlation value is small and the spatial correlation value is large, that is, if the temporal correlation is strong and the spatial correlation is weak, then the w_t is large and the w_s is small based on the expressions (122) through (125). Therefore, the mixed interpolation value g_out becomes a value close to the inter-field interpolation value g_t based on the expression (126). That is, a mixed interpolation in the case of the temporal correlation being strong is an interpolation close to an inter-field interpolation.

In contrast, if the temporal correlation value is large and the spatial correlation value is small, that is, if the temporal correlation is weak and the spatial correlation is strong, then the w_t is small and the w_s is large based on the expressions (122) through (125). Therefore, the mixed interpolation value g_out becomes a value close to the intra-field interpolation value g_s from the expression (126). That is, a mixed interpolation in the case of the spatial correlation being strong is an interpolation close to an intra-field interpolation.

As an example, in the example shown in FIG. 24, a spatial correlation which is not reflected to local correlation values c(x), r(x,j) and l(x,j), each of which is a kind of the spatial correlation value, is reflected to another spatial correlation value rel_skew. That is, the value of the rel_skew is large in the example of FIG. 24. Therefore, the w_s is smaller than, or about the same as, the w_t from FIG. 30. Accordingly, an intermediate interpolation or an interpolation close to the inter-field interpolation is performed for the target pixel T. FIG. 24 shows an example in which an interpolation close to the intra-field interpolation is inappropriate. The above description should enable an understanding that an inappropriate interpolation is avoided for the interlace image I shown in FIG. 24 by performing the mixed interpolation shown in FIG. 29.

Thusly calculated mixed interpolation value g_out includes both a temporal element, that is, the element of an inter-field interpolation, and a spatial element, that is, the element of an intra-field interpolation. Further, the temporal element and spatial element are weighted and adjusted by the weighting coefficients w_t and w_s in accordance with the magnitude (i.e., large/small) relationship between the temporal correlation value and spatial correlation value. Therefore, as compared to the case of determining either inter-field interpolation or intra-field interpolation through a selection of one or the other, the present second embodiment carrying out a mixed interpolation makes it possible to prevent a flicker in the image screen and to obtain a more natural progressive image.

Figure 31:
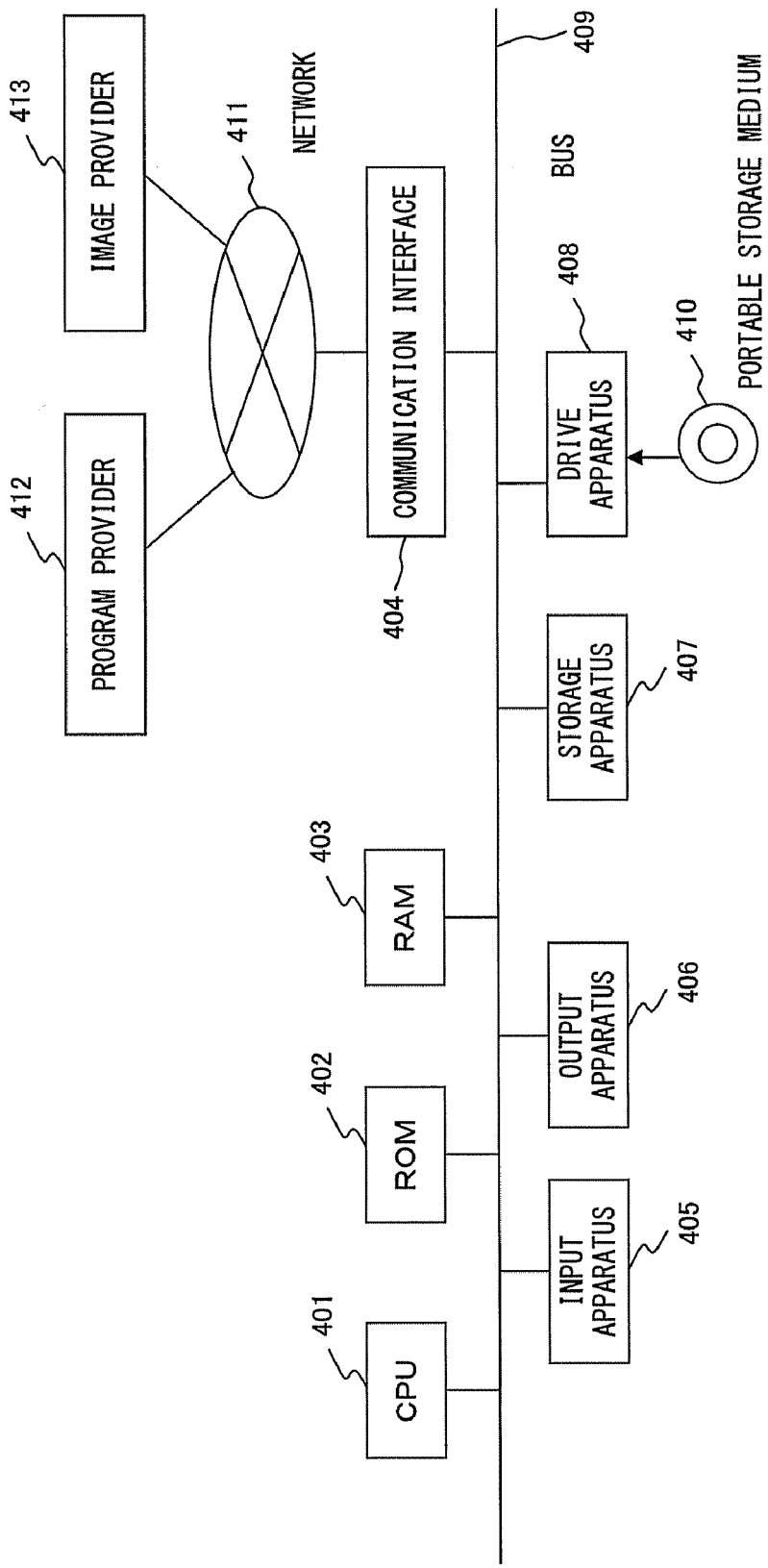
FIG. 31 is the block diagram of a computer executing a program according to the first or second embodiment.

Incidentally, the determination of an interpolation method according to the first or second embodiment may be carried out by a common computer as shown in FIG. 31. Any of the interpolation method determination apparatus 100 shown in FIG. 7, pixel value interpolation apparatus 200 shown FIG. 9 and pixel value interpolation apparatus 300 shown in FIG. 21 can be implemented by the computer shown in FIG. 31. That is, the computer of FIG. 31 executes the processes shown in the above described flow charts, thereby functioning as the interpolation method determination apparatus 100, pixel value interpolation apparatus 200 or pixel value interpolation apparatus 300.

The computer of FIG. 31 comprises a central processing unit (CPU) 401, read only memory (ROM) 402, random access memory (RAM) 403, a communication interface 404, an input apparatus 405, an output apparatus 406, a storage apparatus 407 and a drive apparatus 408 for a portable storage medium 410, with a bus 409 interconnecting all these components.

The computer of FIG. 31 is connected to a network 411 by way of the communication interface 404 which is an interface used for wired and/or wireless telecommunication. The network 411 may be an arbitrary computer network such as a local area network (LAN) and the Internet, or further a television (TV) broadcasting network. If the network 411 is a TV broadcasting network, the communication interface 404 comprises an antenna and a TV tuner.

The input apparatus 405 comprehends, for example, a pointing device such as a mouse and a keyboard. The output apparatus 406 comprehends a display apparatus such as a liquid crystal display and a CRT display. For example, a progressive image obtained by applying an IP conversion by the process of the first or second embodiment may be output to the output apparatus 406.

The storage apparatus 407 may be a magnetic disk apparatus such as a hard disk drive, or another kind of storage apparatus such as rewritable nonvolatile memory.

The storage apparatus 407 or ROM 402 stores a program according to the first or second embodiment, for example, a program for making a computer execute the processes shown in FIGS. 10, 13 and 14 or the processes shown in FIGS. 22, 13 and 29. The CPU 401 executing the program causes the computer shown in FIG. 31 to operate as the interpolation method determination apparatus 100, pixel value interpolation apparatus 200 or pixel value interpolation apparatus 300.

Meanwhile, the data of an input image may be pre-stored in the storage apparatus 407, or sent from an image provider 413 by way of the network 411 and communication interface 404. Alternatively, the input image data may be read out to the RAM 403 by a portable storage medium 410 storing the input image data being set in the drive apparatus 408. Note that an input image may be a static image expressed by an image signal or a moving image expressed by a video signal.

The storage unit 101 or 201 corresponds to the RAM 403. However, a part of the storage unit 101 or 201 can be implemented by the RAM 403, and the rest thereof can be implemented by the storage apparatus 407. The functional blocks other than the storage unit 101 shown in FIG. 7 and the functional blocks other than the storage unit 201 shown in FIGS. 9 and 21 correspond to the CPU 401.

The program according to the first or second embodiment may be provided by a program provider 412 by way of the network 411 and communication interface 404, stored in, for example, the storage apparatus 407, and executed by the CPU 401. Alternatively, the program according to the first or second embodiment may be stored in the portable storage medium 410 so that the portable storage medium 410 is set in the drive apparatus 408 and the stored program is loaded onto the RAM 403 and executed by the CPU 401. The portable storage medium 410 can be any of various storage media including an optical disk, such as compact disk (CD) and digital versatile disk (DVD), a magneto optical disk and a flexible disk.

Note that the present invention may be modified variously, in lieu of being limited to the embodiments described above. The following notes some examples; modifications other than the following are naturally possible.

The first aspect of such a modification is an application to a color image. The first and second embodiments so far assume that each pixel is represented by one pixel value as noted in the paragraph (e) for simplicity of description. This assumption applies to the case of a monochrome image in a gray scale defining brightness by a pixel value.

In the case of a color image, each pixel is represented by plural pixel values. For example, in an RGB color system used for a common computer display, each pixel is represented by three pixel values, that is, R expressing red, G expressing green and B expressing blue. Meanwhile, in a YCbCr color system used for a TV broadcasting, each pixel is represented by three pixel values, that is, a luminance signal Y and two chrominance signals Cb and Cr.

The modification of the first and second embodiments, for example, as described in the following makes it possible to determine an interpolation method if the input image is a color image.

The simplest modification is the method of using only one kind of pixel value for determining an interpolation method. A pixel value to be used for determining an interpolation method is desired to be selected in accordance with the characteristic of human eye. The human eye is more sensitive to a brightness difference than a color difference, and green is the color the human eye most detects brightness. Therefore, the preference are the selection of the luminance signal Y in the case of the YCbCr color system, and the selection of G representing green in the case of the RGB color system.

The description in the following exemplifies the case of the YCbCr color system. In this modified embodiment, the calculation of spatial correlation values and temporal correlation values, the static/moving judgment, the determination of an intra-field interpolation direction and the calculation of weighting coefficients are carried out by using only a pixel value Y. The calculation of the pixel value of a target pixel, that is, the S406 of FIG. 14 in the first embodiment or the steps S605 and S607 of FIG. 29 in the second embodiment, is carried out for each of the pixel values Y, Cb and Cr.

In another modified embodiment in the case of the input image being a color image, the calculation of spatial correlation values and temporal correlation values is carried out for each of plural kinds of pixel values. For example, local correlation values $c\_Y(x)$, $c\_Cb(x)$ and $c\_Cr(x)$ are calculated on the basis of each of the pixel values Y, Cb and Cr, in place of the local correlation value $c(x)$ of the expression (15). Then, the maximum value of the three local correlation values is selected as $c(x)$. Note that there is generally a difference in the number of bits between a luminance signal Y and chrominance signals Cb/Cr. This modified embodiment and those described below assume that the three local correlation values $c\_Y(x)$, $c\_Cb(x)$ and $c\_Cr(x)$ are obtained by applying a scale conversion in accordance with the difference in the number of bits.

An alternative configuration may be such that an appropriate weighting coefficients w1, w2 and w3 are predetermined and $w1 \cdot c\_Y(x)$, $w2 \cdot c\_Cb(x)$ and $w3 \cdot c\_Cr(x)$ are compared, in order to consider a pixel value Y in higher priority than pixel values Cb and Cr. Then, the value of, for example, the $c\_Cb(x)$ is used as $c(x)$ if the $w2 \cdot c\_Cb(x)$ is the largest among the aforementioned three. Note that the use of a weighting coefficients satisfying the relationship, i.e., 0<w2 and w3<w1, makes it possible to consider the pixel value Y in higher priority.

The method for calculating a cumulative correlation value from the thusly calculated local correlation values is common to that of the first and second embodiment. Further, other spatial correlation values and temporal correlation values are also calculated on the basis of the calculation of each of plural kinds of pixel values in a manner similar to the calculation of the $c(x)$ based on the $c\_Y(x)$, $c\_Cb(x)$ and $c\_Cr(x)$ as described above. The static/moving judgment, the determination of an intra-field interpolation direction and the calculation of weighting coefficients, all of which use the result of the aforementioned calculation of the spatial and/or temporal correlation values, are similar to the first and second embodiments. The target pixel is interpolated by calculating each of the plural kinds of pixel values for the target pixel.

The second aspect of such a modification is the method for calculating the correlation between two pixels. A spatial correlation value and a temporal correlation value are calculated on the basis of the correlation value of two pixels; the absolute value of the difference in two pixel values is used as the correlation value of the two pixels in the above embodiments. However, for example, the second power of the difference in two pixel values may be used as the correlation value of the two pixels, or the correlation of the two pixels may be defined in another way. Based on the definitions exemplified above, various correlation values decrease with the strength of correlation; the definition may be, however, the correlation value increases with the strength of correlation.

The third aspect of such a modification is the number of pixels used for calculating a local correlation value. As shown in FIG. 11, the first and second embodiments are configured to calculate a local correlation value by using one pixel existing on the upper real line 220 and one pixel existing on the lower real line 222, or two pixels existing on the upper real line 220 and two pixels existing on the lower real line 222. For reducing an influence of a noise in an image to the local correlation value, the above noted "one pixel" may be extended to three or five pixels, and the above noted "two pixels" may be extended to four or six pixels.

The replacement of, for example, the expression (16) with any of the following expressions (127) through (129) corresponds to the extension to four pixels from two pixels noted above. The coefficients ⅛ and ⅜ indicated in the following expression (129) is merely an example:

$$r(x,1)=|(u1+u2+u3+u4)/4-(d0+d1+d2+d3)/4| \quad (127)$$

$$r(x,1)=(|u1-d0|+|u2-d1|+|u3-d2|+|u4-d3|)/4 \quad (128)$$

$$r(x,1)=(⅛)|u1-d0|+(⅜)|u2-d1|+$$

$$(⅜)|u3-d2|+(⅛)|u4-d3| \quad (129)$$

While the above description describes a horizontal extension, the extension in the vertical direction is also possible. That is, a local correlation value may be calculated by considering an upper real line further above the upper real line 220 and a lower real line further below the lower real line 222. For example, the following expression (130) may be substituted for the expression (15), or respectively appropriate weighting coefficients may be multiplied to the three terms on the right side of the expression (130). In a similar manner, it is also possible to define a local correlation value by applying an extension considering an upper real line further above the upper real line 220 and a lower real line further below the lower real line 222 for a direction other than the c direction.

$$c(x)=|p(i,x,y-3)-p(i,x,y-1)|+$$

$$|p(i,x,y-1)-p(i,x,y+1)|+$$

$$|p(i,x,y+1)-p(i,x,y+3)| \quad (130)$$

The fourth aspect of such a modification is the number of pixels used for calculating temporal correlation values such as rel_xt and rel_yt. As shown in FIG. 25, for the coordinates of the target pixel T being (x,y), the second embodiment is configured to calculate a temporal correlation value rel_xt on the basis of the pixel values of the pixels existing at (x,y) and to calculate a temporal correlation value rel_yt on the basis of the pixel values of the pixels existing at (x,y−1) and (x,y+1). That is, the extension of the pixels, in the horizontal direction, used for calculating the rel_xt and rel_yt is one pixel. This "one pixel" may be extended to three or five pixels.

For example, substituting the following expression (131) for the expression (79) or substituting the following expression (132) for the expression (80) corresponds to the extension from the one pixel to three pixels. Note that preferable examples of the function f in the expressions (131) and (132) include a function returning the maximum value and a function returning an average value:

$$rel\_xt=f(|p(i-1,x-1,y)-p(i+1,x-1,y)|+$$

$$|p(i-1,x,y)-p(i+1,x,y)|+$$

$$|p(i-1,x+1,y)-p(i+1,x+1,Y)|) \quad (131)$$

$$rel\_yt=f(|p(i,x-1,y-1)-q(i-1,x-1,y-1)|,$$

$$|p(i,x,y-1)-q(i-1,x,y-1)|,$$

$$|p(i,x+1,y-1)-q(i-1,x+1,y-1)|,$$

$$|p(i,x-1,y+1)-q(i-1,x-1,y+1)|,$$

$$p(i,x,y+1)-q(i-1,x,y+1)|,$$

$$|p(i,x+1,y+1)-q(i-1,x+1,y+1)|) \quad (132)$$

The fifth aspect of such a modification is the number of directions considered as correlation calculation directions. The number may be a constant specific to an embodiment, or may be pre-designated by a user. As an example, FIG. 11 shows the nine directions; the number of directions considered as correlation calculation directions may be larger or smaller than "9". The consideration of too many directions may not be so meaningful.

The reasons are as follows. The local correlation value corresponding to, for example, the r5 or r6 direction indicates the correlation between pixels substantially apart from each other as comprehensible from the expression (30) or (31). Generally, there is a low probability of the correlation between pixels substantially apart from each other being strong.

Further, the r6 and l6 directions are gently inclined, and close to horizontal. For example, in the case of an inclined pattern of about 45 degrees as shown in FIG. 1, the occurrence of a "jaggy" makes it conspicuous and causes the human eyes to feel an image being degraded. In a nearly horizontal pattern, that is, in a very gently inclined pattern, the use of a conventional method does not cause the occurrence of such a conspicuous jaggy. Therefore, an excessive consideration of gentle inclination does not contribute to improving image quality.

Therefore, the number of directions to consider as correlation calculation directions is arbitrary, for which an appropriate number is desirably determined on the basis of results of experiments or the like, and there is no need to consider an excessive number of correlation calculation directions.

The sixth aspect of such a modification is pixels used for calculating a spatial correlation value rel_skew. In a similar manner as the third aspect noted above, the rel_skew may be calculated by extending to increase the number of pixels. Meanwhile, FIG. 23 shows the pixels used for calculating the rel_skew for each correlation calculation direction, which shows one of preferred examples. For the pixels used for calculating the rel_skew, a relative positional relationship with a target pixel T is identified in accordance with the temporary interpolation direction dir. It is possible to configure an embodiment in which the relative positional relationship is different from the example of FIG. 23.

The seventh aspect of such a modification is the direction of accumulating cumulative correlation values and the range thereof. The first and second embodiments are configured such that the selection sequence direction is "left to right horizontally", and the cumulative correlation values are also accumulated in the sequence specified in the selection sequence direction. In another embodiment, however, the selection sequence direction may be another direction such as "right to left horizontally".

Further, the cumulative correlation values may be calculated by segmenting an input image into plural blocks. That is, making the range, i.e., $a_j \leq x \leq b_j$, as the j-th block, an interpolation method may be determined for each block and the interpolation may be performed therefor. In this case, for example, the modification of FIG. 31 so as to comprise a plurality of CPUs 401 makes it possible to carry out parallel processing of plural blocks.

Note that if the selection sequence direction is "from left to right horizontally", the cumulative correlation value is incalculable around the left and right edges of an image and therefore is the value of "BIG" as shown in the cumulative correlation value list 242 of FIG. 18. Therefore, when dividing the input image into such blocks, it is desirable to divide it so that the ranges of two adjacent blocks are overlapped with each other in the x coordinate.

For example, when considering five directions as correlation calculation directions, there are incalculable cumulative correlation values corresponding to the two pixels at the left edge of the block and the two pixels at the right edge thereof as shown in FIG. 18. Therefore, for the j-th block and the (j−1)-th block on the immediate left of the j-th block, the range of at least two pixels in the x direction should desirably be overlapped. Assuming there is the overlap of n pixels, no interpolation is performed though the local correlation values and cumulative correlation values are calculated for the range of $a_j \leq x \leq a_j + n - 1$ in the j-th block; and pixels are interpolated in addition to calculating the local and cumulative correlation values for the range of $a_j + n \leq x \leq b_j$ in this example.

The eighth aspect of such a modification is the method for determining an intra-field interpolation direction. Both the min_rel and c (x) referred to in the S403 of FIG. 14 and S602 of FIG. 29 are local correlation values; an intra-field interpolation direction, however, may be determined on the basis of a cumulative correlation value. For example, the intra-field interpolation-use pixel determination unit 209 may perform a judgment in the steps S403 and/or S602 on the basis of the cumulative correlation value Min_rel corresponding to the direction dir and cumulative correlation value C(x). Further, the judgment may be performed by using both the local correlation value and cumulative correlation value.

The ninth aspect of such a modification is the application target of the embodiments of the present invention. The first and second embodiments define the IP conversion as the application target as noted in the paragraph (a). The principle common to the above described embodiments of the present invention, however, is applicable to others than the IP conversion. Specifically, an embodiment of the present invention is also applicable to the enlargement process of a static image (i.e., still picture) or moving image (i.e., moving picture).

The enlargement process of an image is also regarded as the process for inserting new pixels between existing pixels. That is, a part of pixels in a post-enlargement image are pixels succeeding to the pixel values of pixels existing in the original image, and the rest of pixels are what have been interpolated on the basis of pixel values of plural pixels existing in the original image. Therefore, an embodiment of the present invention is applicable to the interpolation for the enlargement process.

As an example, although the lines immediately above and below the interpolation line 221 are real lines in FIG. 11, there is no horizontal line on which all the pixels are real pixels in an enlargement process involving an enlargement in the horizontal direction. Therefore, neither pixel immediately above the target pixel nor pixel immediately below it is possibly a real pixel. In this case, for example, the local correlation value c (x) defined in FIG. 11 cannot be calculated. That is, the definitions of various spatial correlation values and temporal correlation values need to be changed appropriately in accordance with the distribution of real pixels for an embodiment applied to an enlargement process.

For example, let it be assumed that the position of the target pixel to be (x,y) and real pixels P1 through P4 exist respectively at (x−1,y−n), (x+1,y+n), (x+1,y−n) and (x−1,y+n). The larger the n, the direction connecting the pixels P1 and P2 and the direction connecting the pixels P3 and P4 become closer to the vertical direction. Therefore, the local correlation value c (x) may be calculated by using, for example, the following expression (133) in place of the expression (15) by approximating the local correlation value in the c direction by using the local correlations corresponding to these directions:

$$c(x) = (|p(i,x-1,y-n) - p(i,x+1,y+n)| + |p(i,x+1,y-n) - p(i,x-1,y+n)|)/2 \quad (133)$$

If n is excessively large, however, the respective distances between the pixels P1 through P4 and the target pixel become too long. Therefore, an appropriate range of the value of n is desired to be determined by an experiment or the like.

What is claimed is:

1. A non-transitory computer readable storage medium storing an interpolation method determination program for making a computer execute a process for determining an interpolation method for interpolating respective pixel values of plural pixels which do not exist in an input image and which are positioned on a straight line, the process comprising:

a target pixel selection by selecting, sequentially in accordance with a designated selection sequence direction, one pixel from among the plural pixels as a target pixel for which the interpolation method needs to be determined;

calculating a local correlation value for each one of designated plural correlation calculation directions using
 a pixel value of each of a first number of at least one first pixel existing in the one of the plural correlation calculation directions viewed from the target pixel and
 a pixel value of each of a second number of at least one second pixel existing in a direction opposite to the one of the plural correlation calculation directions viewed from the target pixel;

a cumulative correlation value calculation obtaining a plurality of cumulative correlation values,
 the plurality of cumulative correlation values being a set of correlation values to be calculated for each of the plural pixels sequentially one after another in accordance with the selection sequence direction starting from a head pixel based on a value given to the head pixel,
 the head pixel being a pixel at the head of a sequence in accordance with the selection sequence direction among the plural pixels, and
 the cumulative correlation value calculation comprising calculating the cumulative correlation value for the one of the plural correlation calculation directions in relation to the target pixel using at least
  the local correlation value corresponding to the one of the plural correlation calculation directions and
  the cumulative correlation value having been calculated, in correspondence with one of the plural correlation calculation directions, for a prior pixel selected immediately prior to selecting the target pixel;

a direction selection by selecting one of the plural correlation calculation directions according to the cumulative correlation values corresponding to the respective plural correlation calculation directions; and an interpolation-use pixel determination by determining plural pixels used for interpolating the target pixel according to at least either the local correlation value which corresponds to the correlation calculation direction selected, or the cumulative correlation value which corresponds to the correlation calculation direction selected.

2. The non-transitory computer readable storage medium according to claim 1, wherein the first number and the second number are equal to each other for each combination of the target pixel and one correlation calculation direction, and a mutually corresponding pair for each first pixel and each second pixel exists at the same distance from the target pixel.

3. The non-transitory computer readable storage medium according to claim 1, wherein each one of the plural correlation calculation directions is associated with a certain number of associated directions predetermined for the one of the plural correlation calculation directions, the certain number of the associated directions predetermined for the one of the plural correlation calculation directions including at least the one of the plural correlation calculation directions and at least one other correlation calculation direction close to the one of the plural correlation calculation directions itself as associated directions, and in calculating one cumulative correlation value for the target pixel corresponding to the one of the plural correlation calculation directions, each cumulative correlation value having been calculated for the prior pixel corresponding to each of the certain number of associated directions predetermined for the one of the plural correlation calculation directions is used.

4. The non-transitory computer readable storage medium according to claim 3, wherein the cumulative correction value calculation includes selecting one cumulative correlation value indicating the strongest correlation from among the certain number of the cumulative correlation values having been calculated for the prior pixel in correspondence with the certain number of associated directions, and in the cumulative correlation value calculation, the cumulative correlation value for the target pixel corresponding to the one of the plural correlation calculation directions is calculated from both the selected one cumulative correlation value and the local correlation value corresponding to the one of the plural correlation calculation directions.

5. The non-transitory computer readable storage medium according to claim 1, wherein the correlation calculation direction corresponding to the cumulative correlation value indicating the strongest correlation among the plurality of the cumulative correlation values is selected in the direction selection.

6. The non-transitory computer readable storage medium according to claim 1, wherein the selection sequence direction is a horizontal direction or a vertical direction of the input image, and one of the plural correlation calculation directions is orthogonal to the selection sequence direction.

7. The non-transitory computer readable storage medium according to claim 6, wherein the determination in the interpolation-use pixel determination is further based on the local correlation value corresponding to the correlation calculation direction orthogonal to the selection sequence direction.

8. The non-transitory computer readable storage medium according to claim 1, wherein the input image is a field image of a moving picture in an interlace format, and the selection sequence direction is a direction along a line not existing in the field image.

9. The non-transitory computer readable storage medium according to claim 8, wherein the process further comprises calculating a first temporal correlation value using a pixel value of a pixel existing at a same position as the target pixel or in neighborhood of the target pixel for each of a precedent field image and a subsequent field image respectively corresponding to the pre- and post-clock time of a target field image which is the input image and which is the subject of determining the interpolation method.

10. The non-transitory computer readable storage medium according to claim 9, wherein the process further comprises a static/moving judgment of whether the target pixel or the neighborhood of the target pixel is static or moving, using the first temporal correlation value.

11. The non-transitory computer readable storage medium according to claim 10, wherein the process further comprises determining, as a pixel used for the interpolation for the target pixel, a pixel existing at the same position as the target pixel in the precedent field image or the subsequent field image when a judgment result of the static/moving judgment is static.

12. The non-transitory computer readable storage medium according to claim 10, wherein the plural pixels used for interpolating the target pixel are determined in the direction selection and the interpolation-use pixel determination when a judgment result of the static/moving judgment is moving.

13. The non-transitory computer readable storage medium according to claim 9, wherein the process further comprises calculating an intra-field interpolation value using pixel values of the plural pixels existing within the target field image and determined in the interpolation-use pixel determination, calculating an inter-field interpolation value using a pixel value of at least either a pixel existing at the same position as the target pixel in the precedent field image or a pixel existing at the same position as the target pixel in the subsequent field image, and a mixed interpolation value calculation obtaining, using the intra-field interpolation value and the inter-field interpolation value, a mixed interpolation value which is to be assigned to the target pixel.

14. The non-transitory computer readable storage medium according to claim 13, wherein the mixed interpolation value calculation comprises:

calculating a first weighting coefficient and a second weighting coefficient, and calculating the mixed interpolation value by adding a product of the intra-field interpolation value and the first weighting coefficient to a product of the inter-field interpolation value and the second weighting coefficient.

15. The non-transitory computer readable storage medium according to claim 13, wherein the process further comprises calculating a second temporal correlation value using both a pixel value of each of one or plural neighbor pixels existing in the neighborhood of the target pixel in the target field image and a pixel value of a post-interpolation pixel which exists at the same position as each neighbor pixel in the precedent field image and which has been interpolated.

16. The non-transitory computer readable storage medium according to claim 15, wherein positions of the plural neighbor pixels are defined for each of the plural correlation calculation directions, and wherein the second temporal correlation value corresponding to the correlation calculation direction selected in the direction selection is calculated in the second temporal correlation value calculation.

17. The non-transitory computer readable storage medium according to claim 13, wherein the process further comprises calculating a spatial correlation value using respective pixel values of particular plural pixels in the target field image, where positions of the particular plural pixels in the target field image are defined for each of the plural correlation calculation directions and the particular plural pixels include both a pixel existing in the target field image and a pixel which is selected a previous target pixel selection from among pixels not existing in the target field image and for which a pixel value has been interpolated.

18. The non-transitory computer readable storage medium according to claim 1, wherein the input image is an image to be enlarged, and wherein plural pixels, which do not exist in the input image and which are to be compensated for an enlarged image, are sequentially selected in the target pixel selection.

19. An interpolation method determination apparatus for determining an interpolation method used for interpolating respective pixel values of plural pixels which do not exist in an input image and which are positioned on a straight line, the apparatus comprising:

a target pixel selection unit selecting, sequentially in accordance with a designated selection sequence direction, one pixel from among the plural pixels as a target pixel for which the interpolation method needs to be determined;

a local correlation value calculation unit calculating a local correlation value for each one of designated plural correlation calculation directions using a pixel value of each of a first number of at least one first pixel existing in the one of the plural correlation calculation directions viewed from the target pixel and a pixel value of each of a second number of at least one second pixel existing in a direction opposite to the one of the plural correlation calculation directions viewed from the target pixel;

a storage unit storing a plurality of cumulative correlation values, the plurality of cumulative correlation values being a set of correlation values to be calculated for each of the plural pixels sequentially one after another in accordance with the selection sequence direction starting from a head pixel based on a value given to the head pixel, and the head pixel being a pixel at the head of a sequence in accordance with the selection sequence direction among the plural pixels;

a cumulative correlation value calculation unit calculating the cumulative correlation value for each one of the plural correlation calculation directions in relation to the target pixel using at least the local correlation value corresponding to the one of plural correlation calculation directions and the cumulative correlation value which is stored in the storage unit and which corresponds to the one of the plural correlation calculation directions, for a prior pixel selected immediately prior to selecting the target pixel, and storing the cumulative correlation value in the storage unit;

a direction selection unit selecting one of the plural correlation calculation directions according to the cumulative correlation values corresponding to the respective plural correlation calculation directions; and an interpolation-use pixel determination unit determining plural pixels used for interpolating the target pixel according to at least either the local correlation value which corresponds to the correlation calculation direction selected by the direction selection unit or the cumulative correlation value which corresponds to the correlation calculation direction selected by the direction selection unit.

20. An interpolation method determination method by a computer to determine an interpolation method for interpolating respective pixel values of plural pixels which do not exist in an input image and which are positioned on a straight line, the interpolation method determination method comprising:

a target pixel selection by selecting, sequentially in accordance with a designated selection sequence direction, one pixel from among the plural pixels as a target pixel for which the interpolation method needs to be determined;

calculating a local correlation value for each one of designated plural correlation calculation directions using a pixel value of each of a first number of at least one first pixel existing in the one of the plural correlation calculation directions viewed from the target pixel and a pixel value of each of a second number of at least one second pixel existing in a direction opposite to the one of the plural correlation calculation directions viewed from the target pixel;

a cumulative correlation value calculation obtaining a plurality of cumulative correlation values, the plurality of cumulative correlation values being a set of correlation values to be calculated for each of the plural pixels sequentially one after another in accordance with the selection sequence direction starting from a head pixel based on a value given to the head pixel, the head pixel being a pixel at the head of a sequence in accordance with the selection sequence direction among the plural pixels, and the cumulative correlation value calculation comprising calculating the cumulative correlation value for each one of the plural correlation calculation directions in relation to the target pixel using at least the local correlation value corresponding to the one of the plural correlation calculation directions and the cumulative correlation value having been calculated, in correspondence with the one of the plural correlation calculation directions, for a prior pixel selected immediately prior to selecting the target pixel;

a direction selection by selecting one of the plural correlation calculation directions according to the cumulative correlation values corresponding to the respective plural correlation calculation directions; and an interpolation-use pixel determination by determining plural pixels used for interpolating the target pixel according to at least either
the local correlation value which corresponds to the correlation calculation direction selected, or
the cumulative correlation value which corresponds to the correlation calculation direction selected.

* * * * *

UNITED STATES PATENT AND TRADEMARK OFFICE
CERTIFICATE OF CORRECTION

PATENT NO. : 8,290,308 B2
APPLICATION NO. : 11/964570
DATED : October 16, 2012
INVENTOR(S) : Shohei Nakagata et al.

Page 1 of 1

It is certified that error appears in the above-identified patent and that said Letters Patent is hereby corrected as shown below:

In the Claims:

Column 64, Line 61, Claim 1, Delete "calculating the cumulative correlation value for the" and insert -- calculating the cumulative correlation value for each --, therefor.

Column 64, Line 67, Claim 1, Delete "in correspondence with one of the plural" and insert -- in correspondence with the one of the plural --, therefor.

Signed and Sealed this
Thirtieth Day of April, 2013

Teresa Stanek Rea
*Acting Director of the United States Patent and Trademark Office*